United States Patent
Hibino et al.

(10) Patent No.: US 6,702,008 B1
(45) Date of Patent: Mar. 9, 2004

(54) AIR CONDITIONER FOR VEHICLE AND AIR CONDITIONING UNIT DRIVING APPARATUS

(75) Inventors: So Hibino, Anjo (JP); Tokuhisa Takeuchi, Chita-gun (JP); Teruhiko Kameoka, Okazaki (JP); Akira Yamaguchi, Chiryu (JP); Koichi Ito, Kariya (JP); Tatsumi Kumada, Gamagori (JP); Nobukazu Kuribayashi, Kariya (JP); Shigeki Harada, Toyota (JP)

(73) Assignee: Denso Corporation, Kariya (JP)

( * ) Notice: Subject to any disclaimer, the term of this patent is extended or adjusted under 35 U.S.C. 154(b) by 212 days.

(21) Appl. No.: 09/724,386

(22) Filed: Nov. 28, 2000

(30) Foreign Application Priority Data

| Nov. 29, 1999 | (JP) | 11-338392 |
| Dec. 13, 1999 | (JP) | 11-353394 |
| Dec. 24, 1999 | (JP) | 11-366466 |
| Jun. 9, 2000 | (JP) | 2000-173920 |
| Jul. 25, 2000 | (JP) | 2000-224084 |
| Sep. 5, 2000 | (JP) | 2000-269078 |

(51) Int. Cl.$^7$ ............ F25B 29/00; B60H 1/00; B60H 3/00; F24F 13/10

(52) U.S. Cl. ............ 165/202; 165/204; 165/42; 165/43; 237/12.3 A; 237/12.3 B; 454/121; 454/126; 454/156

(58) Field of Search ............ 165/42, 43, 202, 165/204; 454/156, 121, 126; 237/12.3 A, 12.3 B

(56) References Cited

U.S. PATENT DOCUMENTS

6,138,749 A 10/2000 Kawai et al.
6,179,044 B1 * 1/2001 Tabara ............ 165/42

FOREIGN PATENT DOCUMENTS

| JP | 56-8713 | * 1/1981 |
| JP | A-62-20955 | 1/1987 |

* cited by examiner

Primary Examiner—John K. Ford
(74) Attorney, Agent, or Firm—Harness, Dickey & Pierce, PLC

(57) ABSTRACT

There are provided an air mixing door, a plurality of outlets for blowing air into respective portions in a vehicle compartment, outlet mode doors for switching a outlet mode by closing and opening the plurality of outlets, and one motor actuator for driving the air mixing door and the outlet mode doors. The outlet mode doors and the air-mixing door are alternately driven through a change of an operation angle of the motor actuator.

5 Claims, 32 Drawing Sheets

FIG. 13A

FACE→DEF

| | FACE | → | B/L | → | FOOT | → | F/D | → | DEF |
|---|---|---|---|---|---|---|---|---|---|
| AIR MIX DOOR | 0.3 | — | 0.2 | — | 0.1 | — | 0.5 | — | 0.1 |
| MODE DOOR | — | 0.4 | — | 0.2 | — | 0.3 | — | 0.3 | — |

DEF→FACE

| | FACE | ← | B/L | ← | FOOT | ← | F/D | ← | DEF |
|---|---|---|---|---|---|---|---|---|---|
| AIR MIX DOOR | 0.3 | — | 0.3 | — | 0.5 | — | 0.2 | — | 0.5 |
| MODE DOOR | — | 0.3 | — | 0.3 | — | 0.2 | — | 0.2 | — |

(N·m)

DRIVEN SIDE            DRIVING SIDE

DRIVEN SIDE            DRIVING SIDE

DRIVEN SIDE     DRIVING SIDE

0°

DRIVEN SIDE     DRIVING SIDE

80°

DRIVEN SIDE     DRIVING SIDE

160°

| TAM (°C) | CONDITION | A/M (%) | DISCHARGE MODE (DEF ON) |
|---|---|---|---|
| TAM ≤ -20°C | WARM-UP | 100~90 | DEF |
| | NORMAL | 90~80 | F/D |
| -20°C < TAM ≤ -10°C | WARM-UP | 100~80 | DEF |
| | NORMAL | 80~70 | F/D |
| -10°C < TAM ≤ 0°C | WARM-UP | 100~70 | DEF |
| | NORMAL | 70~60 | F/D |
| TAM > 0°C | WARM-UP | 100~60 | DEF |
| | NORMAL | 60~50 | DEF |

AIR CONDITIONER FOR VEHICLE AND AIR CONDITIONING UNIT DRIVING APPARATUS

CROSS REFERENCE TO RELATED APPLICATION

This application is based on and incorporates herein by reference Japanese Patent Application Nos. Hei. 11-338392 filed on Nov. 29, 1999, Hei. 11-353394 filed on Dec. 13, 1999, Hei. 11-366466 filed on Dec. 24, 1999, 2000-173920 filed on Jun. 9, 2000, 2000-224084 filed on Jul. 25, 2000, and 2000-269078 filed on Sep. 5, 2000.

BACKGROUND OF THE INVENTION

1. Field of the Invention

The present invention relates to an air conditioner for a vehicle for performing switching of outlet modes in conjunction with an operation position of temperature control means for controlling outlet temperature into a vehicle compartment, and an air conditioning unit driving apparatus for driving an air conditioning unit such as an air passage opening/closing door.

2. Description of Related Art

Conventionally, an air conditioner for a vehicle is provided with an inside/outside air switching door, a temperature control means (air mixing door, hot water valve, etc.), and an air outlet mode door, and these instruments are independently operated by a manual operation mechanism or a motor actuator, respectively.

Recently, in the air conditioner for the vehicle, for the purpose of improving the operationality by a passenger, the number of apparatuses in which a motor actuator is operated by a switch operation so that the above respective instruments can be quickly operated, is increasing. Such an apparatus requires dedicated motor actuators for inside/outside air switching, temperature control, and outlet mode switching, which increase the cost of the air conditioner.

In order to decrease the number of motor actuators, the present inventors considered performing temperature control and outlet mode switching through one motor actuator. That is, the present inventors paid attention to the fact that the outlet mode switching correlates to the operation position of the temperature control means, and considered performing both the temperature control and the outlet mode switching through one motor actuator, by sequentially switching the outlet mode to a face mode, a bi-level mode, and a foot mode as the operation position of the temperature control means is shifted from a low temperature side position (maximum cooling side) to a high temperature side position (maximum heating side).

However, if the temperature control and the outlet mode switching are simply performed by one motor actuator, since the number of doors simultaneously driven by the one motor actuator is increased, the necessary operation torque (workload) of the motor is increased, and a high power motor is required, so that the cost of the motor actuator is increased. Since motor current is increased by the high power motor, the cost of an airconditioning control unit (ECU) is also increased.

Although JP-A-11-115463 discloses an apparatus in which an air mixing door as temperature control means and an inside air foot door are operated in conjunction with each other by one motor actuator, also in the apparatus disclosed in this publication, since the air mixing door and the inside air foot door are simply operated in conjunction with each other by one motor actuator, there occurs the foregoing disadvantage due to the increase of the number of doors driven by one motor actuator.

Besides, if the temperature control and the outlet mode switching are simply performed by one motor actuator, the relation between the operation position of the temperature control means and the outlet mode switching is always fixed to a one-to-one relation. Thus, there occurs a disadvantage that a defroster mode can not be arbitrarily set at the time when a window glass is fogged, irrespective of the operation position of the temperature control means.

JP-A-11-115463 discloses the apparatus in which the air mixing door as the temperature control means and the inside air foot door are operated in conjunction with each other by one motor actuator, the inside air foot door is operated to a fully open position of a foot passage at the maximum heating and partitions an inside air passage and an outside air passage, and can originally interlock with the operation position of the air mixing door. Thus, even if the air mixing door and the inside air foot door are operated by the one motor actuator, any trouble does not occur.

According to JP-A-11-115463, since the air mixing door and the inside air foot door are simply operated by the one motor actuator, it can not be applied to a switching mechanism of outlet modes including the defroster mode.

When the temperature control and the outlet mode switching are simply performed by one motor actuator, since the relation between the operation position of the temperature control means and the outlet mode switching is always fixed to a one-to-one relation, the following problem occurs. That is, it has been found that when the operation position of the temperature control means is corrected in accordance with the temperature change of a cooling heat exchanger in order to keep a outlet temperature into a vehicle compartment constant when the temperature of the cooling heat exchanger constituted by an evaporator of a cooling cycle is changed, the outlet mode is changed by the operation position change of the temperature control means, and there occurs a case where an air conditioning feeling is damaged.

This problem will be described more specifically with reference to FIG. 48. The horizontal axis of FIG. 48 indicates an opening degree (hereinafter referred to as an A/M opening degree) of an air mixing door as temperature control means. The A/M opening degree of 0% indicates the maximum cooling position of the air mixing door, and the A/M opening degree of 100% indicates the maximum heating position of the air mixing door. The vertical axis of FIG. 48 indicates an outlet temperature into a vehicle compartment.

In FIG. 48, solid lines indicate control characteristics between the A/M opening degree and the outlet temperature at the temperature of the cooling heat exchanger (specifically, air temperature immediately after outlet from the cooling heat exchanger) TE=0° C. Among them, line ① indicates a foot outlet temperature in a foot mode, line ② indicates a face outlet temperature in a bi-level mode, line ③ indicates a foot outlet temperature in the bi-level mode, and line ④ indicates a face outlet temperature in a face mode.

Broken lines indicate control characteristics between the A/M opening degree and the outlet temperature at the temperature of the cooling heat exchanger TE=15° C., and lines ⑤ to ⑧ indicate outlet temperatures respectively corresponding to the above lines ① to ④.

When the outlet temperature into the vehicle compartment under the condition of TE=0° C. is controlled at a predetermined A/M opening degree "a", and when a compressor of a cooling cycle is stopped for power save (economy) control or the like, the temperature TE is raised to a suction air temperature of the cooling heat exchanger. The line of TE=15° C. in FIG. 48 indicates the state which occurs at the time of stop of the compressor like this. In this case, in order to keep the outlet temperature into the vehicle compartment constant, it is necessary that the A/M opening degree is decreased as indicated by an arrow X from the opening degree "a" to the opening degree "b", and the A/M opening degree is corrected to the maximum cooling side by a predetermined amount.

Since the A/M opening degree "b" after the correction is in the region of the face mode, a warm air of higher than 30° C. is blown from a face opening portion to the head side of a passenger according to the temperature control characteristics of the broken line (8), and an air conditioning feeling is damaged.

SUMMARY OF THE INVENTION

A first object of the present invention is to provide an air conditioner for a vehicle for operating temperature control means and an outlet mode door by using one motor actuator, in which an increase in necessary operation torque of the motor actuator is suppressed.

A second object of the present invention is to provide an apparatus for driving an air conditioning unit such as an air passage opening/closing door by a motor actuator, in which an operation force of the air conditioning unit is lowered.

A third object of the present invention is to provide an air conditioning unit driving apparatus which enables the transmission of rotation over 180°.

According to a first aspect of the present invention, an air conditioner for a vehicle includes temperature control means for controlling a outlet temperature into a vehicle compartment, a plurality of outlet opening portions for blowing air into respective portions in the vehicle compartment, outlet mode doors for opening and closing the plurality of outlet opening portions to switch a outlet mode, and one motor actuator for driving the temperature control means and the outlet mode doors, and is characterized in that an operation position of the temperature control means is controlled between a maximum cooling position and a maximum heating position by a change of an operation angle of the motor actuator, the outlet mode doors are driven to open and close the plurality of outlet opening portions, and the outlet mode doors and the temperature control means are alternately driven in response to the change of the operation angle of the motor actuator.

According to this, even in the structure where the temperature control means and the outlet mode doors are driven by the one motor actuator, the temperature control means and the outlet mode doors can be driven at different timing, and it is possible to suppress the increase of the necessary operation torque of the motor actuator due to simultaneous driving. Thus, it is possible to avoid disadvantages, such as an increase in costs and an increase in consumed power, due to the change to a high output motor.

Incidentally, "alternate driving of the outlet mode doors and the temperature control means" includes not only a case where alternate driving is always made in all range of the operation angle of the motor actuator, but also a case where simultaneous driving is made in a part of the operation angle of the actuator. With respect to the partial simultaneous driving, a countermeasure is taken such that the driving is limited to only a region where the necessary operation torque becomes small in the operation angle of the motor actuator.

According to a second aspect of the present invention, an air conditioning unit driving apparatus for driving a plurality of air conditioning units, such as an air passage opening/closing door, by a motor actuator, includes driving side members rotated by an operation force of the motor actuator, a rotatable follower side member coupled to the air conditioning units, for driving the air conditioning units, and coupling trods for transmitting the operation force of the motor actuator from the driving side members to the follower-side member, and is characterized in that at least two coupling rods for coupling both the members in parallel are used as the coupling rods, both ends of the two coupling rods are rotatably coupled to both the members, and a total value of angles ($\alpha$) between directions (C) of the operation forces transmitted to the follower side members from the two coupling rods and rotation directions (D) of the follower side members is always kept a predetermined angle or less with respect to a change of an operation angle of the motor actuator.

When the operation force is transmitted from the coupling rod to the follower side member, if the above angle ($\alpha$) becomes a value near 90°, there occurs a state (change point) where it is impossible to apply the force in the rotation direction from the coupling rod to the follower side member.

In view of this, the two coupling rods are used, and the total value of the angles ($\alpha$) of the two coupling rods is always kept the predetermined angle or less, so that it is possible to avoid the worst state where the angles ($\alpha$) of both the two coupling rods become 90° (change point). Thus, even if the operation angle of the motor actuator is changed to any value, the operation force can be always easily transmitted from the coupling rod to the follower side member.

According to a third aspect of the present invention, an air conditioning unit driving apparatus includes a motor actuator, a distribution link rotated by an operation force of the motor actuator, a follower side link coupled to a plurality of air conditioning units, and a pin coupled to the follower side link, and is characterized in that a cam groove in which the pin is slidably fitted is provided in the distribution link, the pin is displaced by rotation of the distribution link, and a plurality of idle portions for stopping displacement of the pin against an operation angle change of the distribution link are provided in the cam groove.

By this, it is possible to concentrate the idle function for stopping the operation of the plurality of air conditioning units in a predetermined operation angle range against an operation angle change of the motor actuator to the one distribution link. As a result, as compared with a case where the idle function is set for each of the driving links of the plurality of air conditioning units, the entire link mechanism can be miniaturized and simplified by the concentration of the idle function.

According to a fourth aspect of the present invention, an air conditioning unit driving apparatus includes a motor actuator, a distribution link rotated by an operation force of the motor actuator, a first pin coupled to a first air conditioning unit, a follower side link coupled to a plurality of second air conditioning units, and a second pin coupled to the follower side link, and is characterized in that a first cam groove in which the first pin is slidably fitted, and a second cam groove in which the second pin is slidably fitted are provided in the distribution link, the first pin and the if second pin are displaced by rotation of the distribution link, and a plurality of idle portions for stopping displacements of the first pin and the second pin against an operation angle change of the distribution link are provided in the first cam groove and the second cam groove, respectively.

By this, it is possible to concentrate the idle function for stopping the operation of the first air conditioning unit and the plurality of second air conditioning units in a predetermined operation angle range against the operation angle change of the motor actuator to the one distribution link. As a result, as compared with a case where the idle function is set for the driving link of the first air conditioning unit and each of the driving links of the plurality of air conditioning units, the entire link mechanism can be miniaturized and simplified by the concentration of the idle function.

According to a fifth aspect of the present invention, an air conditioner for a vehicle includes temperature control means for controlling a outlet temperature into a vehicle compartment, a plurality of outlet opening portions for blowing air into respective portions of the vehicle compartment, outlet mode doors for switching a outlet mode by opening and closing the plurality of outlet opening portions one motor actuator for driving the temperature control means and the outlet mode doors, and a distribution link rotated by rotation of the motor actuator, and is characterized in that first cam grooves for driving the temperature control means and second cam groove for driving the outlet mode doors are provided in the distribution link, an operation position of the temperature control means is controlled between a maximum cooling position and a maximum heating position in accordance with rotation displacements of the first cam grooves by rotation of the distribution link, and the outlet mode doors are driven in accordance with rotation displacements of the second cam grooves to open and close the plurality of outlet opening portions.

According to this, it becomes possible to drive both the temperature control means and the outlet mode doors by the first and second cam grooves provided in the one distribution link, and as a result, the number of parts of the driving link mechanism from the output side of the one motor actuator to the temperature control means and the outlet mode doors can be greatly decreased. By this, miniaturization of the link mechanism and reduction in costs can be achieved well.

According to a sixth aspect of the present invention, an air conditioner for a vehicle includes temperature control means for controlling a outlet temperature into a vehicle compartment, a plurality of outlet opening portions for blowing air into respective portions of the vehicle compartment, outlet mode doors for switching a outlet mode by opening and closing the plurality of outlet opening portions, one motor actuator for driving the temperature control means and the outlet mode doors, a first link including first cam grooves for driving the temperature control means, a second link including second cam grooves for driving the outlet mode doors, and coupling means for coupling the first link to the second link, the first link and the second link being rotated in conjunction with each other by the motor actuator, and is characterized in that an operation position of the temperature control means is controlled between a maximum cooling position and a maximum heating position in accordance with rotation displacements of the first cam grooves by rotation of the first link, and the outlet mode doors are driven in accordance with rotation displacements of the second cam grooves by rotation of the second link to open and close the plurality of out let opening portions According to this, since the first link and the second link are dedicatedly provided for driving the temperature control means and for driving the outlet mode doors, the first and second links can be designed into dedicated shapes for respective driving objects, and the degree of freedom of design is improved. Thus, the interconnection relation between temperature control characteristics in the vehicle compartment and outlet mode switching characteristics can be set to various modes.

According to a seventh aspect of the present invention, an air conditioner for a vehicle includes temperature control means for controlling a outlet temperature into a vehicle compartment, outlet mode doors for setting a face mode, a foot mode, and a defroster mode, one motor actuator for driving the temperature control means and the outlet mode doors, control means for controlling an operation angle of the motor actuator, and defroster instruction means for issuing an instruction of the defroster mode, and is characterized in that as a range of the operation angle of the motor actuator, there are provided a temperature control region (A) in which an operation position of the temperature control means is controlled between a maximum cooling position and a maximum heating position, the outlet mode doors are driven to set the face mode in an operation region at a maximum cooling side of the temperature control means, and the foot mode is set in an operation region at a maximum heating side of the temperature control means, and a defroster setting region (B) in which when the instruction of the defroster mode is issued from the defroster instruction means, the operation angle of the motor actuator is made to go out of a range of the temperature control region (A), the outlet mode doors are driven, and the defroster mode is set.

By this, in the temperature control region (A) of the operation angle range of the motor actuator, the face mode and the foot mode can be automatically set in conjunction with the change of the operation position of the temperature control means between the maximum cooling position and the maximum heating position. Further, when the instruction of the defroster mode is issued, the defroster mode can be set by forcibly making the operation angle of the motor actuator go out of the range of the temperature control region (A). Thus, in the air conditioner for the vehicle, both the temperature control means and the outlet mode door are driven by using the one motor actuator, so that the number of motor actuators to be used can be decreased, and the costs can be reduced, and further, the function capable of arbitrarily setting the defroster mode on the basis of the instruction of the defroster mode can be secured.

According to an eighth aspect of the present invention, in an air conditioner for a vehicle for switching and setting a outlet mode in conjunction with a change of an operation position of temperature control means by using one motor actuator, an objective operation angle of the motor actuator is determined so that the temperature control means is operated to an objective position to keep a outlet temperature into a vehicle compartment an objective temperature, the objective position of the temperature control means is corrected in accordance with a temperature of a cooling heat exchanger, and correction of the objective position through the temperature of the cooling heat exchanger is restricted within a range where a outlet mode determined in a state before the correction is kept.

By this, when the outlet temperature into the vehicle compartment is controlled, even if the objective position of the temperature control means is corrected in accordance with the temperature of the cooling heat exchanger, it is possible to prevent the outlet mode from being switched due to this correction.

Thus, in the air conditioner for the vehicle which can simplify the actuator portion by carrying out the operation position control of the temperature control means and the switching and setting of the outlet mode by one motor actuator, deterioration of an airconditioning feeling due to unreasonable switching of the outlet mode can be prevented from occurring.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 13A and 13B are graphs showing motor actuator operation torque (fourth embodiment);

DETAILED DESCRIPTION OF THE PREFERRED EMBODIMENTS

First Embodiment

Figure 1:
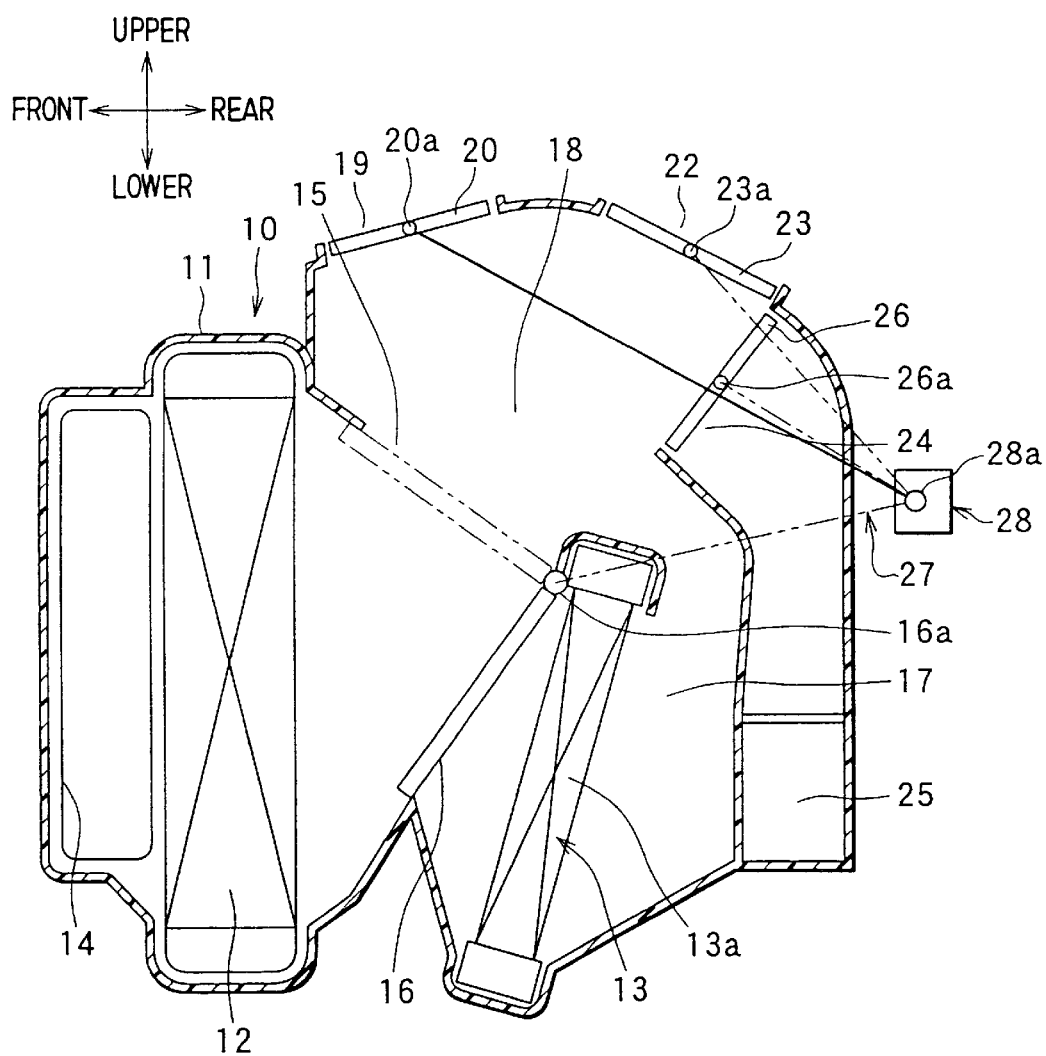
FIG. 1 is a schematic sectional view of a main portion of an air conditioner for a vehicle (first embodiment)

FIG. 1 is a sectional view of an air conditioning unit portion of an airconditioner for a vehicle. The airconditioner of this embodiment is a so-called semi-center layout one, and in the inside of an instrument board at the front of a vehicle compartment, an air conditioning unit 10 is disposed substantially at the center portion in the right-and-left direction of a vehicle. Arrows in FIG. 1 indicate mounting directions of the air conditioning unit 10 with respect to the vertical and lengthwise directions of the vehicle.

An air blower unit (not shown) for blowing air-conditioning air to the airconditioning unit 10 is arranged to be offset at the side of the air conditioning unit 10 (at the side of the assistant driver's seat). This air blower unit includes, as well known, an inside/outside air switching box for switching and introducing inside air and outside air, and a centrifugal electric blower fan for blowing air (inside air or outside air) sucked from this inside/outside air switching box toward the air conditioning unit 10.

The airconditioning unit 10 includes an airconditioning case 11 made of resin, and an air passage where blown air passes through an evaporator 12 and a heater core 13 and flows from the front side of the vehicle to the rear side of the vehicle is formed in the inside of this air conditioning case 11.

In the air passage within the air conditioning case 11, the evaporator 12 is disposed at the front side of the vehicle, and the heater core 13 is disposed at the rear side of the vehicle. The evaporator 12 is, as well known, a cooling heat exchanger in which heat equivalent to latent heat of vaporization of a coolant of a cooling cycle is absorbed from the air-conditioning air to cool the air-conditioning air. The heater core 13 is a heating heat exchanger in which hot water (cooling water) of a vehicle engine is made a heat source fluid to heat the air-conditioning air. In the air conditioning case 11, an air inlet 14 into which the blown air from the not-shown air blower unit flows is formed in the side portion at the headmost side of the vehicle (front position of the evaporator 12) and at the side of the assistant driver's seat.

A cool air bypass passage 15 is formed at an upper portion of the heater core 13, and a plate-like air mixing door 16 is disposed immediately at the downstream side (vehicle rear side) of the evaporator 12 to be rotatable around a rotary shaft 16a. This air mixing door 16 can adjust the temperature of blown air into the vehicle compartment to a desired temperature by adjusting the air volume ratio of cool air passing through the cool air bypass passage 15 to warm air passing through a core portion 13a of the heater core 13, and constitutes temperature control means of the blown air temperature.

A warm air passage 17 toward an upper portion is formed at a portion immediately after the heater core 13, and the warm air from this warm air passage 17 and the cool air from the cool air bypass passage 15 are mixed in an air mixing portion 18.

A plurality of outlet opening portions are formed at the downstream side of the air passage of the air conditioning case 11. Among the outlet opening portions, a defroster outlet 19 is provided at the upper surface portion of the air conditioning case 11, at substantially the center portion in the rear-and-front direction of the vehicle, and in the inside of the air conditioning case 11. The defroster outlet 19 is designed to blow air-conditioning air toward the inner surface of the vehicle window glass through a not-shown defroster duct. The defroster outlet 19 is opened and closed by a plate-like defroster door 20 rotatable around a rotary shaft 20a.

Next, a face outlet 22 is provided at the upper surface portion of the air conditioning case 11 and at a vehicle rear side portion as compared with the defroster outlet 19. This face outlet 22 is designed to blow air to a passenger's head in the vehicle compartment through a not-shown face duct. The face outlet 22 is opened and closed by a face door 23 rotatable around a rotary shaft 23a.

Next, a foot outlet 24 is provided at the lower side of the face outlet 22 in the air conditioning case 11. The downstream side of the foot outlet 24 communicates with a foot outlet port 25 disposed at both sides of the air conditioning case 11, and warm air is blown to the foot portion of the passenger from this foot outlet port 25. The foot outlet 24 is opened and closed by a plate-like foot door 26 rotatable around a rotary shaft 26a.

Incidentally, although the example of FIG. 1 has such a structure that the outlets 19, 22 and 24 are respectively opened and closed by the dedicated three doors 20, 23 and 26, as well known, the defroster outlet 19 and the face outlet 22 may be switched and opened/closed by one common door, or the face outlet 22 and the foot outlet 24 are switched and opened/closed by one common door.

In the air conditioning unit 10, one end portion of each of the rotary shaft 16a of the air mixing door 16, the rotary shaft 20a of the defroster door 20, the rotary shaft 23a of the face door 23, and the rotary shaft 26a of the foot door 26 is made to project to the outside of the air conditioning case 11, and the one end portion of each of the rotary shafts 16a, 20a, 23a and 26a is coupled to an output shaft 28a of a common motor actuator 28 through a link mechanism 27. By this, both the air mixing door 16 for temperature control and the doors 20, 23 and 26 for outlet mode switching are opened and closed by the one motor actuator 28. Here, the motor actuator 28 can be constituted by a DC motor.

Figure 2:
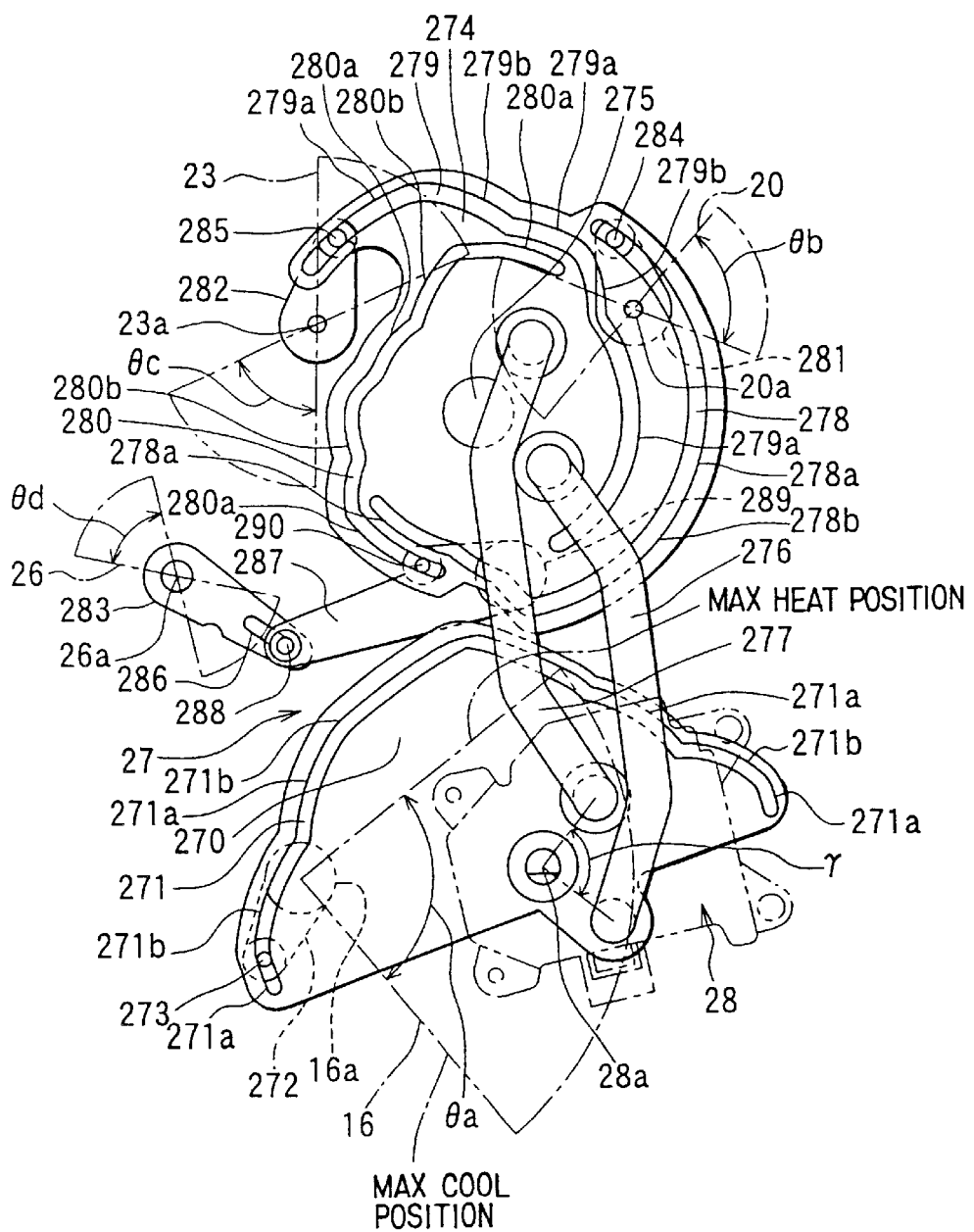
FIG. 2 is a structural view showing a specific example of a link mechanism for door operation (first embodiment)

FIG. 2 shows a specific structure of the link mechanism 27. A temperature controlling link 270 is coupled to the output shaft 28a of the motor actuator 28, and the output shaft 28a and the temperature controlling link 270 rotate in a body. The temperature controlling link 270 is formed into a substantially semi-circular shape, and a cam groove 271 is formed along its outer peripheral portion.

On the other hand, one end of a driving lever 272 is coupled to the rotary shaft 16a of the air mixing door 16, and a pin 273 provided at the other end of the driving lever 272 is slidably fitted in the cam groove 271. By this, the air mixing door 16 is rotated and operated between the maximum cooling position and the maximum heating position over an angle θa through the rotation of the temperature controlling link 270.

A plurality of arc-shaped idle portions 271a each having a radius of curvature with the output shaft 28a as the center are formed in the cam groove 271 of the temperature controlling link 270. When the pin 273 is fitted in the idle portion 271a, even if the temperature controlling link 270 is rotated, the pin 273 is not displaced, and the opening degree of the air mixing door is kept constant. A plurality of driving portions 271b in which the pin 273 is displaced by the rotation of the temperature controlling link 270 are formed alternately with the idle portions 271a.

An outlet mode link 274 is a plate-like member rotating around a rotary shaft 275, and is coupled to the temperature controlling link 270 through two coupling rods 276 and 277. By this, the outlet mode link 274 receives rotation displacement of the temperature controlling link 270 and is rotated. Three cam grooves 278, 279 and 280 are formed in the outlet mode link 274 along its outer peripheral portion.

Ends of driving levers 281, 282 and 283 are respectively coupled to the rotary shaft 20a of the defroster door 20, the rotary shaft 23a of the face door 23, and the rotary shaft 26a of the foot door 26. Pins 284 and 285 provided at the other ends of the driving levers 281 and 282 are respectively slidably fitted in the cam grooves 278 and 279. On this account, the defroster door 20 and the face door 23 are rotated and operated in the range of an angle θb and θc by the rotation of the outlet mode link 274 through the driving levers 281 and 282.

On the other hand, a groove portion 286 is formed at the other end portion of the driving lever 283 coupled to the rotary shaft 26a of the foot door 26, and a pin 288 at a tip end portion of a relay lever 287 is slidably fitted in the groove portion 286. The relay lever 287 is rotatable around a rotary shaft 289. A pin 290 is also disposed at an intermediate portion of the relay lever 287 between the rotary shaft 289 and the pin 288 at the tip end portion, and this pin 290 is slidably fitted in the cam groove 280.

By this, when the outlet mode link 274 is rotated, the rotation is transmitted to the relay lever 287 through the pin 290, so that the relay lever 287 is rotated around the rotary shaft 289, and here with, the foot door 26 is rotated and operated within the range of an angle θd through the driving lever 283.

A plurality of arc-shaped idle portions 278a, 279a and 280a and driving portions 278b, 279b and 280b are alternately formed in the three cam grooves 278, 279 and 280 as well. The idle portions 278a, 279a and 280a are portions in which similarly to the idle portion 271a, even if the outlet mode link 274 is rotated, the pins 284, 285 and 290 are not displaced, and the opening degree of the respective outlet mode doors 20, 23 and 26 are kept constant.

The driving portions 278b, 279b and 280b are portions in which the pins 284, 285 and 290 are displaced by the rotation of the outlet mode link 274 and the opening degree of the outlet mode doors 20, 23 and 26 is changed.

Further, in connection with the change of the operation angle of the output shaft 28a (temperature controlling link 270) of the motor actuator 28, when the pin 273 is positioned at the idle portion 271a of the cam groove 271 of the temperature controlling link 270, at least one of the pins 284, 285 and 290 is positioned at the driving portions 278b, 279b and 280b of the three cam grooves 278, 279 and 280 in the outlet mode link 274, and on the contrary, when the pin 273 is positioned at the driving portion 271b of the cam groove 271 of the temperature controlling link 270, all of the pins 284, 285 and 290 are positioned at the idle portions 278a, 279a and 280a of the three cam grooves 278, 279 and 280 in the outlet mode link 274.

That is, in connection with the change of the operation angle of the output shaft 28a (temperature controlling link 270) of the motor actuator 28, such structure is adopted that an idle function in which the door opening degree is not changed and a driving function in which the door opening degree is changed are alternately produced through the temperature controlling link 270 and the outlet mode link 274.

Figure 3:
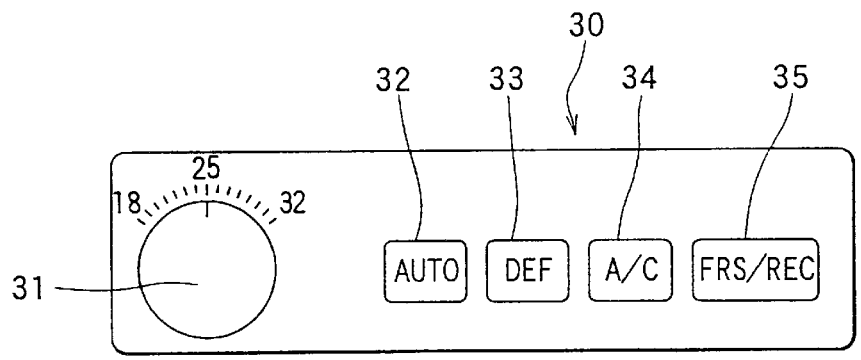
FIG. 3 is a front view showing an air conditioning operation panel (first embodiment)

Next, FIG. 3 shows an air conditioning operation panel 30 disposed near the front instrument board in the vehicle compartment. In this example, a temperature setting part 31 having a rotary knob as an operation member manually operated by the passenger is provided at the front of the air conditioning operation panel 30, and an auto-switch 32, a defroster-switch 33, an air conditioner switch 34, and an inside/outside air switch 35, which are manually operated through press buttons are provided.

The temperature setting part 31 generates a set temperature signal of the inside of the vehicle compartment. The auto-switch 32 outputs a start signal of air conditioning automatic control, and output a signal for intermitting the operation of an electric air blowing fan (not shown). The defroster switch 33 constitutes defroster instruction means of this embodiment, and outputs a signal of an instruction of a defroster mode.

The airconditioner switch 34 outputs a signal to intermit the operation of a compressor (not shown) of a cooling cycle for air conditioning. The in side/out side air switch 35 outputs a signal to perform inside/outside air switching of an inside/outside air switching box (not shown) of the lower unit.

Figure 4:
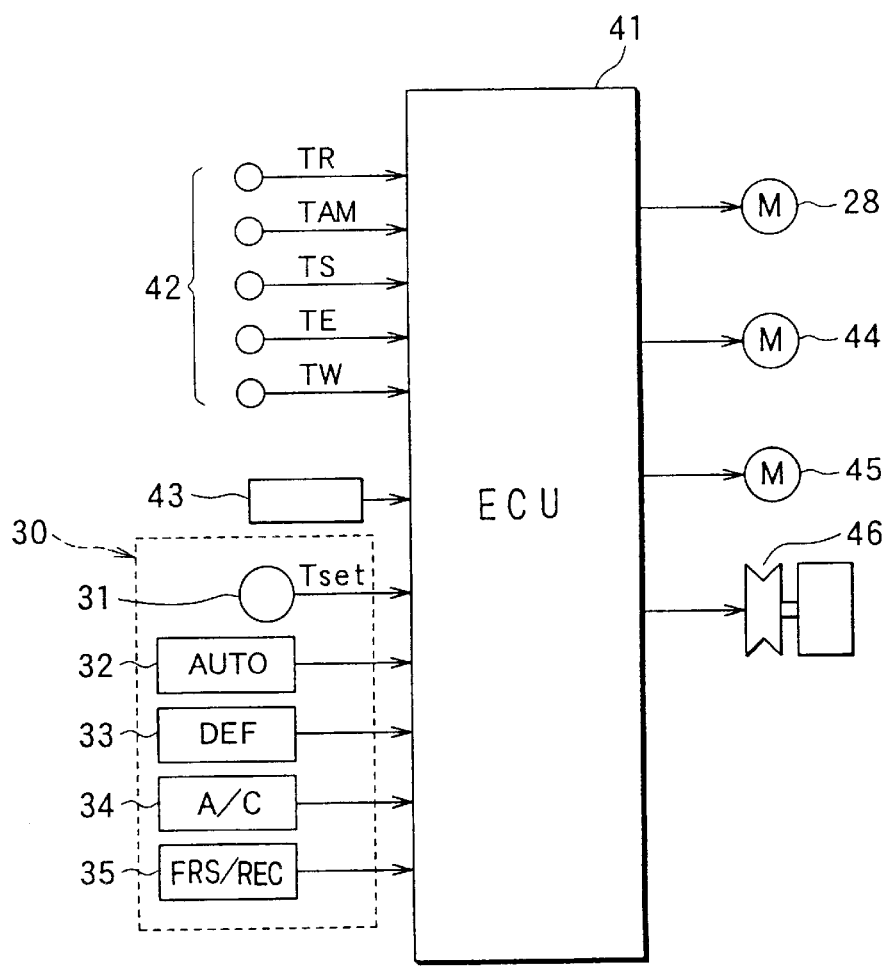
FIG. 4 is a block diagram of electric control (first embodiment)

Next, the outline of an electric control portion in this embodiment will be described with reference to FIG. 4. For automatic control of air conditioning, detection signals are inputted to an air conditioning electric control unit 41 from a well-known sensor group 42 for detecting inside air temperature TR, outside air temperature TAM, solar radiation amount TS, evaporator outlet temperature (evaporator cooling degree) TE, hot water temperature TW of the heater core 13, and the like.

Besides, in addition to a set temperature signal Tset of the inside of the vehicle compartment inputted from the temperature setting part 31 of the air conditioning operation panel, operation signals from the respective switches 32 to 35 are inputted to the air conditioning electric control unit 41. A potentiometer 43 is coupled to the output shaft 28a of the motor actuator 28 to detect an actual operation angle (rotation angle) of the motor actuator 28, and the detection signal of the operation angle of the motor actuator 28 is input from this potentiometer 43 to the air conditioning electric control unit 41.

The air conditioning electric control unit 41 is constituted by a well-known microcomputer made of CPU, ROM, RAM and the like, and its peripheral circuits, and a predetermined arithmetic processing is performed in accordance with a predetermined program to perform current application control of the motor actuator 28, a motor actuator 44 for driving the inside/outside air switching door (not shown), a motor 45 for driving the air blowing fan (not shown), an electromagnetic clutch 46 for intermitting the compressor operation, and the like.

Figure 5:
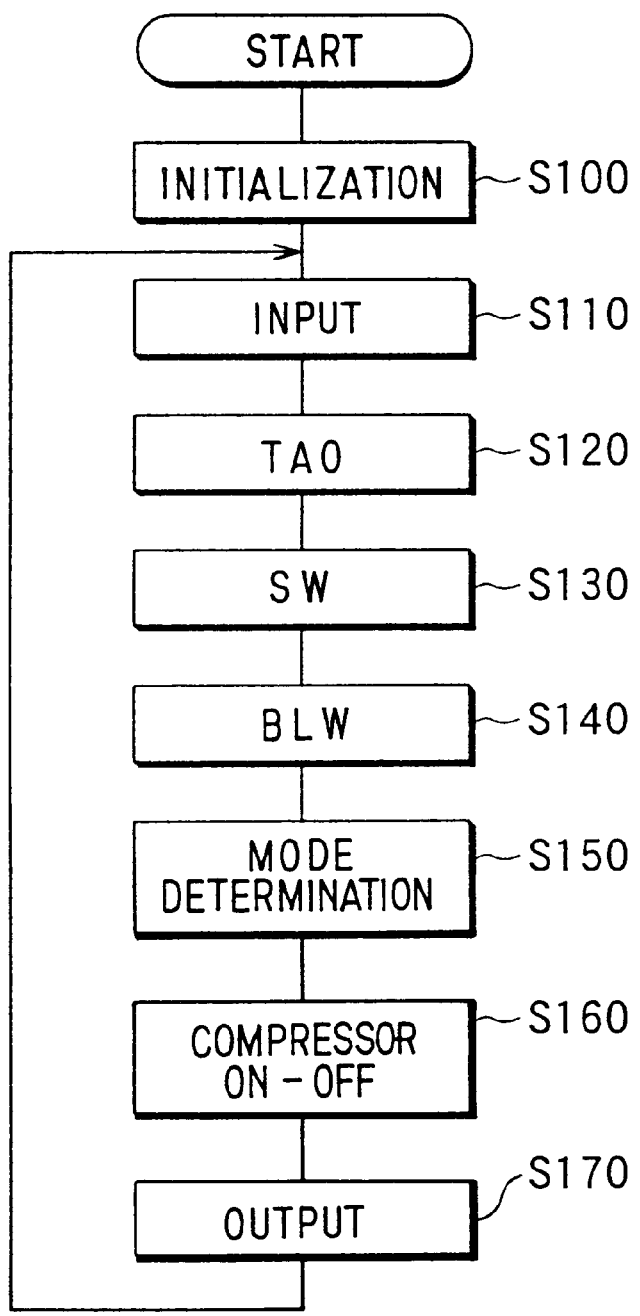
FIG. 5 is a flowchart showing an outline of air conditioning control (first embodiment)

Next, in the above structure, the operation of this embodiment will be described. A flowchart in FIG. 5 shows the outline of a control processing executed by the microcomputer of the air conditioning electric control unit 41, and a control routine in FIG. 5 is started when the auto-switch 32 of the air conditioning operation panel 30 is switched on in the state where an ignition switch of a vehicle engine is turned on and power is supplied to the control unit 41.

First, at step S100, a flag, a timer and the like are initialized, and at next step S110, the detection signals from the sensor groups and potentiometer 42 and 43, the operation signals from the air conditioning operation panel 30, and the like are read in.

Subsequently, at step S120, on the basis of the following numerical expression, an objective outlet temperature TAO of air-conditioning air blown into the vehicle compartment is calculated in accordance with the heat load conditions (inside air temperature TR, out side airtemperature TAM, solar radiation amount TS) of air conditioning. This objective outlet temperature TAO is an outlet temperature necessary for keeping the inside of the vehicle compartment the set temperature Tset of the temperature setting part 31.

$$TAO = Kset \times Tset - Kr \times TR - Kam \times TAM - Ks \times TS + C$$

Here, Kset, Kr, Kam, and Ks are control gains, Tset, TR, TAM, and TS are the foregoing set temperature, inside air temperature, outside air temperature, and solar radiation amount, and C is a constant for correction.

Next, the procedure proceeds to step S130, and an objective value SW of an operation angle of the motor actuator 28 for driving the air mixing door 16 and the outlet mode doors 20, 23 and 26 is calculated. A specific calculation method of the objective value SW of the operation angle will be described later on the basis of FIG. 6.

Next, at step S140, an objective blowing air volume BLW of air blown by the air-blow fan of the blower unit is calculated is on the basis of the TAO. A method of calculating this objective blowing air volume BLW is well known. The objective blowing air volume is made large at the high temperature side (maximum heating side) of the TAO and the low temperature side (maximum cooling side), and the objective blowing air volume is made small in an intermediate temperature region of the TAO.

Next, at step S150, the inside/outside air mode is determined in accordance with the TAO. As well known, with respect to this inside/outside air mode, as the TAO is raised from the low temperature side to the high temperature side, switching and setting such as inside air mode→outside air mode is carried out, or switching and setting such as full inside air mode→inside and outside air mixing mode→full outside air mode is carried out.

Next, at step S160, the ON-OFF operations of a compressor are determined. Specifically, on the basis of the TAO and the outside air temperature TAM, an objective evaporator outlet temperature TEO is calculated, and an actual evaporator outlet, temperature TE is compared with the objective evaporator outlet temperature TEO. When TE>TEO, the compressor is turned ON, and when TE≦TEO, the compressor is turned OFF.

Next, at step S170, various control values calculated at the respective steps S130 to S160 are outputted to the motor actuators 28 and 45, the motor 44 for driving the air blowing fan, and the electromagnetic clutch 46, and air conditioning control is performed. That is, the operation angle of the motor actuator 28 is controlled so that the actual operation angle detected by the potentiometer 43 coincides with the objective operation angle SW of the step S130.

Besides, in the blowing fan driving motor 44, an applied voltage is controlled and the number of revolutions is controlled so that the objective air volume BLW of the step S140 is obtained. The inside/outside air switching motor actuator 45 controls the operation position of an inside/outside air door (not shown) so that the inside/outside air mode of the step S150 is obtained. The electro magnetic clutch 46 makes the ON-OFF control of the compressor operation so that the actual evaporator outlet temperature TE becomes the objective evaporator outlet temperature TEO.

Next, a specific calculation method of the objective value SW of the operation angle of the motor actuator 28 will be described with reference to FIG. 6. At step S131, a temporal operation angle objective value SWD is calculated on the basis of the objective outlet temperature TAO. This temporal objective value SWD is concretely calculated from the following numerical expression.

$$SWD = \{(TAO-TE)/(TW-TE)\} \times K(°)$$

Here, K is a coefficient for converting an objective value of an opening degree ratio of the air mixing door 16 calculated through (TAO−TE)/(TW−TE) into an objective value of the operation angle of the actuator 28, TE is the foregoing evaporator outlet temperature, and TW is hot water temperature of the heater core 13.

Next, at step S132, it is determined whether the instruction of the defroster mode is issued from the defroster switch 33. When the instruction of the defroster mode does not exist, the procedure proceeds to step S133, and the objective value SW of the operation angle of the motor actuator 28 is made SW=SWD.

Figure 7:
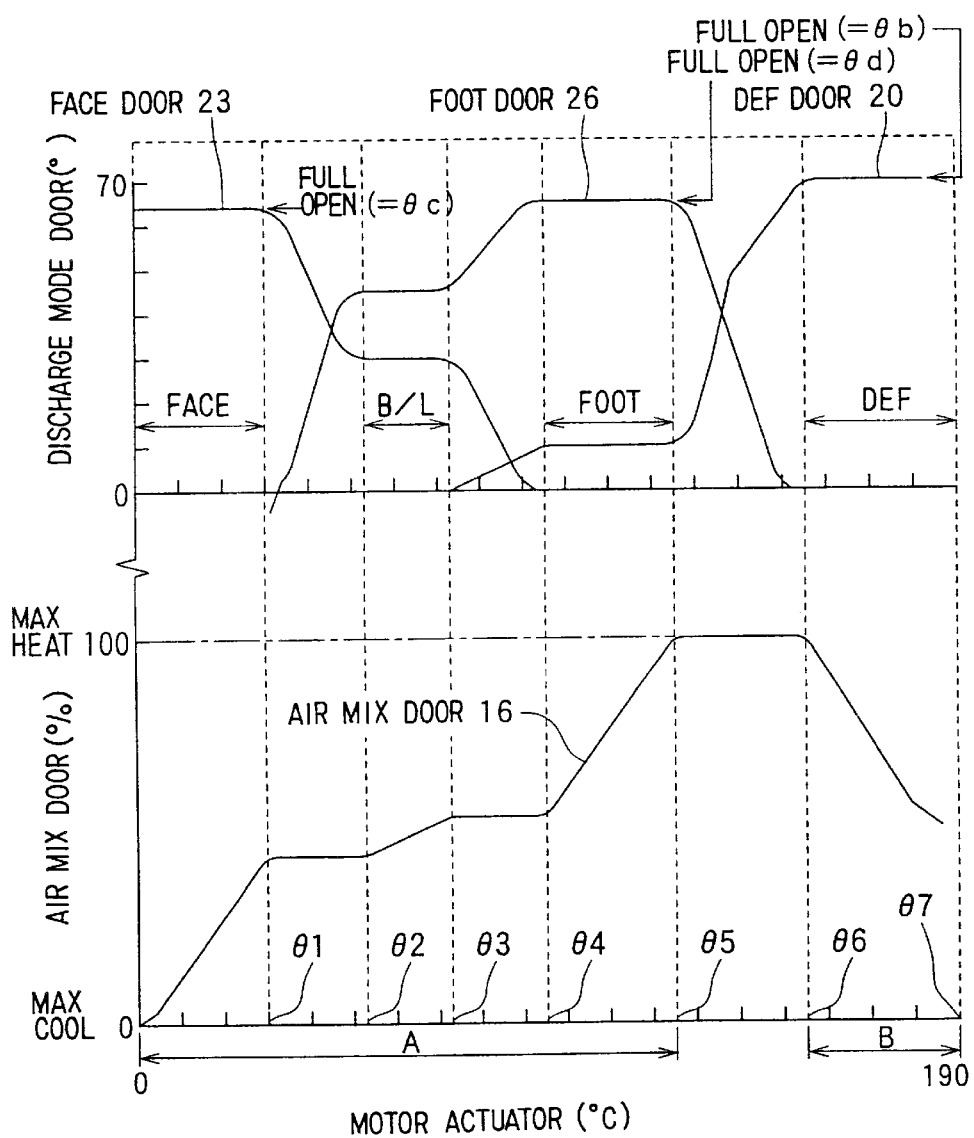
FIG. 7 is an explanatory view of operation characteristics (first embodiment)

Here, the operation at the step S133 will be specifically described with reference to FIG. 7. In FIG. 7, the horizontal axis indicates the operation angle (°) of the motor actuator 28, and the vertical axis indicates the opening degree (%) of the air mixing door 16 and the rotation angles (°) of the outlet mode doors 20, 23 and 26. Region A of the horizontal axis indicates a temperature control region of the operation angle of the motor actuator 28. This temperature control region A includes an operation angle range (range from 0° of the horizontal axis of FIG. 7 to a predetermined value θ5) determined by the above temporal objective value SWD.

When SWD≦0°, the actual operation angle of the motor actuator 28 is made 0°, and the opening degree of the air mixing door 16 is made the maximum cooling position of 0%. This maximum cooling position is a position where the air passage of the heater core 13 is fully closed as indicated by the solid line of FIG. 1, and the cooling air bypass passage 15 is fully opened.

As the objective value SWD of the operation angle is sequentially increased from 0 to θ1, θ2, θ3 and θ4, the opening degree of the air mixing door 16 is increased, and when the SWD is increased to θ5, the air mixing door 16 is operated to the maximum heating position of the opening degree: 100% by the motor actuator 28. This maximum heating position is, as indicated by a two-dot chain line of FIG. 1, a position where the cool air bypass passage 15 is fully closed and the air passage of the heater core 13 is fully opened.

Like this, in the temperature control region A of the operation angle of the motor actuator 28, the opening degree (operation position) of the air mixing door 16 is continuously changed from the maximum cooling position of 0% to the maximum heating position of the door opening degree= 100%, so that the mixing ratio of the cool and warm air is adjusted and the outlet temperature into the vehicle compartment can be controlled.

At the same time as this, in the temperature control region A, the outlet mode is changed in conjunction with the change of the opening degree of the air mixing door 16 as follows: That is, in an interval where the operation angle (objective value SWD) of the motor actuator 28 is 0 to θ1, the rotation angles of the defroster door 20 and the foot door 26 among the three outlet mode doors become 0 through the link mechanism 27 of FIG. 2, and the defroster opening portion 19 and the foot opening portion 24 are fully closed. On the other hand, the rotation angle of the face door 23 becomes maximum (rotation angle=θc), and the face outlet 22 is fully opened, so that the face mode in which air is blown to the head side of the passenger is set.

Next, in a range of the operation angle=θ1 to θ2, the defroster door 20 keeps the fully closed state of the defroster outlet 19, and the face door 23 and the foot door 26 respectively open the face outlet 22 and the foot outlet 24 at a predetermined opening degree, so that the bi-level (B/L) mode in which air is blown to both the head side of the passenger and the foot side is set. In this range of θ1 to θ2, the opening degree of the air mixing door 16 can be kept constant. In a range of the next operation angle=θ2 to θ3, the doors 20, 23, and 26 are not displaced, and the bi-level mode is kept.

Next, in a range of the operation angle=θ3 to θ4, the rotation angle of the face door 23 becomes 0 so that the face outlet 22 is fully closed, and further, the rotation angle of the foot door 26 becomes maximum (rotation angle=θd) so that the foot outlet 24 is fully opened. Besides, the defroster door 20 is rotated by a small angle, and the defroster outlet portion 19 is opened by a small opening degree. By this, the foot mode in which air is mainly blown to the foot side of the passenger and a small amount of air is blown to the side of the window glass is set. Also in this range of θ3 to θ4, the opening degree of the air mixing door 16 is kept constant. In a range of the next operation angle=θ4 to θ5, the doors 20, 23 and 26 are not displaced, and the foot mode is kept.

Here, in intermediate ranges of the operation angle=θ1 to θ2, and θ3 to θ, the outlet mode doors 20, 23, 26 rotate, so that the opening degree of the air-mixing door 16 is constantly maintained.

As described above, in the temperature control region A, the change of the opening degree (outlet temperature control) of the air mixing door 16 and the switching (switching among the respective modes of face, bi-level and foot) of the outlet mode can be alternately carried out by the change of the operation angle of the one common motor actuator 28.

Figure 6:
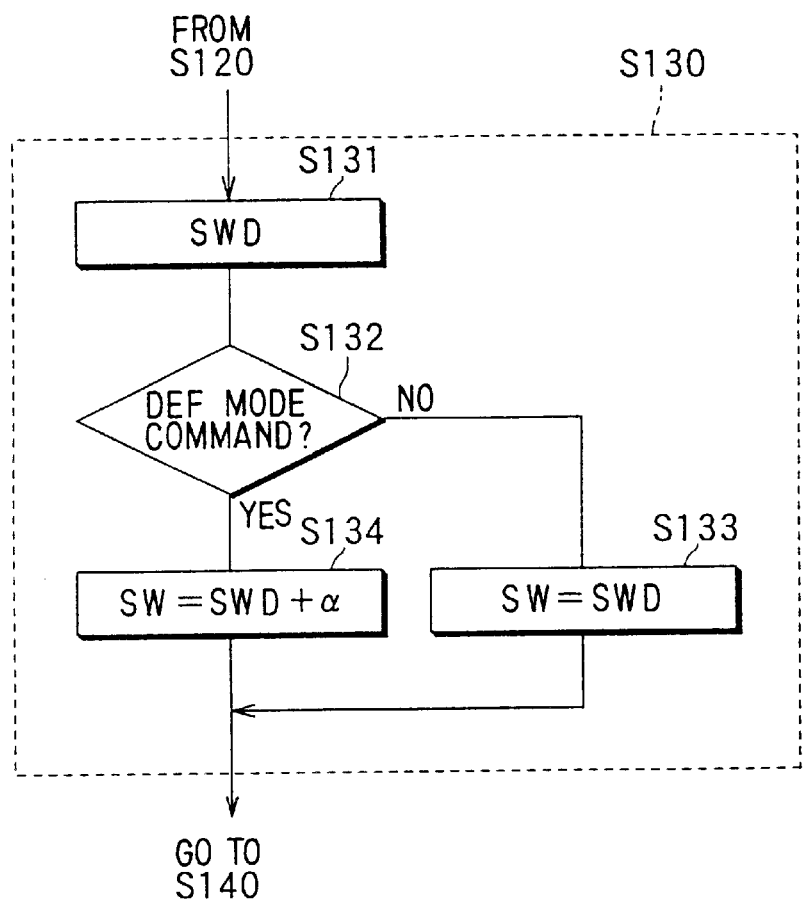
FIG. 6 is a flowchart of a main portion of FIG. 5 (first embodiment)

When the passenger determines the necessity of removing fog of the window glass and the defroster switch 33 is switched on, at the step S132 of FIG. 6, it is determined that the instruction of the defroster mode has been issued, and the procedure proceeds to step S134. At this step S134, a predetermined value a is added to the foregoing objective value SWD, and the objective value of the operation angle of the motor actuator 28 is calculated as SW=SWD+α.

This predetermined value α is for forcibly increasing the operation angle of the motor actuator 28 to an angle range larger than θ6 (θ6>θ5) of FIG. 7, and by addition of this predetermined value a, the operation angle of the motor actuator 28 is shifted to the defroster setting region B positioned-outside of the range of the temperature control region A.

In this defroster setting region B, the rotation angles of the face door 23 and the foot door 26 become 0 so that both the face opening portion 22 and the foot opening portion 24 are fully closed, and further, the rotation angle of the defroster door 20 becomes maximum (rotation angle=θb) so that the defroster opening portion 19 is fully opened. Thus, the defroster mode is set. By this, the whole amount of blown air can be blown to the side of the window glass, and the power to remove the fog of window glass can be exerted at the maximum. Also in the defroster setting region B, by changing the predetermined value a, the opening degree of the air mixing door 16 is changed and the outlet temperature can be controlled.

Further, according to this embodiment, since the air mixing door 16 and the outlet mode doors 20, 23 and 26 are alternately operated by the one motor actuator 28 through the link mechanism 27 shown in FIG. 2, the following effects can be obtained.

Here, in an intermediate range of the operation angle =θ5 to θ6, the foot door 26 and defroster door 20 rotates for switching into the defroster mode, so that the opening degree of the air-mixing door 16 does not change to maintain the maximum heating position.

That is, as already described on the basis of FIG. 2, the link mechanism 27 is constructed such that in response to the change of the operation angle of the output shaft 28a of the motor actuator 28, the idle function where the door opening degree is not changed and the driving function where the door opening degree is changed are alternately produced through the temperature controlling link 270 and the outlet mode link 274.

Thus, as shown in FIG. 7, in response to the change of the operation angle of the output shaft 28a of the motor actuator 28, it is possible to alternately set the intervals 0 to θ1, θ2 to θ3, θ4 to θ5, and θ6 to θ7 where the opening degree of the air mixing door 16 is changed and the outlet mode doors 20, 23 and 26 are not changed, and the intervals θ1 to θ2,θ3 to θ4, and θ5 to θ6 where at least one of the outlet mode doors 20, 23 and 26 is rotated and displaced, and the opening degree of the air mixing door 16 is not changed.

By this, since the one motor actuator 28 does not drive both the air mixing door 16 and the outlet mode doors 20, 23 and 26 at the same time, the number of doors driven by the one motor actuator 28 at the same time can be decreased, and the increase of the necessary operation torque (work amount) of the motor actuator 28 can be suppressed.

Besides, the intervals θ1 to θ2, θ3 to θ4, and θ5 to θ6 are intervals where switching of the outlet mode is performed by the change of the opening degree of the outlet mode doors 20, 23 and 26, and since transit is made in a very short time of about several seconds, use of the outlet mode doors 20, 23 and 26 in a state of a minute opening degree can be avoided. Thus, it is also possible to prevent such disadvantage as generation of an abnormal sound due to abrupt reduction or abrupt enlargement of air flow by the state of the minute opening degree of the door.

Second Embodiment

In the above embodiment 1, in the temperature control region A of the operation angle of the motor actuator 28, as the operation angle of the motor actuator 28 is increased, the outlet mode is changed in the sequence of face mode→bi-level mode→foot mode. In the embodiment 2, in the temperature control region A, a foot defroster mode is set subsequently to the foot mode.

The foot defroster mode is generally used at a cold time, and is a outlet mode in which substantially the same amount of air is blown to the window glass side and the foot side of the passenger from the defroster opening portion 19 and the foot opening portion 24, so that both the removing power of the fog of the window glass and the heating power of the foot of the passenger are raised.

Figure 8:
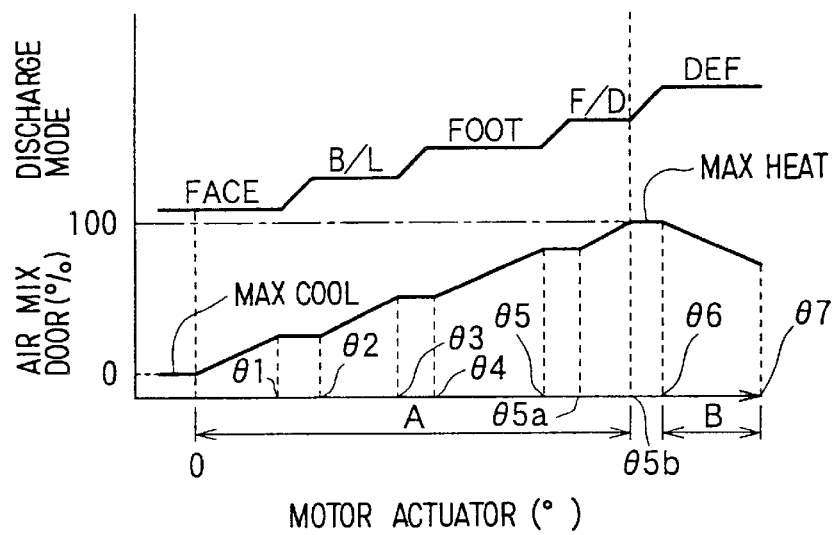
FIG. 8 is an explanatory view of operation characteristics (second embodiment)

In view of this, in the second embodiment, as shown in FIG. 8, in a region of the temperature control region A where the operation angle of the motor actuator 28 becomes maximum, that is, in a region (θ5a to θ5b) where the A/M opening degree is adjacent to the maximum heating position and becomes maximum, the foot defroster mode is set.

Thus, in the second embodiment, as the operation angle of the motor actuator 28 is increased, the outlet mode is changed in the sequence of face mode→bi-level mode→foot mode→foot defroster mode in the temperature control region A.

Third Embodiment

In the second embodiment, in the region of the temperature control region A where the operation angle of the motor actuator 28 becomes maximum, the foot defroster mode is set. However, both the defroster mode and the foot defroster mode may be set in the defroster mode setting region B. The embodiment 3 relates to a setting pattern of such outlet modes.

Figure 9:
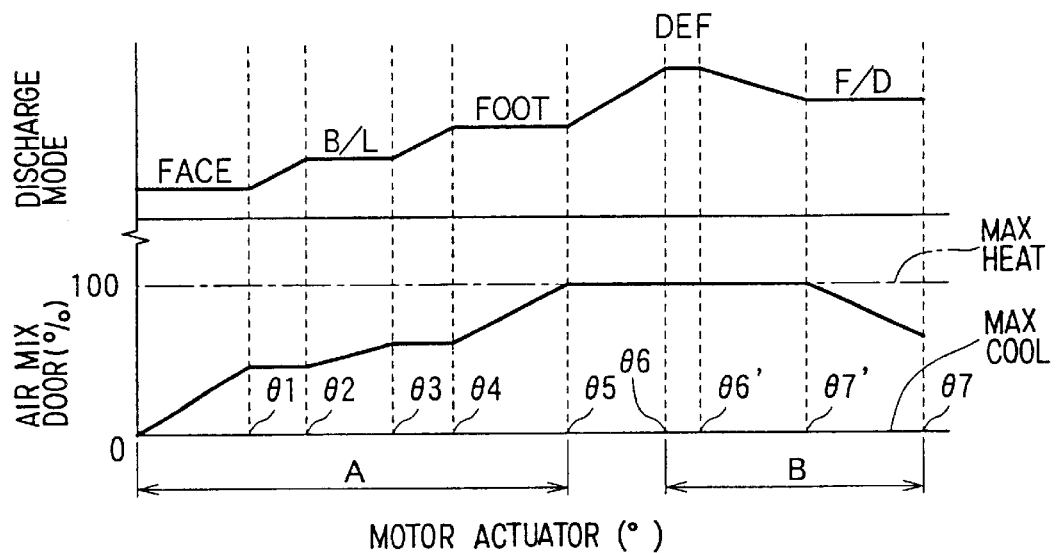
FIG. 9 is an explanatory view of operation characteristics (third embodiment)

Specifically, as shown in FIG. 9, at the side (side of θ6 to θ6') where the operation angle of the motor actuator 28 is small in the defroster setting region B, the defroster door 20 is fully opened to set the defroster mode. Besides, at the side (side of θ7 to θ7') where the operation angle of the motor actuator 28 is large in the defroster setting region B, both the defroster door 20 and the foot door 26 are operated to the positions of substantially the same opening degree, so that the foot defroster (F/D) mode is set.

Incidentally, in the example of FIG. 9, at the time of the defroster mode, the air-mixing door 16 is kept at the fully opened position (maximum heating position) to keep the power to remove the fog of the window glass maximum.

Fourth Embodiment

Figure 10:
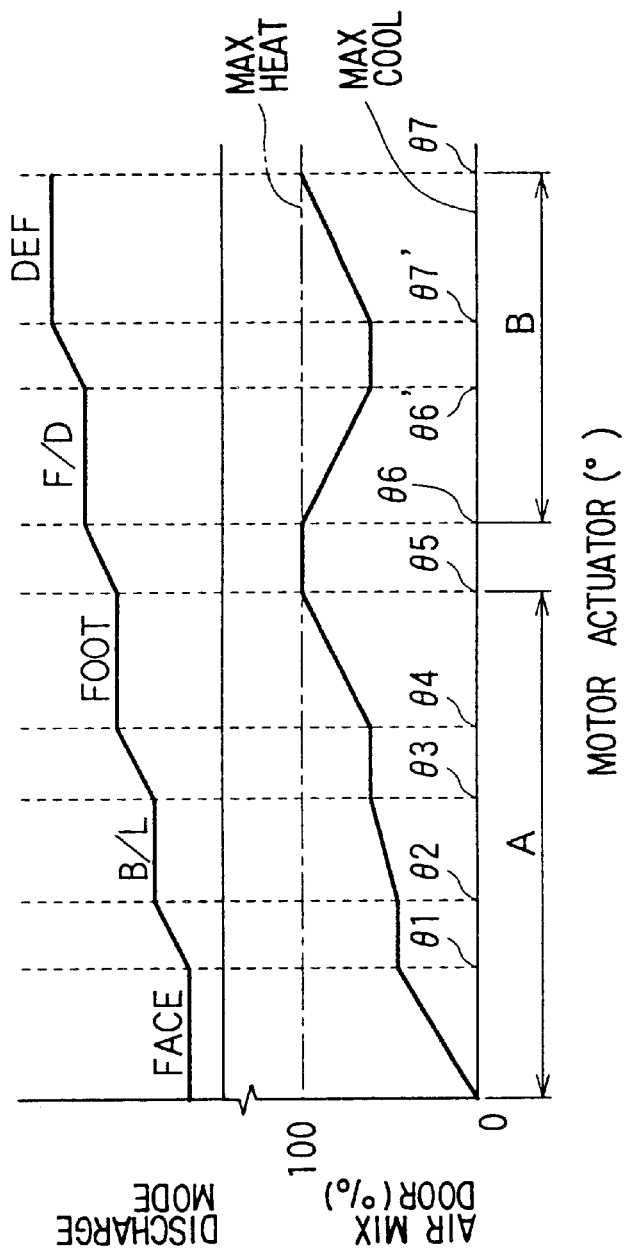
FIG. 10 is an explanatory view of operation characteristics of (fourth embodiment)

FIG. 10 shows the fourth embodiment, and in the case where both the defroster mode and the foot defroster mode are set in the defroster mode setting region B, the foot defroster (F/D) mode in which both the defroster door 20 and the foot door 26 are operated to positions of substantially the same opening degree is set at the side (side of θ6) where the operation angle of the motor actuator 28 is small. Besides, at the side (side of θ7) where the operation angle of the motor actuator 28 is large, the defroster door 20 is fully opened to set the defroster mode.

In the example of FIG. 10, in both the defroster mode and the foot defroster mode, the opening degree of the air-mixing door 16 is changed so that the blown air temperature can be adjusted.

Fifth Embodiment

According to the above-described first through fourth embodiments, as shown in FIGS. 7 to 11, in the intervals θ1 to θ2, θ3 to θ4, and the like where the outlet mode is changed, only the outlet mode doors 20, 23 and 26a rerotated and displaced, and the air mixing door 16 is stopped so that the opening degree of the air mixing door 16 is not changed. In the embodiment 5, as shown by the solid line of FIG. 11, the air mixing door 16 is slightly returned to the opening degree decreasing side (maximum cooling side) in the interval θ1 to θ2.

By this, there is a merit that an adjustment range (that is, a outlet temperature adjustment range into the vehicle compartment) of the opening degree of the air-mixing door in the bi-level mode can be enlarged.

According to the fifth embodiment, in the interval θ1 to θ2 where the outlet mode doors 20, 23 and 26 are rotated and displaced, the air mixing door 16 is also rotated and displaced at the same time. However, since the amount of displacement of the air mixing door 16 is made small as compared with the other intervals θ0 to θ1, θ2 to θ3, and the like, an increase in the amount of work by driving of the air mixing door 16 is slight and there is no problem.

Figure 11:
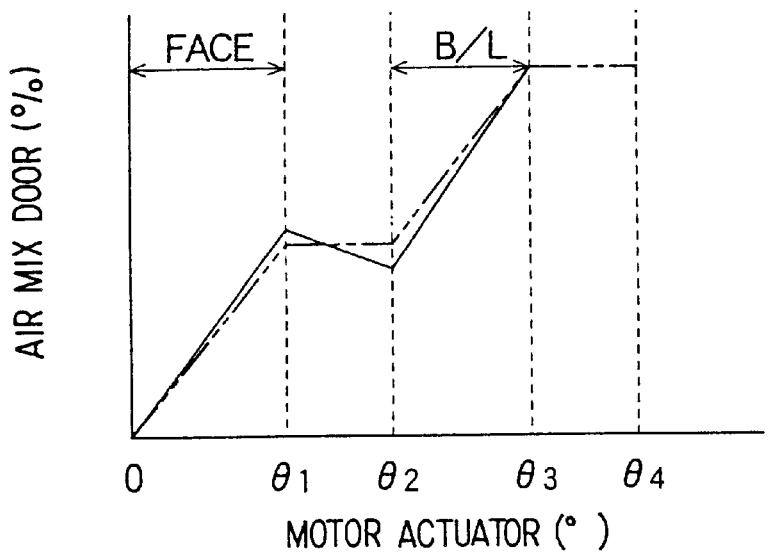
FIG. 11 is an explanatory view of operation characteristics (fifth embodiment)

Besides, in the control characteristics of FIG. 11, although the opening degree of the air-mixing door 16 is kept constant in the interval of θ3 to θ4, the air mixing door 16 may be slightly returned to the opening degree decreasing side also in this interval of θ3 to θ4.

Sixth Embodiment

Figure 12:
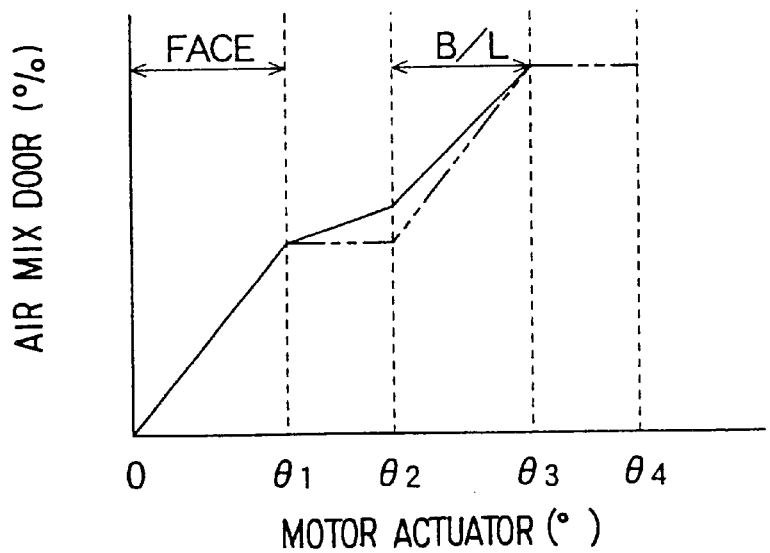
FIG. 12 is an explanatory view of operation characteristics (sixth embodiment)

In the sixth embodiment, as denoted by the solid line of FIG. 12, contrary to the fifth embodiment, the air-mixing door 16 is slightly increased to the opening degree increasing side (maximum heating side) in the above range θ1 to θ2.

Here, a two-dot chain line in FIG. 12 indicates operation characteristics in which only the outlet mode doors 20, 23 and 26 are rotated and displaced in the interval θ1 to θ2 like the embodiments 1 to 4, and the air-mixing door 16 is stopped so that the opening degree of the air-mixing door 16 is not changed. When the face mode is changed to the bi-level mode, air having a large ratio of cool air is blown from the side of the face outlet 22, and air having a small ratio of cool air is blown from the side of the foot outlet 24. Thus, when the face mode is changed to the bi-level mode while the opening degree of the air mixing door 16 is constant like the operation characteristics of the two-dot chain line in FIG. 12, there is a case where the face side outlet temperature becomes lower than that at the time of the face mode immediately after the switching to the bi-level mode, so that the passenger feels that something is wrong.

On the other hand, according to the sixth embodiment, with the switching to the bi-level mode, the air-mixing door 16 is slightly changed to the opening degree increasing side (maximum heating side). Thus, the face side outlet temperature immediately after the switching to the bi-level mode can be made a level equal to that at the face mode. By this, the face side outlet temperature can be continuously (linearly) changed from the face mode to the bi-level mode, and the air conditioning feeling of the passenger can be improved.

Seventh Embodiment

FIGS. 13A and 13B show results where operation torque of the motor actuator 28 is measured under the condition of blower speed: highest speed (Hi), and show variations of the operation torque in the case where the air-mixing door 16 and the outlet mode doors 20, 23 and 26 are alternately driven by the operation pattern of the fourth embodiment (FIG. 10). FIG. 13A shows measurement values of the operation torque in the case where the outlet mode is changed from the face mode to the defroster mode, and FIG. 13B shows measurement values of the operation torque in the case where the outlet mode is changed from the defroster mode to the face mode contrary to the former case.

As is understood from the results of FIGS. 13A and 13B, in accordance with the variations of the operation position of the air mixing door 16 and the outlet mode doors 20, 23 and 26, the operation torque is largely varied in the range of 0.1 to 0.5 N·m. The operation torque of the air mixing door 16 is increased to 0.5 N·m in the case where the air-mixing door 16 is changed from the maximum heating position (position of the two-dot chain line of FIG. 1) to the maximum cooling side against wind pressure.

The reason why the operation torque is increased to 0.4 N·m by the driving of the outlet mode doors 23 and 26 when the face mode is changed to the bi-level mode is that the face door 23 and the foot door 26 have relatively large door areas, and the amount of door rotation is also large. Under any operation condition other than the above, the operation torque becomes a small value of 0.3 N·m or less.

In the seventh embodiment, as the motor actuator 28, a motor which can operate if the operation torque is 0.7 N·m or less, is used. Then, in the seven the embodiment, especially, only under a condition where the operation torque is increased to a value larger than 0.7 N·m, the air mixing door 16 and the outlet mode doors 20, 23 and 26 are alternately driven, and under a condition where the operation torque is decreased to 0.7 N·m or less, the air-mixing door 16 and the outlet mode doors 20, 23 and 26 are driven at the same time.

At the time of mode switching from the face mode to the defroster mode side, as shown in FIG. 13A, if air mixing door driving (driving of maximum heating position–door opening degree decreasing side) at the foot defroster mode and mode switching before or after that are performed at the same time, the total of the operation torque is increased to 0.8 N·m or more, and the motor actuator 28 becomes inoperative.

On the contrary, at the time of mode switching from the defroster mode to the face mode side, as shown in FIG. 13B, when air mixing door driving (driving of maximum heating position–door opening degree decreasing side) at the foot mode and mode switching of foot mode→bi-level mode are performed at the same time, the total of the operation torque is increased to 0.8 N·m or more, and the motor actuator 28 becomes inoperative.

Thus, in the seventh embodiment, in an operation region other than the above conditions where the motor actuator 28 becomes inoperative, the air-mixing door 16 and the outlet mode doors 20, 23 and 26 are driven at the same time.

Figure 14:
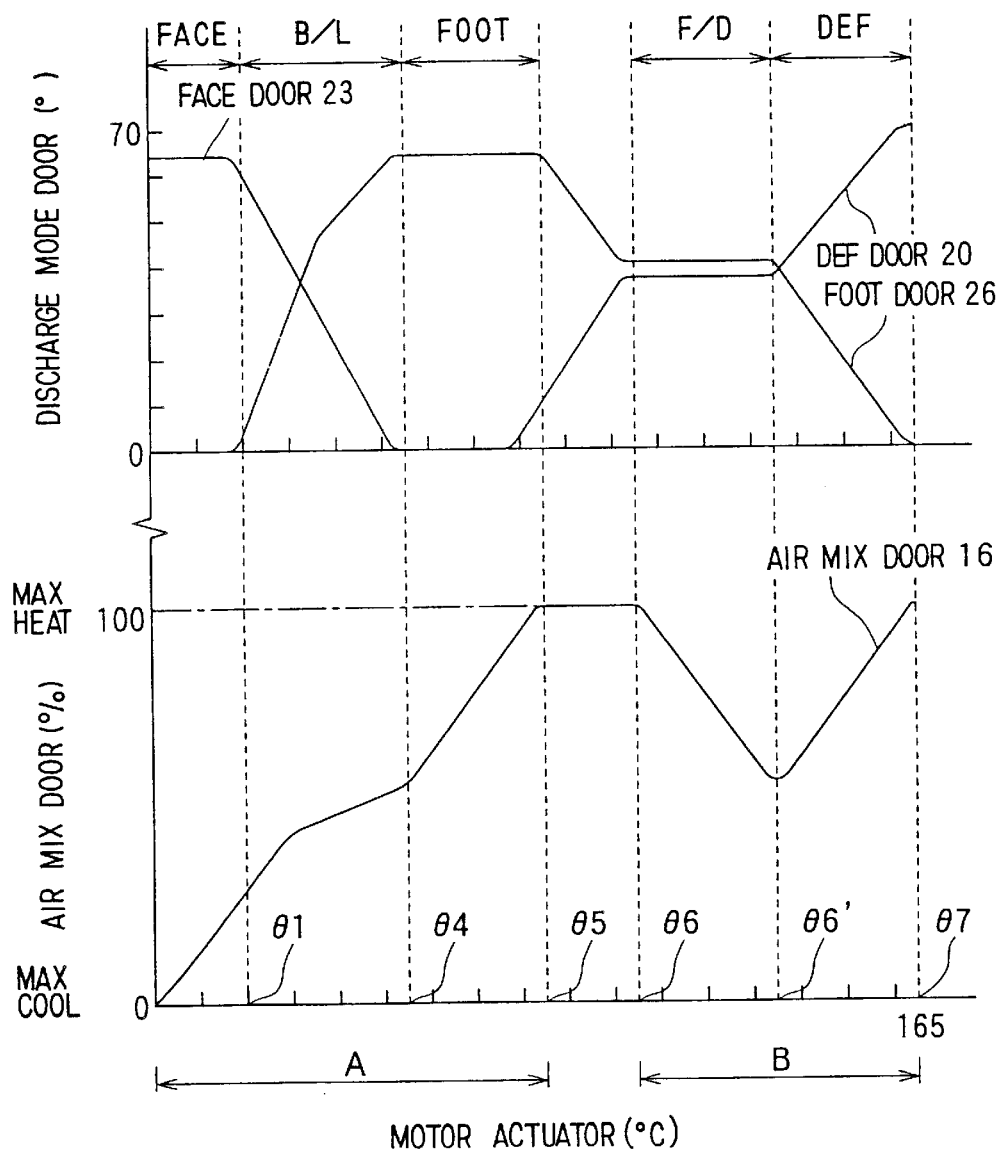
FIG. 14 is an explanatory view of operation characteristics of a link mechanism (seventh embodiment)

FIG. 14 shows a specific example of an operation pattern according to the seventh embodiment. Rotation angles of the face door 23 and the foot door 26 are continuously changed in the range of θ1 to θ4 of the operation angle of the motor actuator 28, so that an upper and lower outlet ratio in the bi-level mode is changed, and further, the opening degree of the air mixing door 16 is continuously changed.

Besides, rotation angles of the defroster door 20 and the foot door 26 are continuously changed in the range of θ6, to θ7 of the operation angle of the motor actuator 28, so that an upper and lower outlet ratio in the defroster mode is changed, and further, the opening degree of the air mixing door 16 is continuously changed.

That is, in the ranges of θ1 to θ4 and θ6' to θ7 of the operation angle of the motor actuator 28, the air mixing door 16 and the outlet mode doors 20, 23, and 26 are driven at the same time. However, in the operation angle ranges, as is understood from FIG. 13, the operation torque of the motor actuator 28 is lowered, so that a harmful effect of an increase in operation torque by concurrent driving does not become a problem in practice.

Like the seventh embodiment, by providing the interval where the air mixing door 16 and the outlet mode doors 20, 23 and 26 are concurrently driven under the condition where the operation torque is lowered, the whole operation angle of the motor actuator 28 can be decreased, and the door driving link mechanism 27 can be simplified by the decrease of the whole operation angle.

Eighth Embodiment

Figure 15:
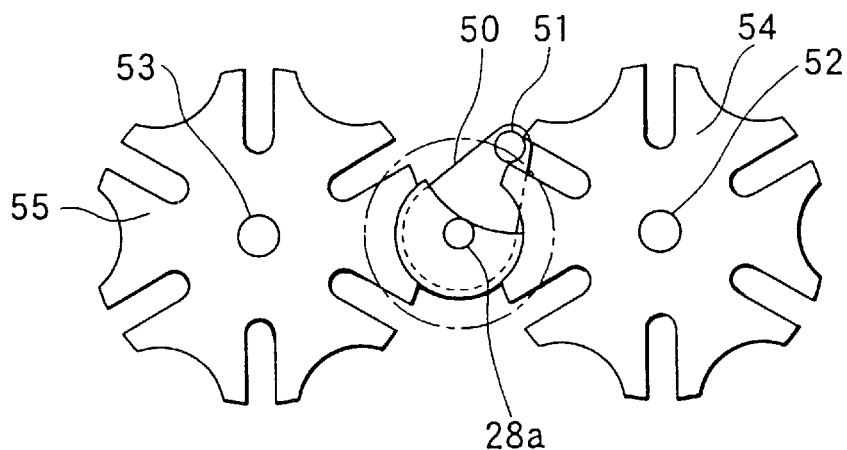
FIG. 15 is an explanatory view of a main portion of a door driving mechanism according (eighth embodiment)

In the first embodiment, both the temperature controlling link 270 and the outlet mode link 274 of the door driving link mechanism 27 are made to have the idle function where the door opening degree is not changed, so that the air mixing door 16 and the outlet mode doors 20, 23 and 26 are alternately driven in response to the change of the operation angle of the one motor actuator 28. In the eighth embodiment shown in FIG. 15, the idle function of the link mechanism is not used, but the air mixing door 16 and the outlet mode doors 20,23 and 26 are alternately driven by an intermittent operation gear mechanism.

The intermittent operation gear mechanism of the embodiment 8 will be specifically described. A driving lever 50 is integrally coupled to the output shaft 28a of the motor actuator 28, and a pin 51 is provided at the tip portion of the driving lever 50. First and second follower shafts 52 and 53 are disposed at both sides of the output shaft (driving shaft) 28a in parallel with each other. The first follower shaft 52 is coupled to the rotary shaft 16a of the air mixing door 16 through a suitable link mechanism, and the second follower shaft 53 is coupled to the rotary shafts 20a, 23a and 26a of the outlet mode doors 20, 23 and 26 through a suitable link mechanism.

Geneva gears 54 and 55 are integrally coupled to the first and second follower shafts 52 and 53, respectively, and groove portions 54a and 55a with which the pin 51 can be engaged (fitted in) are formed at the outer periphery of the Geneva gears 54 and 55 at intervals of 60°.

Thus, when the output shaft 28a makes a turn, the first follower shaft 52 and the second follower 53 are alternately intermittently rotated every 60° through the Geneva gears 54 and 55. Like this, the air mixing door 16 and the outlet mode doors 20, 23 and 26 can be alternately driven by using the intermittent operation gear mechanism.

Ninth Embodiment

Figure 16:
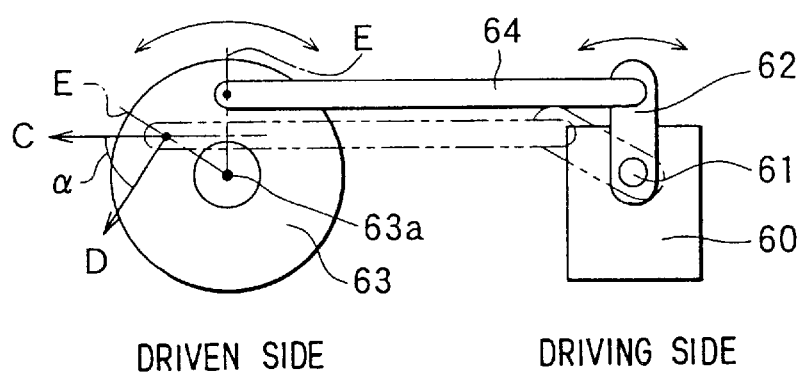
FIG. 16 is an explanatory view of a link mechanism for explaining a problem to be solved (ninth embodiment)

The ninth embodiment relates to a door (air conditioning instrument) driving apparatus including the link mechanism 27 shown in FIG. 2. First, a problem to be solved by the ninth embodiment will be described with reference to FIG. 16. FIG. 16 shows a basic structure of a door-driving link in an air conditioner for a vehicle, in which a driving lever 62 is integrally coupled to an output shaft 61 of a motor actuator 60, and this driving lever 62 is coupled to a follower link 63 through one coupling rod 64. Coupling portions of both ends of this coupling rod 64 form movable joints rotatable with respect to the driving lever 62 and the follower link 63.

Like this, when the driving lever 62 is coupled to the follower link 63 through the one coupling rod 64, the relation between a transmission direction C of operation force from the coupling rod 64 and a rotation direction D of the follower link 63 is always changed by the position (angle) of the coupling rod 64. Here, the operation force transmission direction C is a longitudinal direction of the coupling rod 64, and the rotation direction D is a right-angle direction to a normal connecting a rotation center 63a of the follower link 63 and the coupling portion (movable joint) of the coupling rod 64.

An angle α between the operation force transmission direction C and the rotation direction D is always changed by the position of the coupling rod 64. In FIG. 16, at a solid line position of the coupling rod 64, the angle α=0, and in this state, since the operation force transmission direction is coincident with the rotation direction D, an operation force (force in a pushing direction or force in a pulling direction) is most easily transmitted from the coupling rod 64 to the follower link 63.

On the other hand, in the case where the operation force transmission direction C is positioned on the rotation center 63a of the follower link 63, the angle α=90°, and in this state, since the operation force transmission direction C is deviated from the rotation direction D by 90°, the operation force (force in the pushing direction or force in the pulling direction) can not be transmitted from the coupling rod 64 to the follower link 63.

Specifically, when the angle α is increased to 60° or more, it becomes hard to transmit the operation force from the coupling rod 64 to the follower link 63. On this account, in the door driving link mechanism of FIG. 16, in order to prevent the angle α from increasing to 60° or more, the operation angle (rotation angle) of the link mechanism is restricted within the range of about 120°.

Incidentally, when the coupling rod 64 is located at the position of angle α=90°, this positional relation is such that transmission of the operation force from the coupling rod 64 becomes impossible, and the position of this angle α=90° is called a change point in the present specification.

When there occurs a necessity of setting the operation angle of the link mechanism to 180° or more, in the door driving link mechanism of FIG. 16, the coupling rod 64 passes through the change point in the middle of the operation (rotation) without fail, and there occurs a state where the operation force can not be transmitted from the coupling rod 64 to the follower link 63. Thus, in the door driving link mechanism of FIG. 16, it is impossible to drive the follower link 63 at the operation angle exceeding 180°, and it cannot cope with a request of setting a wide operation angle range.

In view of the above, the ninth embodiment has an object to provide a door driving apparatus in which even if an operation angle of a link mechanism is changed, an operation force can be always easily transmitted from the coupling rod 64 to the follower link 63, and the follower link 63 can be driven over a wide operation angle range.

Figure 17:
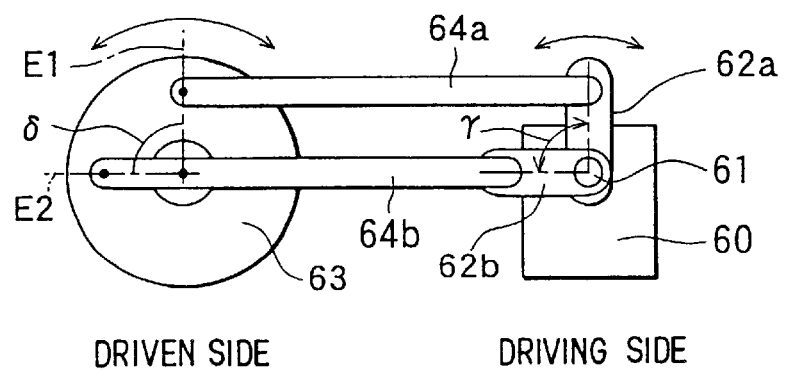
FIG. 17 is an explanatory view of a main portion of a link mechanism (ninth embodiment)

FIG. 17 shows a door driving link mechanism according to the embodiment 9, and two driving levers (driving side members) 62a and 62b are integrally coupled to the output shaft 61 of the motor actuator 60. Here, the two driving levers 62a and 62b are arranged such that their center lines in the respective longitudinal directions are deviated from each other by a predetermined angle (specifically 90°), and are coupled to the output shaft 61. On this account, coupling portions between two coupling rods 64a and 64b and the two driving levers 62a and 62b are deviated from each other by 90° with respect to the center (rotation center of the driving lever) of the output shaft 61.

Tip portions of the two driving levers 62a and 62b are coupled to the disk-shaped follower link (follower side member) 63 through the separate coupling rods 64a and 64b in parallel. Coupling portions of both ends of the two coupling rods 64a and 64b form movable joints rotatable to the driving levers 62a and 62b and the follower link 63.

Rotary shafts of air conditioning doors to be driven are respectively coupled to the output shaft 61 and the follower link 63, and the air conditioning doors are opened and closed in accordance with the rotation displacement of the out put shaft 61 and the follower link 63. In this example, the two coupling rods 64a and 64b are set into linear shapes of the same size.

Figure 18A:
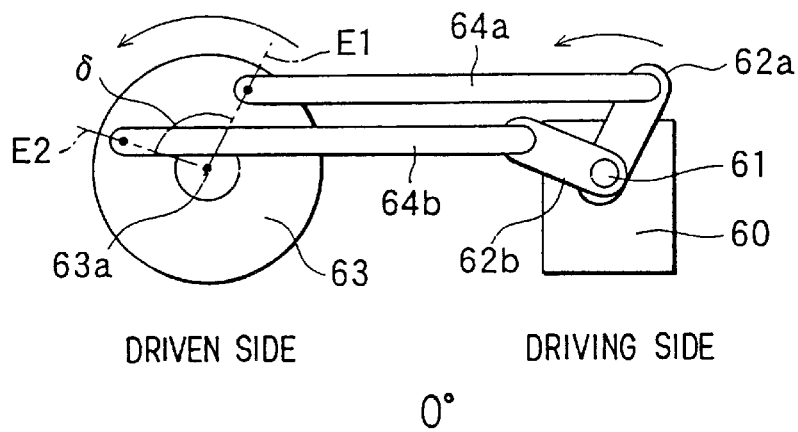
FIGS. 18A to 18C are operation explanatory views of the link mechanism (ninth embodiment)
Figure 18B:
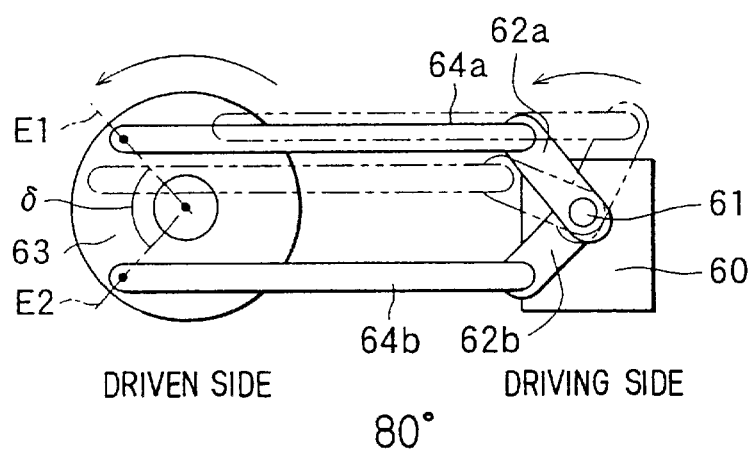
Figure 18C:
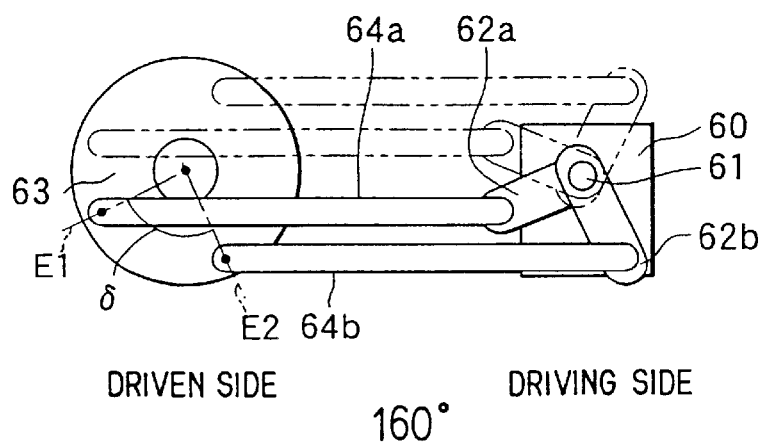

Because of the structure as described above, an angle δ between a normal E1 connecting the rotation center 63a of the follower link 63 to the coupling portion (movable joint) of the one couplingrod 64a and anormal E2 connecting the rotation center 63a of the follower link 63 to the coupling portion of (movable joint) of the other coupling rod 64b is always kept to the same value (90°) as the angle γ as shown in FIGS. 18A to 18C.

FIGS. 18A to 18C are operation explanatory views of the link mechanism according to the ninth embodiment. FIG. 18A shows a state of operation angle=0°, FIG. 18B shows a state of operation angle=80°, and FIG. 18C shows a state of operation angle 160°.

Figure 19A:
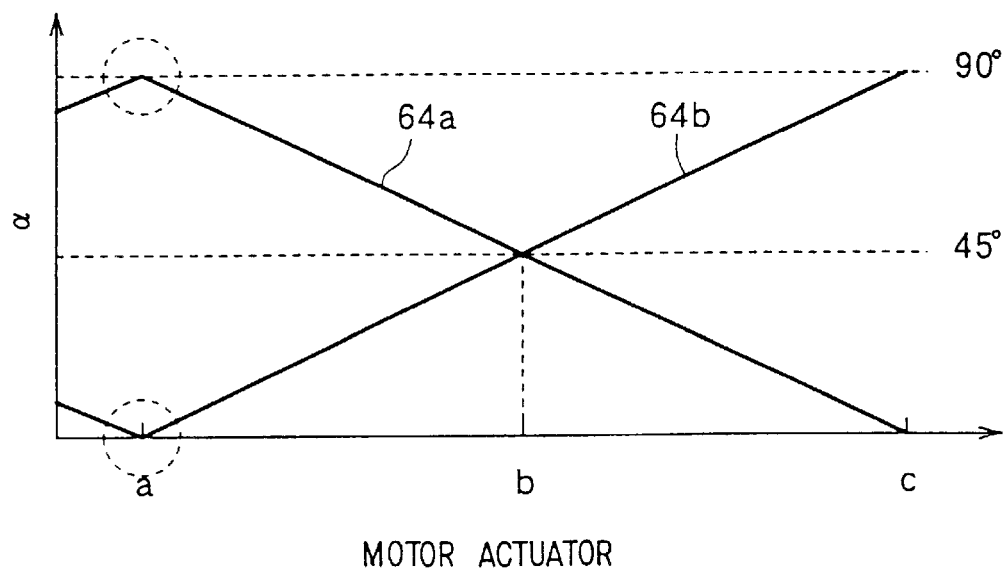
FIG. 19 is an operation explanatory view of the link mechanism (ninth embodiment)
Figure 19B:
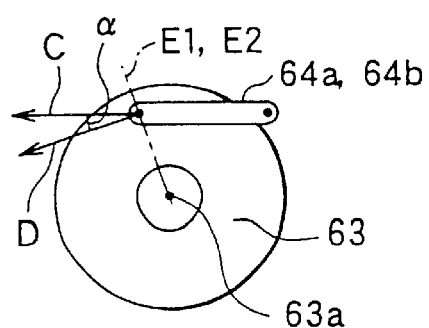

FIG. 19 is a characteristic view showing a state where the angles α of the two coupling rods 64a and 64b are changed in accordance with the operation angle of the link mechanism. Since the angle δ between the normal E1 of the one coupling rod 64a and the normal E2 of the other coupling rod 64b can be always kept 90' as described above, the angles α of the two coupling rods 64a and 64b are changed reciprocally.

That is, at the point of operation angle=α, when the angle α of the one coupling rod 64a becomes the maximum value (90°), the angle α of the other coupling rod 64b becomes the minimum value (0°). Besides, at the point of operation angle =c, when the angle α of the one coupling rod 64a becomes the minimum value (0°), the angle α of the other coupling rod 64b becomes the maximum value (90°). When the operation angle is an intermediate point b between the points "a" and "c", the angles α of both the coupling rods 64a and 64b become the same value (450). That is, when the angles α of both the coupling rods 64a and 64b are summed, it becomes always 90°.

Like this, since the total of the angles of both the coupling rods 64a and 64b is always kept 90° with respect to the change of the operation angle, even if one of both the coupling rods 64a and 64b is positioned at the change point of the angle α=90°, the other coupling rod is positioned at the angle α and in a state where the operation force is most easily transmitted. As a result, the follower link 63 can be rotated and driven in a wide operation angle range exceeding the upper limit (about 120°) of the operation angle range of the link mechanism of FIG. 16, for example, in the range of about 160° in the specific example of FIGS. 17 through 18C.

Further, since the total of the angles α of both the coupling rods 64a and 64b is always kept 90°, even if the operation angle is arbitrarily changed, the operation force can be easily transmitted from the coupling rods 64a and 64b to the follower link 63. Further, since the total of the angles α of both the coupling rods 64a and 64b is always kept a constant value of 90°, the operation force of the follower link 63 can be always kept substantially a constant value. From these, it becomes possible to reduce the necessary torque of the motor actuator 60 and to use an inexpensive and low output one as the motor actuator 60.

Tenth Embodiment

In the above described ninth embodiment, since the two coupling rods 64a and 64b are set into the linear shapes of the same size, as shown in FIG. 18C, when the operation angle of the link mechanism becomes 160°, the positions of the two coupling rods 64a and 64b become close to each other. Thus, when the operation angle exceeds 160°, interference between the two coupling rods 64a and 64b occur, and the link mechanism becomes inoperative. That is, the operation angle range of the link mechanism is restricted by the interference between the two coupling rods 64a and 64b.

Figure 20:
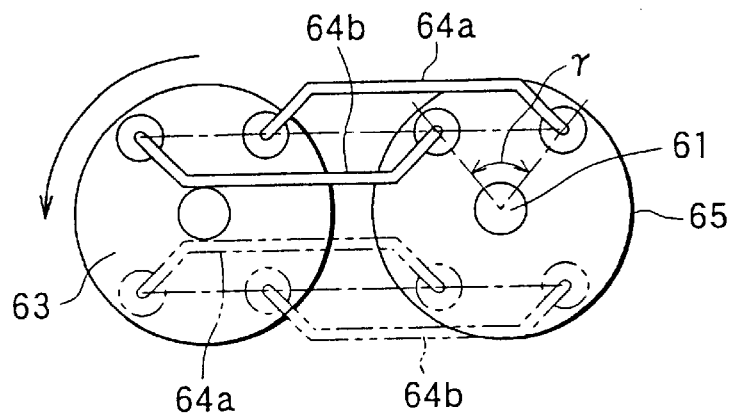
FIG. 20 is an explanatory view of a link mechanism (tenth embodiment)

Then, the tenth embodiment has an object to further enlarge the operation angle range of the link mechanism, and for that purpose, as shown in FIG. 20, two coupling rods 64a and 64b are respectively formed to be bent into C-shape, so that the center portions of the two coupling rods 64a and 64b are respectively made to become hollow like a concave shape. Then, the two coupling rods 64a and 64b are arranged so that the C-shaped bent shapes of both are directed outside (in other words, the concave bottom portions come away from each other).

In the tenth embodiment, a disk-shaped driving link 65 serving as the two driving levers 62a and 62b of the ninth embodiment is integrally coupled to the output shaft 61 of the motor actuator 60.

This driving link 65 is coupled to the follower link 63 through the two coupling rods 64a and 64b. Coupling portions of both ends of the two coupling rods 64a and 64b form movable joints rotatable to the driving link 65 and the follower link 63, respectively.

In FIG. 20, when a solid line position of the two coupling rods 64a and 64b is made an operation angle=0° of the link mechanism, a two-dot chain line position is a position of an operation angle=180°. In the range of this operation angle =0° to 180°, since the two coupling rods 64a and 64b have respectively the C-shaped bent shape, the one side coupling portions of the respective coupling rods are positioned in the opposite side C-shaped concave portion each other, and the interference between the coupling rods can be avoided. By this, C, in the tenth embodiment, it becomes possible to increase the operation angle range of the link mechanism to 180°or more.

Besides, the connection portions between the two coupling rods 64a and 64b and the driving link 65 are arranged so that they are deviated with respect to the center of the output shaft 61 by a predetermined angle (specifically, an angle near 90°). Like this, by setting the deviation angle of 90° between the coupling portions of the two coupling rods 64a and 64b, the characteristics of the angle α shown in FIG. 19 can be obtained with respect to the change of the operation angle of the link mechanism. On this account, also in the tenth embodiment, the operation force can be always and easily transmitted from the coupling rods 64a and 64b to the follower link 63 without fail.

Incidentally, the link mechanism of FIG. 2 explained as the door driving link mechanism 27 of the first embodiment embodies the idea of the tenth embodiment. In the link mechanism 27 in FIG. 2, the output shaft 28a of the motor actuator 28 corresponds to the output shaft 61 of the motor actuator 60 of the tenth embodiment, the temperature controlling link 270 corresponds to the driving link 65 of the tenth embodiment, the outlet mode link 274 corresponds to the follower link of the tenth embodiment, and the coupling rods 276 and 277 correspond to the coupling rods 64a and 64b of the tenth embodiment, respectively.

The coupling rods 276 and 277 in FIG. 2 are also formed into C-shaped bent shape similarly to the tenth embodiment, and further, the coupling portions between the coupling rods 276 and 277 and the temperature controlling link (driving link) 270 are arranged so that they are deviated with respect to the center of the output shaft 28a by a predetermined angle γ (specifically, an angle near 90°).

From the above, the link mechanism 27 in FIG. 2 exerts the same function and effect as the tenth embodiment, and the operation angle of the motor actuator 60 is made 190° as indicated by the horizontal axis of FIG. 7.

Eleventh Embodiment

Figure 21A:
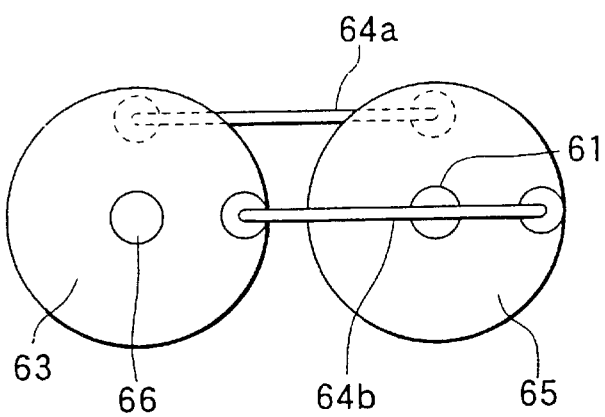
FIGS. 21A and 21B are explanatory views of a link mechanism (eleventh embodiment)
Figure 21B:
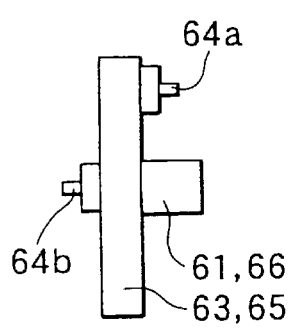

In the ninth and tenth embodiments, the two coupling rods 64a and 64b are arranged at one surface side of the follower link 63. In the eleventh embodiment, as shown in FIGS. 21A and 21B, the coupling rods 64a and 64b are arranged at both surfaces of the follower link 63 and the driving link 65. That is, in the example of FIGS. 21A and 21B, the one coupling rods 64a is disposed at the rear surface side of the follower link 63 and the driving link 65, and the other coupling rod 64b is arranged at the surface side of the follower link 63 and the driving link 65.

According to the eleventh embodiment, the interference between the two coupling rods 64a and 64b disappears. In FIGS. 21A and 21B, reference numeral 66 designates a rotary shaft of the follower link 63.

Twelfth Embodiment

Figure 22:
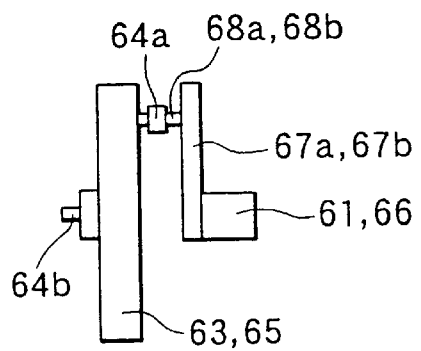
FIG. 22 is an explanatory view of a link mechanism (twelfth embodiment)

The twelfth embodiment is a modification of the eleventh embodiment. As shown in FIG. 22, the rotary shafts 66 and 61 of the follower link 63 and the driving link 65 are disposed to be apart from both the links 63 and 65 by a predetermined interval in an axial direction, the driving link 65 is integrally coupled to the rotary shaft 61 through a coupling lever 67a and a coupling pin 68a, and the follower link 63 is integrally coupled to the rotary shaft 66 through a coupling lever 67b and a coupling pin 68b.

One end of a coupling rod 64a disposed at the back sides (surfaces at the side of the rotary shafts 61 and 66) of the driving link 65 and the follower link 63 is rotatably coupled to the coupling pin 68a of the driving link 65, and the other end is rotatably coupled to the coupling pin 68b of the follower link 63. The front surface sides of the driving link 65 and the follower link 63 are coupled by another coupling rod 64a.

By this, offset arrangement of both the rotary shafts 61 and 66 of the driving link 65 and the follower link 63 can be made in the range where interference with the coupling rod 64a does not occur. Thus, when the follower link 63 rotates around the rotary shaft 66 and the driving link 65 is rotated around the rotary shaft 61, the interference between the coupling rod 64a positioned at the side of the rotary shafts 61 and 66 and the rotary shafts 61 and 66 disappears. As a result, the follower link 63 can be rotated many times by 360° or more by the operation force transmitted through the two coupling rods 64a and 64b from the driving link 65.

Thirteenth Embodiment

Figure 23:
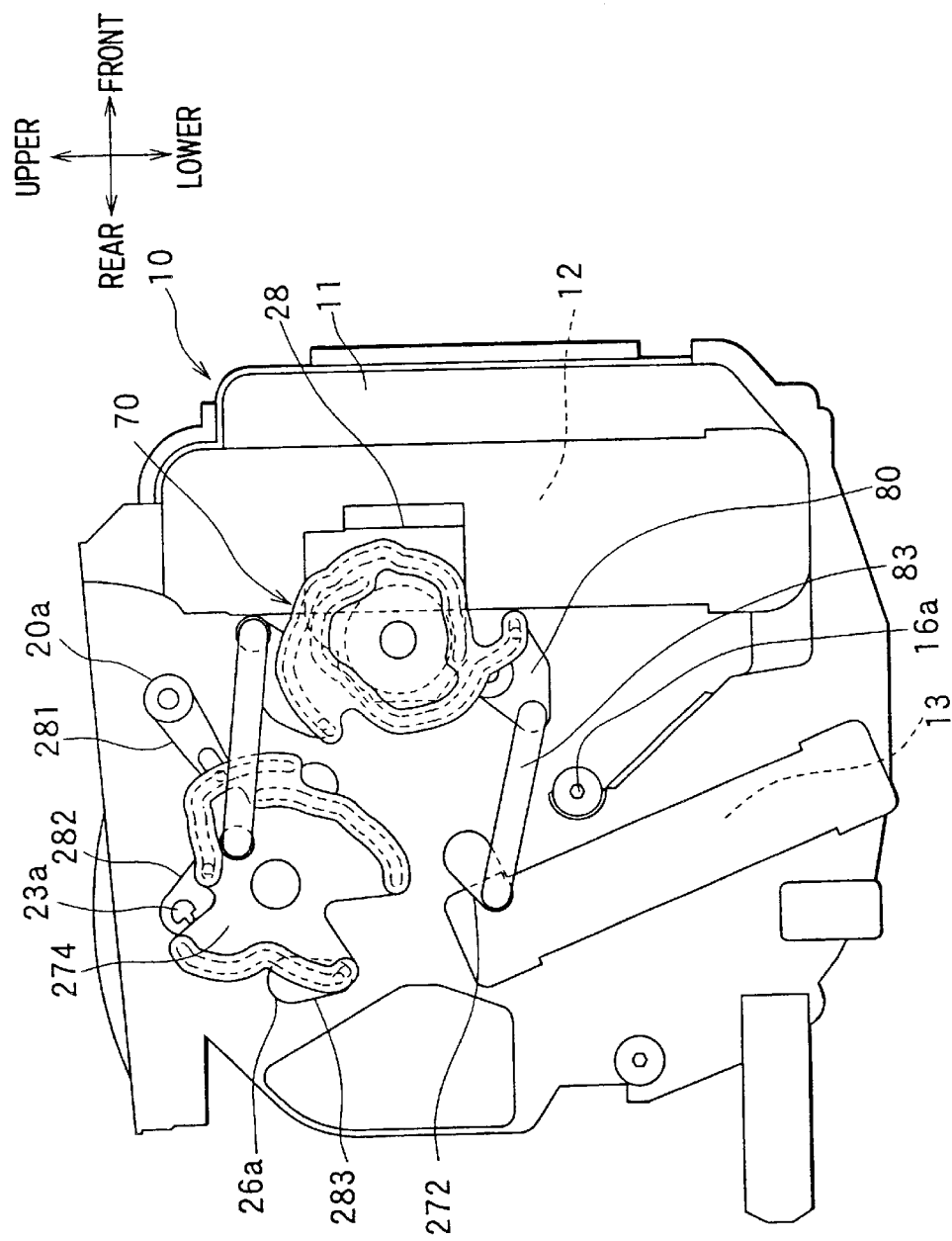
FIG. 23 is a side view of an airconditioning unit equipped with a link mechanism (thirteenth embodiment)
Figure 24:
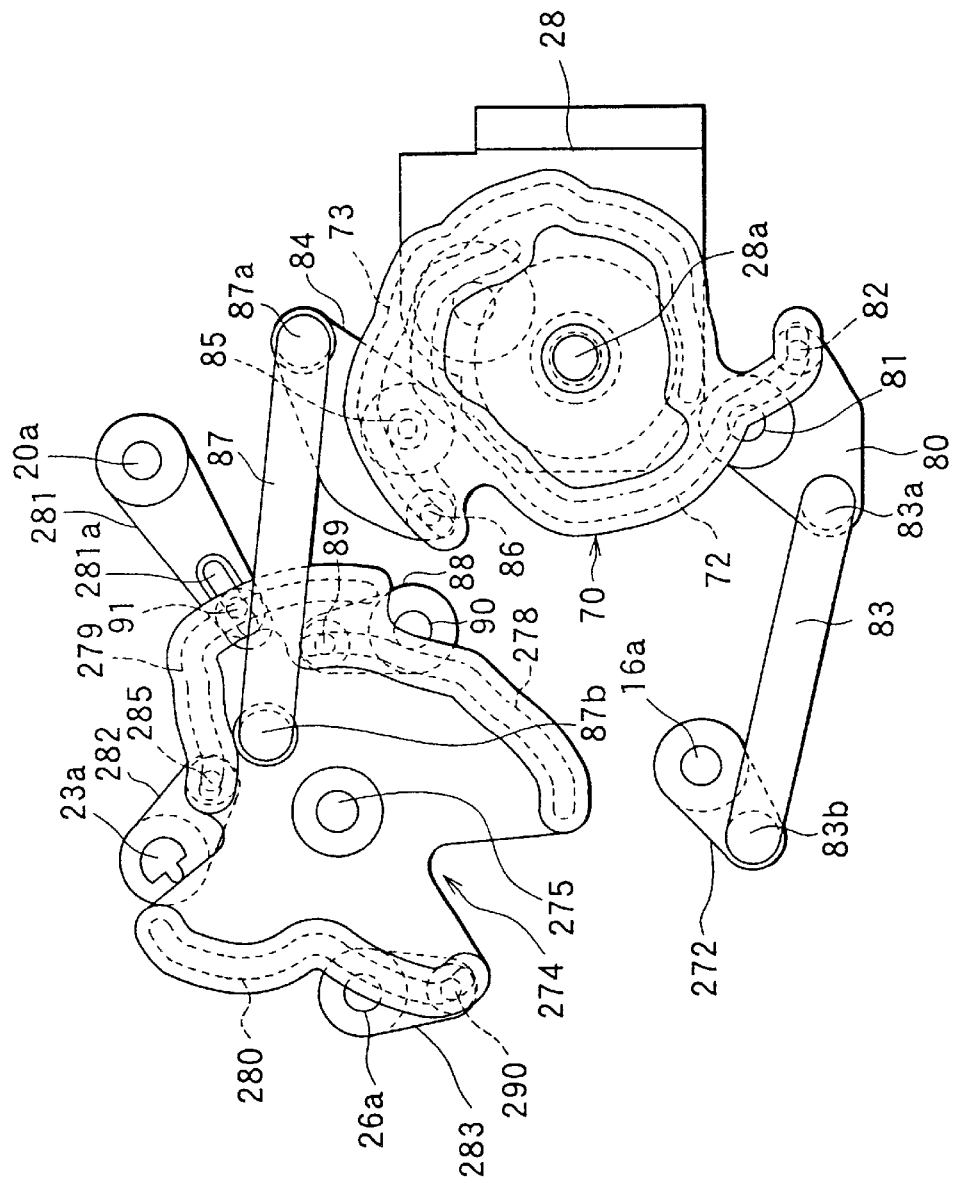
FIG. 24 is an explanatory view of the link mechanism (thirteenth embodiment)
Figure 25:
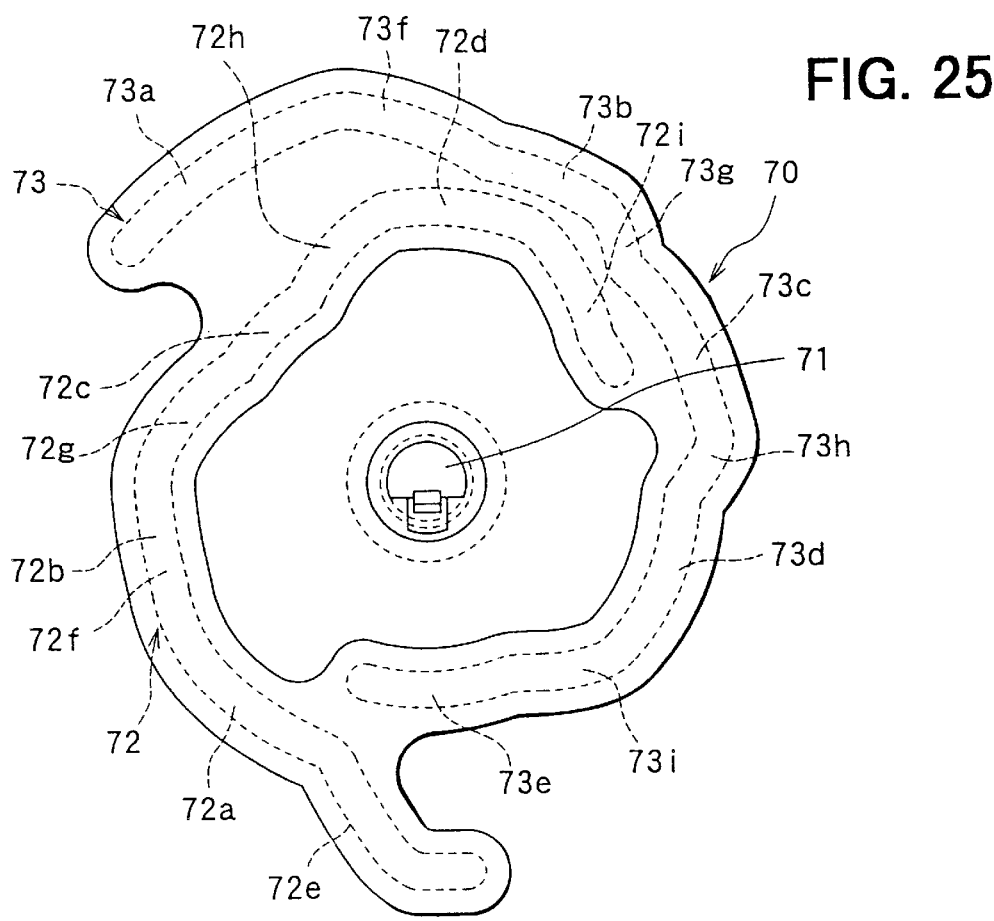
FIG. 25 is an enlarged front view of a distribution link (thirteenth embodiment)

FIGS. 23 to 25 show the thirteenth embodiment, which intends to simplify the link mechanism 27 in FIG. 2.

The link mechanism 27 in FIG. 2 is constructed such that the temperature controlling link 270 is coupled to the output shaft 28a of the motor actuator 28, and the outlet mode link 274 is coupled to this temperature controlling link 270 through the two coupling rods 276 and 277.

Thus, the plurality of idle portions 271a, 278a, 279a, and 280a and the plurality of driving portions 271b, 278b, 279b, and 280b are alternately formed in the cam groove of the temperature controlling link 270 and the cam grooves 278, 279, and 280 of the outlet mode link 274, respectively, and the air mixing door 16 and the outlet mode doors 20, 23 and 26 are alternately driven.

As a result, the long and complicated shape cam grooves 278, 279 and 280 must be formed in the outlet mode link 274, which cause complication and enlargement of the link mechanism 27.

Then, in the thirteenth embodiment, as shown in FIGS. 23 to 25, a distribution link 70 is additionally provided at the input side (motor side) of the outlet mode link 274, so that the cam groove shape of the outlet mode link 274 is simplified. In the thirteenth embodiment, the temperature controlling link 270 in FIG. 2 is removed, and instead thereof, a link mechanism including a temperature controlling intermediate lever 80 is provided.

FIG. 25 is an enlarged view showing the distribution link 70. The distribution link 70 is a plate-like member, and the output shaft 28a (FIG. 24) of the motor actuator 28 is coupled to a center hole portion 71 so that the distribution link 70 is rotated integrally with the output shaft 28a. First and second cam grooves 72 and 73 are formed along the outer peripheral portion of the distribution link 70. The first cam groove 72 is for driving the air-mixing door 16, and the second cam groove 73 is for driving the outlet mode doors 20, 23 and 26.

In FIG. 24, the temperature controlling intermediate lever 80 is rotated around a rotary shaft 81, and includes a pin 82 slidably fitted in the first cam groove 72. Besides, one end portion 83a of a coupling rod 83 is rotatably coupled to the intermediate lever 80, and the other end portion 83b of the coupling rod 83 is rotatably coupled to the driving lever 272 of the air-mixing door 16.

An outlet mode intermediate lever 84 is rotated around a rotary shaft 85, and includes a pin 86 slidably fitted in the second cam groove 73. One end portion 87a of a coupling rod 87 is rotatably coupled to the intermediate lever 84, and the other end portion 87b of the coupling rod 87 is rotatably coupled to the outlet mode link 274.

The outlet mode link 274 is rotated around a rotary shaft 275 similarly to the link mechanism 27 in FIG. 2, and three cam grooves, that is, a defroster cam groove 278, a face cam groove 279, and a foot cam groove 280 are formed.

However, in the thirteenth embodiment, as described later, since the idle function for alternate driving is concentrated to the first and second cam grooves 72 and 73 of the distribution link 70, the idle function for alternate driving becomes unnecessary for the cam grooves 278, 279 and 280 of the outlet mode link 274. Thus, it becomes unnecessary to provide portions corresponding to the arc-like idle portions 278*a*, 279*a*, and 280*a* of FIG. 2 in the cam grooves 278, 279 and 280 of the embodiment 13, and mainly, groove shape portions corresponding to the driving portions 278*b*, 279*b* and 280*b* of FIG. 2 have only to be provided.

A first pin 89 of a defroster intermediate lever 88 is slidably fitted in the defroster cam groove 278, and this intermediate lever 88 is rotatable around a rotary shaft 90. Besides, the intermediate lever 88 includes a second pin 91, and this second pin 91 is slidably fitted in a groove portion 281*a* formed in the driving lever 281 of the defroster door 20. By this, when the intermediate lever 88 is rotated, the defroster door 20 can be rotated around the rotary shaft 20*a* through the driving lever 281.

A pin 285 of the driving lever 282 of the face door 23 is slidably fitted in the face cam groove 279. Similarly, a pin 290 of the driving lever 283 of the foot door 26 is slidably fitted in the foot cam groove 280.

In the distribution link 70, the first cam groove 72 for driving the air mixing door and the second cam groove 73 to for driving the outlet mode door are provided with idle portions and driving portions alternately formed to realize the operation pattern in FIG. 10 (fourth embodiment). By that, the pin 82 and the pin 86 are alternately displaced by the operation angle of the distribution link 70.

First, an example of a specific shape of the first cam groove 72 for driving the air-mixing door will be described. In FIG. 25, a first idle portion 72*a* is a portion for idle operation between the operation angle θ1 and θ2 in FIG. 10, and a second idle portion 72*b* is a portion for idle operation between the operation angle θ3 and θ4 in FIG. 10. A third idle portion 72*c* is a portion for idle operation between the operation angle θ5 and θ6 in FIG. 10, and a fourth idle portion 72*d* is a portion for idle operation between the operation angle θ6' and θ7'in FIG. 10.

Driving portions 72*e* to 72*i* are provided alternately with the respective idle portions 72*a* to 72*d* in the first cam groove 72, and by this driving portions 72*e* to 72*i*, driving (opening degree adjustment) of the air-mixing door 16 in the interval of the operation angle θ0 to θ1, the interval of θ2 to θ3, the interval of θ4 to θ5, the interval of θ6 to θ6', and the interval of θ7' to θ7 are carried out.

Next, an example of a specific shape of the second cam groove 73 for driving the outlet mode door will be described. A first idle portion 73*a* is a portion for idle operation between the operation angle θ0 and θ1 (at the time of the face mode) in FIG. 10, and a second idle portion 73*b* is a portion for idle operation between the operation angle θ2 and θ3 (at the time of the bi-level mode) in FIG. 10. A third idle portion 73*c* is a portion for idle operation between the operation angle θ4 and θ5 (at the time of the foot mode) in FIG. 10, a fourth idle portion 73*d* is a portion for idle operation between the operation angle θ6 and θ6' (at the time of the foot defroster mode) in FIG. 10, and a fifth idle portion 73*e* is a portion for idle operation between the operation angle θ7' and θ7 (at the time of the defroster mode) in FIG. 10.

Driving portions 73*f* to 73*i* are provided alternately with the respective idle portions 73*a* to 73*e*, and by this driving portions 73*f* to 73*i*, driving (outlet mode switching) of the outlet mode doors 20, 23 and 26 in the interval of the operation angle θ1 to θ2, the interval of θ3 to θ4, the interval of θ5 to θ6, and the interval of θ6' to θ7' are carried out.

According to the thirteenth embodiment, since the idle function for alternate driving is concentrated to the first and second cam grooves 72 and 73 of the distribution link 70, it is unnecessary to set the idle function for alternate driving in the cam grooves 278, 279 and 280 of the outlet mode link 274. Thus, in the cam grooves 278, 279 and 280 of the outlet mode link 274, it is unnecessary to provide portions corresponding to the arc-shaped idle portions 278*a*, 279*a* and 280*a* in FIG. 2, so that the cam grooves 278, 279 and 280 can be made to have greatly shortened and simple groove shapes as compared with those in FIG. 2.

Besides, by concentrating the idle function to the second cam groove 73 of the distribution link 70, the lengths of the cam grooves 278, 279 and 280 of the outlet mode link 274 can be made short, so that it becomes possible to decrease the rotation angle of the link 274. Thus, the distribution link 70 has only to be coupled to the outlet mode link 274 through the one coupling rod 87.

Besides, by concentrating the idle function for the air-mixing door to the first cam groove 72 of the distribution link 70, it is possible to make the distribution link 70 serve also as the temperature controlling link 270 in FIG. 2. Thus, only the simple link mechanism including the temperature controlling intermediate lever 80 is sufficient for the link mechanism for driving the air-mixing door 16.

In the thirteenth embodiment, the operation force of the distribution link 70 is transmitted to the driving lever 272 of the air-mixing door 16 through the intermediate lever 80 and the coupling rod 83. However, when the driving lever 272 can be disposed in the vicinity of the distribution link 70, the driving lever 272 is disposed at the position of the intermediate lever 80, the pin 282 fitted in the cam groove 72 is provided at the driving lever 272, and the driving lever 272 may be directly driven by the distribution link 70.

On the contrary, when the distance between the driving lever 272 and the distribution link 70 is large, both 272 and 70 may be coupled by using a cable or the like instead of the coupling rod 83. Similarly, the distribution link 70 may be coupled to the outlet mode link 274 by using a cable or the like instead of the coupling rod 87.

Fourteenth Embodiment

Figure 26:
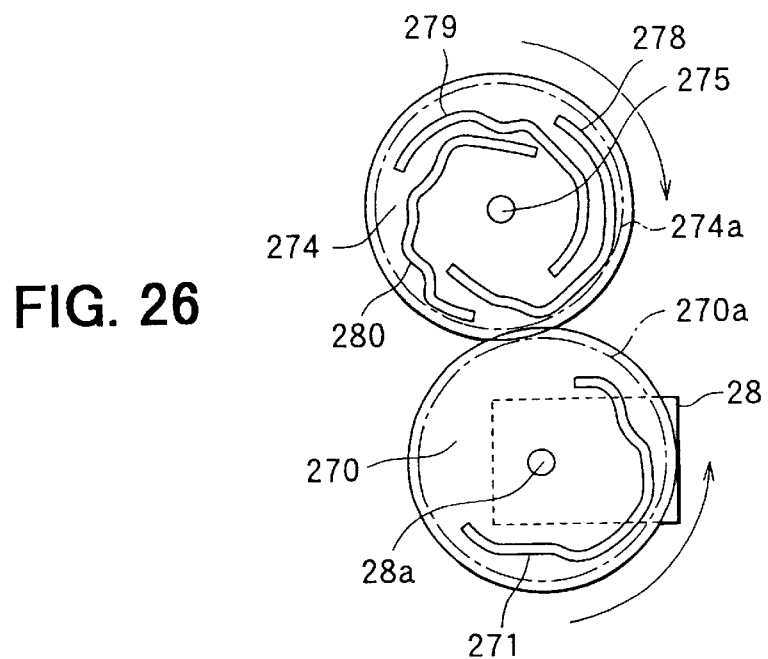
FIG. 26 is a front view showing gear coupling between links (fourteenth embodiment)

In the link mechanism 27 in FIG. 2 (first embodiment), the temperature controlling link 270 is coupled to the output shaft 28*a* of the motor actuator 28, and this temperature controlling link 270 is coupled to the outlet mode link 274 through the two coupling rods 276 and 277. In the fourteenth embodiment, as shown in FIG. 26, both the links 270 and 274 are made disk-shaped, gears 270*a* and 274*a* are respectively formed at the outer periphery of both the disk-shaped links 270 and 274, both the gears 270*a* and 274*a* are made to engage with each other, and the operation force is transmitted from the temperature controlling link 270 to the outlet mode link 274 by gear coupling.

Fifteenth Embodiment

Figure 27:
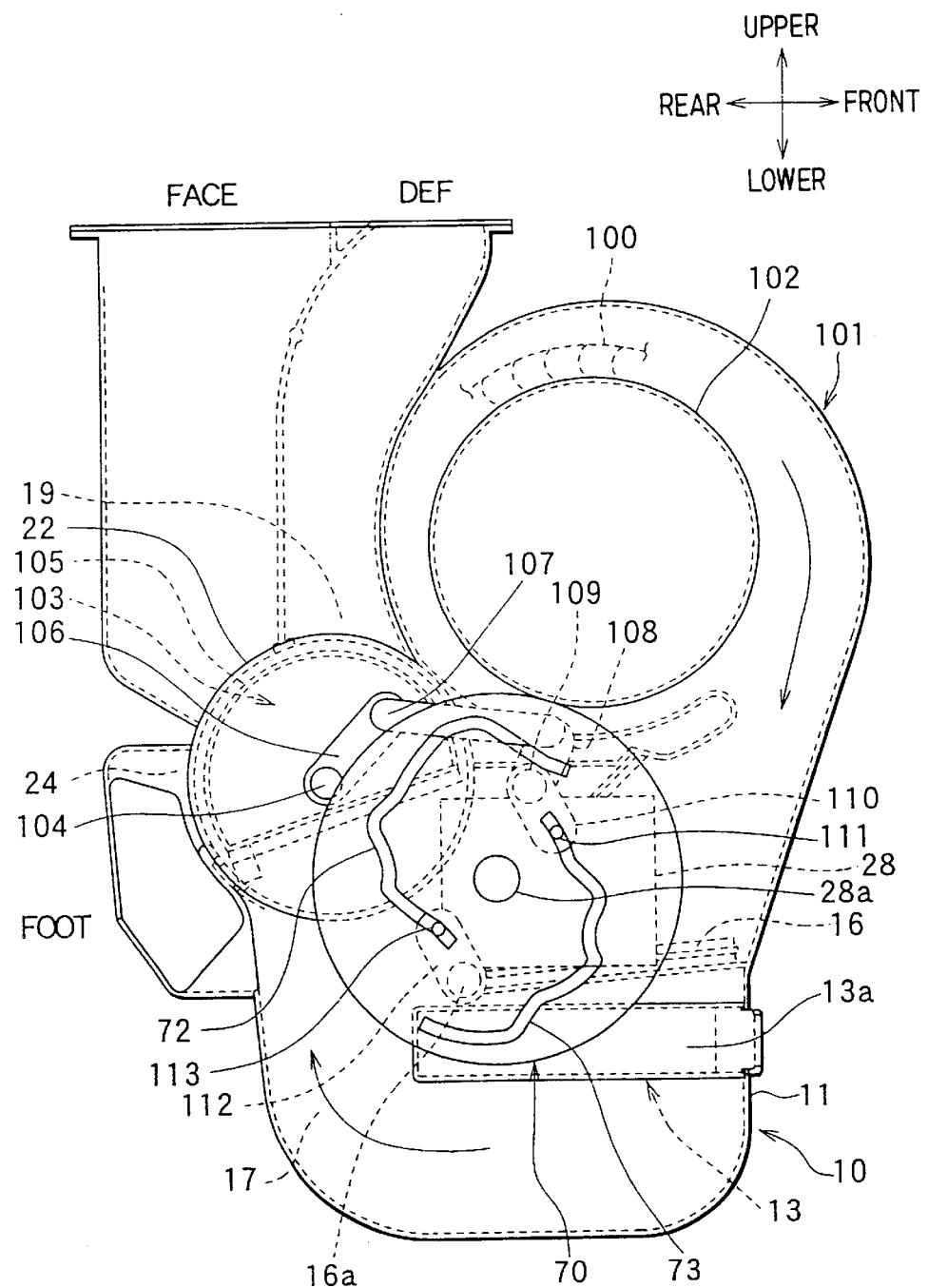
FIG. 27 is a side view of an airconditioning unit equipped with a link mechanism (fifteenth embodiment)

FIG. 27 shows embodiment 15. An air blower portion 101 having a built-in centrifugal fan 100 is integrally formed in an air conditioning unit 10 of this embodiment, and an evaporator 12 (not illustrated), an inside/outside air switching box, and the like are connected to a suction port 102 of the air blower portion 101.

Besides, in this embodiment, a heater core 13 is substantially horizontally disposed in an air conditioning case 11, and blown air passes through a core portion 13a of the heater core 13 from an upper portion to a lower portion. A plate-like air-mixing door 16 is positioned above the heater core 13 and is rotatable around a rotary shaft 16a.

Besides, in this embodiment, as an outlet mode switching door, one rotary door 103 is rotatably disposed in the air conditioning case 11. This rotary door 103 includes a rotary shaft 104 and a door surface 105 formed concentrically with the rotary shaft 104 and made of a semi-cylindrical shape. Then, such structure is adopted that the door surface 105 is rotated at a predetermined position in an outward radius direction of the rotary shaft 104, so that a defroster outlet 19, a face outlet 22, and a foot outlet 24 are opened and closed.

One end of the rotary shaft 104 of the rotary door 103 is protruded outside of the air conditioning case 11, and is integrally coupled to one end of a driving lever 106. The other end of this driving lever 106 is rotatably coupled to one end of a coupling rod 107. The other end of this coupling rod 107 is rotatably coupled to one end of a link lever 108, and the other end of this link lever 108 is integrally coupled to a rotary shaft 109.

One end of a link lever 110 is integrally coupled to this rotary shaft 109, and a pin 111 is provided at the other end of this link lever 110.

On the other hand, a distribution link 70 has the same function as the distribution link 70 of the embodiment 13 (FIGS. 23–25), and is a disk-like member rotating integrally with the output shaft 28a of the motor actuator 28. A first cam groove 72 for driving the air mixing door 16 and a second cam groove 73 for driving the rotary door 103 are formed in the distribution link 70. The pin 111 is slidably fitted in the second cam groove 73.

One end of a driving lever 112 is integrally coupled to the rotary shaft 16a of the air-mixing door 16, and a pin 113 is provided at the other end of this driving lever 112. This pin 113 is slidably fitted in the first cam groove 72.

In order to alternately drive the air mixing door 16 and the outlet mode switching rotary door 103, similarly to the thirteenth embodiment, idle portions and driving portions are alternately formed in the first cam groove 72 and the second cam groove 73, and by that, the pin 111 and the pin 113 are alternately displaced by the operation angle of the distribution link 70.

According to the fifteenth embodiment, the first and second cam grooves 72 and 73 for alternately driving the air mixing door 16 and the outlet mode switching rotary door 103 are provided together in the distribution link 70 made of one disk-like member, and the pin 113 of the driving lever 112 at the side of the air mixing door 16 and the pin 111 of the link mechanism at the side of the rotary door 103 are engaged with the first and second cam grooves 72 and 73, so that the air mixing door 16 and the outlet mode switching rotary door 103 can be alternately driven. Thus, the link mechanism for driving both the doors 16 and 103 can be simplified and the number of parts can be greatly reduced.

In the fifteenth embodiment, both the driving lever 112 at the side of the air mixing door 16 and the link mechanism (106 through 11) at the side of the rotary door 103 are disposed at the back side (deep side of the paper face of FIG. 27) of the distribution link 70. However, the driving lever 112 at the side of the air mixing door 16 may be disposed at one side of both the front and back surfaces of the distribution link 70, and the link mechanism (106 through 111) at the side of the rotary door 103 may be disposed at the other side. By doing so, there does not occur interference between the driving lever 112 at the side of the air-mixing door 16 and the link mechanism (106 through 111) at the side of the rotary door 103.

Sixteenth Embodiment

Figure 28:
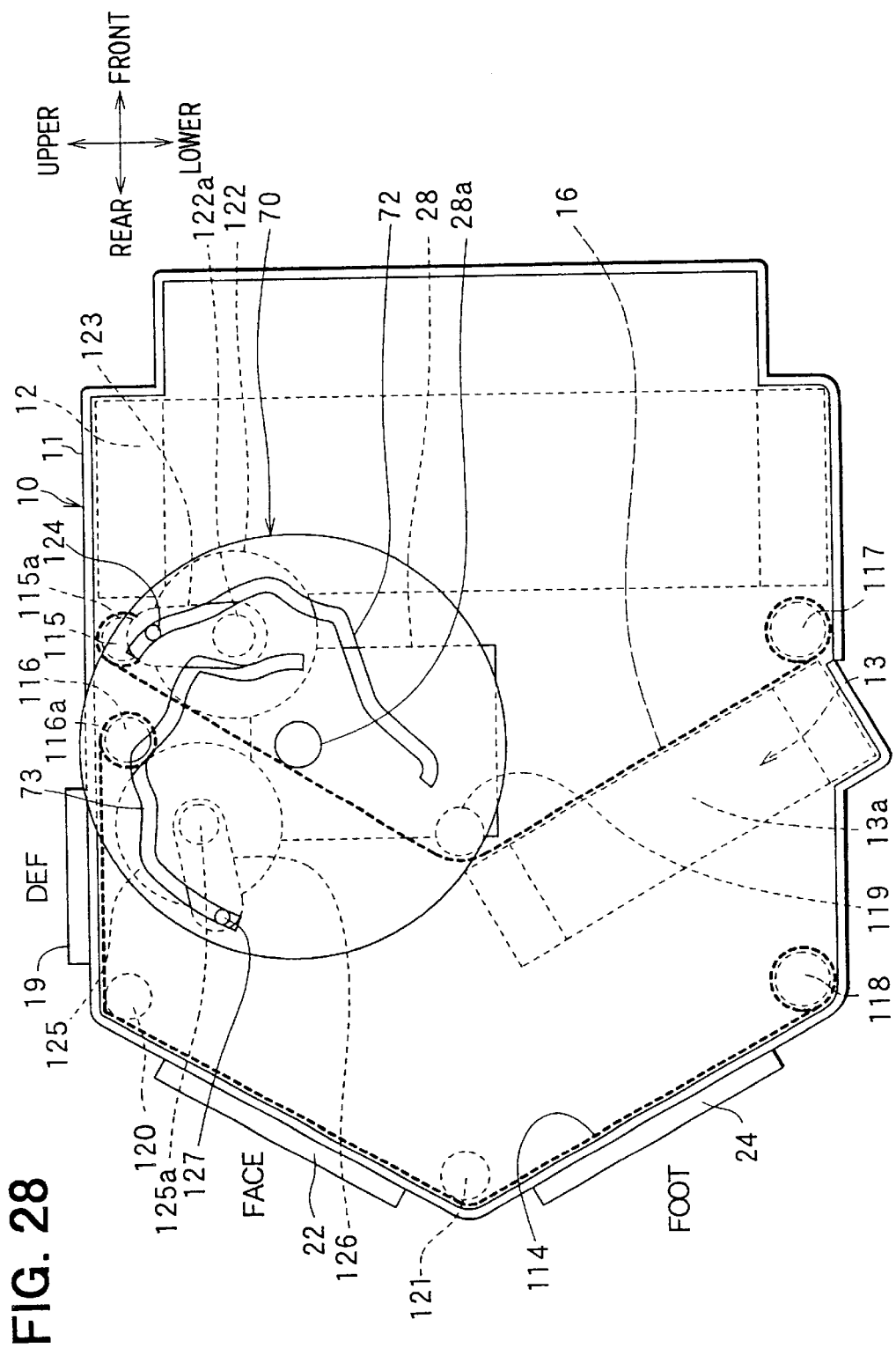
FIG. 28 is a side view of an airconditioning unite quipped with a link mechanism (sixteenth embodiment)

FIG. 28 shows the sixteenth embodiment, and in this embodiment, both an air-mixing door 16 and a outlet mode switching door 114 are constituted by film doors. Here, the film door is made of a well-known film-like member in which an opening portion is provided in a flexible resin film material.

One end portion of the air mixing film door 16 and one end of the outlet mode switching film door 114 are respectively coupled to driving shafts 115 and 116, and the other end portions are respectively coupled to follower shafts 117 and 118. Besides, intermediate guide shafts 119, 120 and 121 for guiding movement of the film doors 16 and 114 are disposed between the driving shafts 115 and 116 and the follower shafts 117 and 118.

On the other hand, a distribution link 70 is rotated integrally with an output shaft 28a of a motor actuator 28 similarly to the distribution link 70 in the thirteenth or fifteenth embodiments, and a first cam groove 72 for driving the air mixing film door 16 and a second cam groove 73 for driving the outlet mode switching film door 114 are formed in the distribution link 70.

Besides, a gear 115a is formed in the driving shaft 115 of the air mixing film door 16, a gear 122 is engaged with this gear 115a, and one end of a link lever 123 is integrally coupled to a rotary shaft 122a of this gear 122. A pin 124 is provided at the other end of this link lever 123, and this pin 124 is slidably fitted in the first cam groove 72.

The driving shaft 116 of the outlet mode switching film door 114 is also coupled to the second cam groove 73 through a similar mechanism, that is, a gear 116a, a gear 125, a link lever 126, and a pin 127. Reference numeral 125a designates a rotary shaft of the gear 125. The rotation of the input side is increased and transmitted to the output side by the engagement between the input side gear 122 and the output side gear 115a and the engagement between the input side gear 125 and the output side gear 116a.

Also in the sixteenth embodiment, when the distribution link 70 made of one disk-like member is rotated by the motor actuator 28, the driving shaft 115 of the air mixing film door 16 and the driving shaft 116 of the outlet mode switching film door 114 are alternately rotated and driven, and the air mixing door 16 and the outlet mode switching rotary door 103 can be alternately driven.

In the sixteenth embodiment, both the air-mixing door 16 and the outlet mode switching door 114 are made of the film doors. However, the sixteenth embodiment can be applied to he a case where the air mixing door 16 and the outlet mode switching door 114 are made of slide doors. Here, the slide door is such that a rigid plate door is linearly slid and moved.

Seventeenth Embodiment

Figure 29:
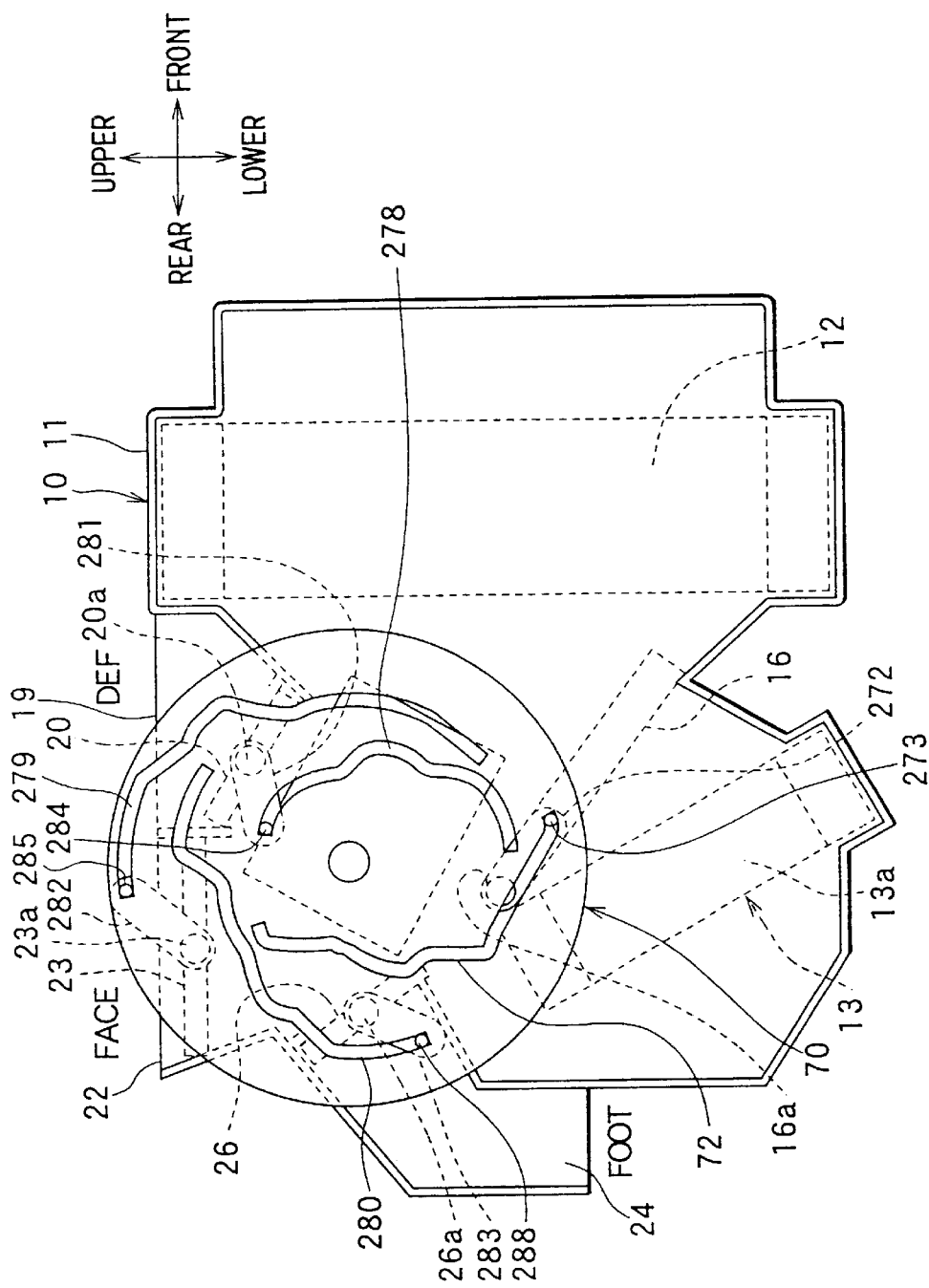
FIG. 29 is a side view of an airconditioning unit equipped with a link mechanism (seventeenth embodiment)

FIG. 29 shows the seventeenth embodiment, and in this IS embodiment, similarly to the first embodiment, all of an air mixing door 16, a defroster door 20, a face door 23, and a foot door 26 are made of plate doors. Pins 273, 284, 285 and 288 are respectively provided at tip end portions of driving levers 272, 281, 282, 283 (the reference characters are the same as those in FIG. 2) coupled to rotary shafts 16a, 20a, 23a, and 26a of the doors 16, 20, 23 and 26.

On the other hand, a cam groove 72 (corresponding to the cam groove 271 in FIG. 2) for driving the air mixing door 16, a cam groove 278 for driving the defroster door 20, a cam groove 279 for driving the face door 23, and a cam groove 280 for driving the foot door 26 are provided in a distribution link made of a disk-like member integrally rotating with the output shaft 28*a* of the motor actuator 28. The pins 273, 284, 285 and 288 are slidably fitted in the cam grooves 72, and 278 to 280, respectively.

Also in the cam grooves 72, and 278 to 280, idle portions and driving portions are alternately formed to alternately driving the air mixing plate door 16 and the outlet mode switching plate doors 20, 23 and 26.

According to the seventeenth embodiment, when the distribution link 70 is rotated by the motor actuator 28, it is possible to alternately rotate and drive the air mixing plate door 16 and the outlet mode switching doors 20, 23 and 26 through the driving levers 272, 281, 282 and 283.

Eighteenth Embodiment

Figure 30:
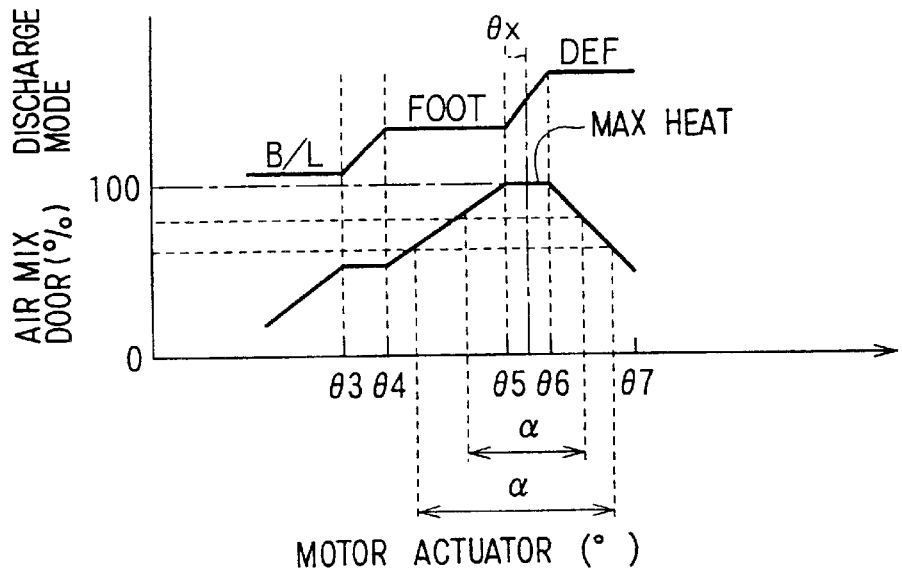
FIG. 30 is an explanatory view of operation characteristics (eighteenth embodiment)

In the system of the first embodiment shown in FIGS. 1–7, also in the defroster setting region B, the outlet temperature can be automatically controlled by changing the predetermined value as follows: That is, FIG. 30 schematically shows the change of the opening degree of the air mixing door 16 and the switching of the outlet mode in response to the change of the operation angle of the motor actuator 28, and when an instruction of the defroster mode is issued, an objective value SW of the operation angle of the motor actuator 28 is calculated by the following numerical expression.

$$SW = k1(\theta x - SWD) + \theta x$$
$$= SWD + \alpha$$

In the above expression, θx is an intermediate operation angle of the range θ5 to θ6 where the opening degree of the air-mixing door 16 is kept the maximum heating position. The coefficient k1 is for correcting a difference between a ratio (inclination) of an opening degree change of the air mixing door 16 with respect to the operation angle of the motor actuator 28 in the foot mode and a ratio (inclination) of an opening degree change of the air mixing door 16 with respect to the operation angle of the motor actuator 28 in the defroster mode. In the case where the ratios of the opening degree change of the air mixing door in both the modes are the same, the coefficient k1=1, and in this case, α=2 (θx−SWD).

Like this, in the defroster setting region, the air mixing door opening degree is changed by the increase of the operation angle of the motor actuator 28 from the maximum heating position of the opening degree=100% to the side where the opening degree is decreased, and the operation angle α of the addition is determined in accordance with the difference between the operation angle θx of the motor actuator at the maximum heating position of the air mixing door opening degree=100% and the SWD, so that the air mixing door opening degree immediately before the defroster mode setting can be continued even after the defroster mode setting.

Thus, the control of the outlet temperature can be smoothly continued before and after the defroster mode setting, and the outlet temperature can be excellently automatically controlled even in the defroster setting region B. Incidentally, the operation angle α of the addition may be corrected by the objective outlet temperature TAO and the outside air temperature TAM. Specifically, as the objective outlet temperature TAO is high, and as the outside temperature TAM is low, the heat load of heating becomes high. Thus, the operation angle α of the addition is made small, and the air mixing door opening degree in the defroster mode may be made large.

Nineteenth Embodiment

Figure 31:
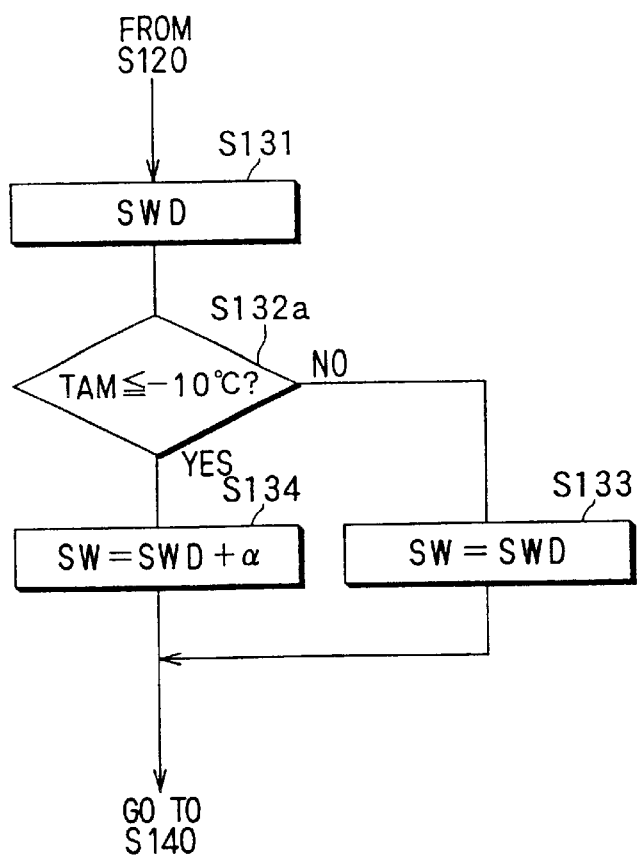
FIG. 31 is a flowchart of a main portion (nineteenth embodiment)

In the eighteenth embodiment, the existence of the instruction of the defroster mode is determined through the DON/OFF state of the defroster switch 33 to be manually operated. In the nineteenth embodiment, as shown in FIG. 31, at step S132*a*, it is determined whether the outside air temperature TAM is a predetermined value (for example, −10° C.) or less, and when TAM≦−10° C., the procedure proceeds to step S134, and the defroster mode is set.

Thus, according to the nineteenth embodiment, when TAM ≦−10° C., the instruction of the defroster mode is automatically is sued without the passenger's manual operation to the defroster switch 33, so that the power to remove the fog of window glass by the defroster mode can be exerted. Thus, in the nineteenth embodiment, the step S132*a* constitutes the defroster mode instruction means.

As the information for the defroster mode instruction, in addition to the outside air temperature TAM, for example, the humidity in the vicinity of the inner surface of the vehicle window glass is detected by a humidity sensor, a fog condition of the vehicle window glass is determined on the basis of a detection signal of this humidity sensor, and on the basis of this determination result, the instruction of the defroster mode may be automatically issued.

Besides, the defroster mode may be set by either one of the manual instruction and the automatic instruction by judging the existence of the manual instruction of the defroster mode with the defroster switch 33 and the existence of the automatic instruction of the defroster mode based on the outside air temperature TAM, the humidity in the vicinity of the inner surface of the vehicle window glass, and the like.

Twentieth Embodiment

In the eighteenth embodiment, in the defroster setting region B of the operation angle of the motor actuator 28, only the defroster mode in which air is blown to the side of the window glass is set. In the twentieth embodiment, both the defroster mode and the foot defroster mode are set in the defroster setting region B. In the twentieth embodiment, a foot defroster switch (not illustrated) for issuing the instruction of the foot defroster mode is added to the air conditioning operation panel 30 in FIG. 3.

Figure 32:
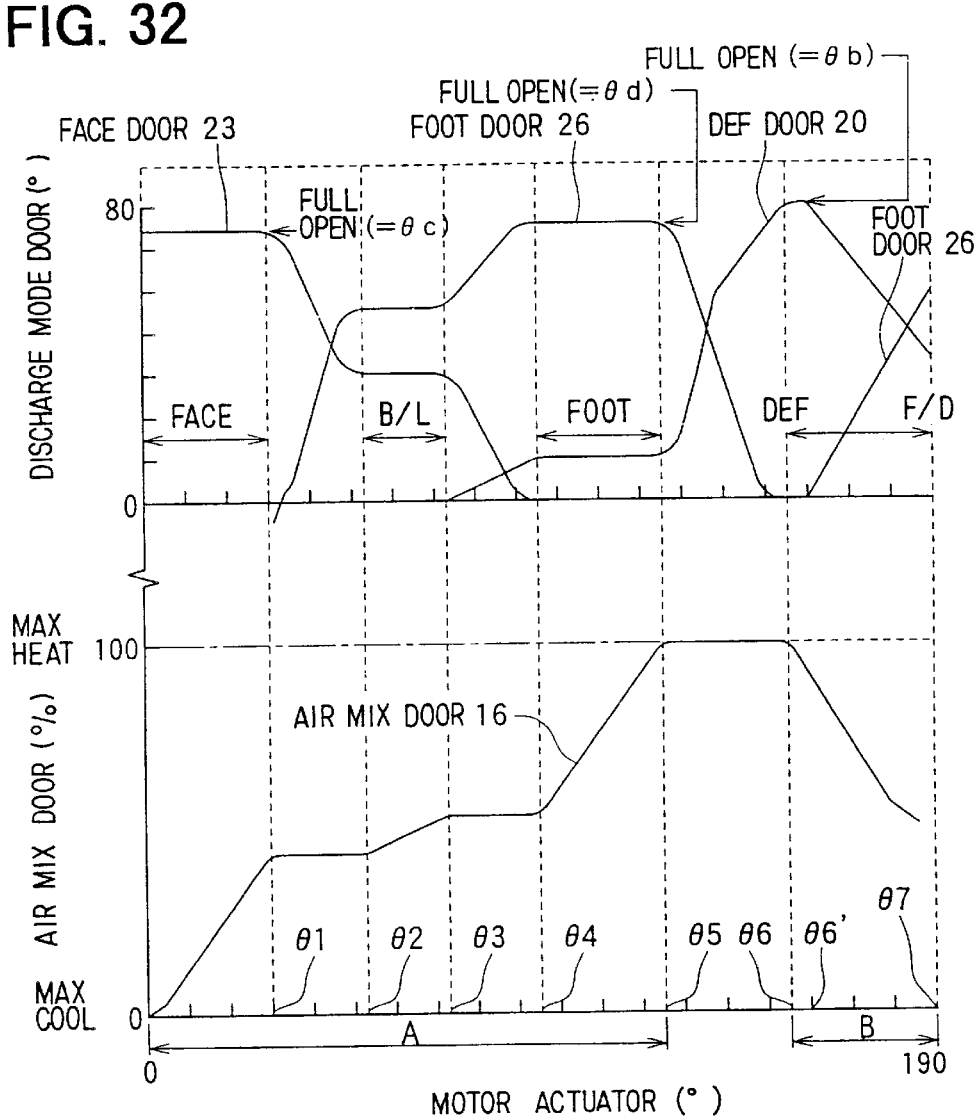
FIG. 32 is an explanatory view of operation characteristics (twentieth embodiment)

FIG. 32 shows operation characteristics of the motor actuator 28 according to the embodiment 20, and corresponds to FIG. 7 of the first and eighteenth embodiments. In the twentieth embodiment, the defroster door 20 is fully opened in a predetermined range (range of θ6 to θ6') at the side where the operation angle of the motor actuator 28 is small in the defroster setting region B, so that the defroster mode is set.

As the operation angle of the motor actuator 28 is increased from θ6' to θ7, the opening degree of the defroster door 20 is gradually decreased, and the opening degree of the foot door 26 is gradually increased. By this, it is possible to set the foot defroster (F/D) mode in which both the foot opening portion 24 and the defroster opening portion 19 are opened by the defroster door 20 and the foot door 26. In the example of FIG. 32, the foot defroster mode in which the opening degree of the defroster opening portion 19 is large as compared with the foot opening portion 24 and the defroster mode is main, is set in the first half portion of the operation angle range from θ6' to θ7, and the foot defroster mode in which the opening degree of the foot opening portion 24 is large as compared with the defroster opening portion 19 and the foot mode is main, is set in the latter half portion of the operation angle range from θ6' to θ7.

As described above, by setting the foot defroster mode, air can be blown to the side of the window glass and the side of the passenger's foot from both the defroster opening portion 19 and the foot opening portion 24, and the heating power to the foot of the passenger can be exerted while the removing power of the fog of the window glass is secured.

As explained in the eighteenth., in the foot mode, the blown air volume from the defroster opening portion 19 is much small as compared with the blown air volume from the foot outlet 24. However, in the foot defroster mode, as compared with the foot mode, the opening degree of the defroster opening portion 19 is made large, and the defroster blown air volume to the side of the window glass is increased, so that the power to remove the fog of the window glass can be greatly improved from the time of the foot mode.

Besides, also in the defroster setting region B of the embodiment 20, control of the outlet temperature in the defroster mode and the foot defroster mode can be made by operating the opening degree of the air mixing door from the maximum heating position of the opening degree of 100% to the opening degree decreasing side by a predetermined amount.

Twenty-first Embodiment

In the twenty-first-embodiment, the defroster mode and the foot defroster mode in the defroster setting region B of the embodiment 20 are automatically switched in accordance with the conditions of the outside air temperature TAM and the opening degree (hereinafter referred to as A/M opening degree) of the air mixing door 16.

Figure 33A:
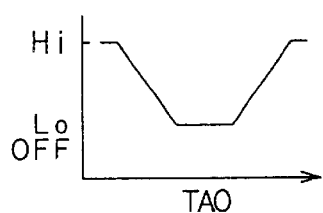
FIGS. 33A and 33B are characteristic views of air volume control for explaining a problem to be solved (twenty first embodiment)

First, the idea of control (automatic switching of the defroster mode and the foot defroster mode) according to the embodiment 21 will be described. FIG. 33A is a map of basic control of an objective air volume BLW determined by the TAO at the step S140 of FIG. 5. As shown in FIG. 33A, the objective air volume BLW is made large at the high temperature side (maximum heating side) and the low temperature side (maximum cooling side) of the TAO, and the objective air volume BLW is made small in the intermediate temperature region of the TAO.

Figure 33B:
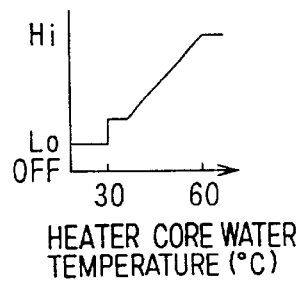

On the other hand, FIG. 33B is an objective air volume map of the control at a heating start time to prevent cool air from blowing into a vehicle compartment since heater core hot water temperature Tw is low at a heating start time in winter. When the heater core hot water temperature Tw is lower than a first predetermined temperature (for example, 30° C.), power application to the fan driving motor 45 of the blower unit is cut off to stop the blowing fan, and when the heater core hot water temperature Tw exceeds the first predetermined temperature, the blowing fan is started at the minimum air volume Lo.

When the heater core hot water temperature Tw is raised from the first predetermined temperature to a second predetermined temperature (for example, 60° C.), an applied voltage to the fan driving motor of the air blower is increased in conjunction with this, and by this, the objective air volume BLW is raised from the minimum air volume Lo to the maximum air volume Hi. When the water temperature T2 becomes higher than the second predetermined temperature (60° C.), the control at the heating start time is ended, and subsequent to this, the control shifts to the steady state for determining the objective air volume BLW by the basic control map in FIG. 33A.

At the cold time when the outside air temperature becomes 0° C. or less, and at the initial transitional time of heating start (that is, at the warm-up time as the initial time of the start of heating in the vehicle compartment and as a period to a time when the temperature in the vehicle compartment becomes stable), the outlet temperature into the vehicle compartment is low, and the blown air volume is decreased, so that there occurs a state where the temperature of the water glass is lowered and the window glass is apt to be fogged. On the other hand, in the steady state after the end of the warm-up, since both the outlet temperature and the blown air volume into the vehicle compartment are increased, the window glass temperature is raised and it becomes easy to prevent the fog of the window glass.

Then, attention has been paid to the point that the fog generation state of the window glass is changed between the warm-up time and the steady time at the heating in winter, and in this embodiment 21, the defroster mode is selected at the IF time of warm-up to increase the power to remove the fog of the window glass, and the foot defroster mode is selected at the steady time to cope with both ensuring of the power to remove the fog of the window glass and exertion of the performance of heating the vehicle compartment.

Figure 34:
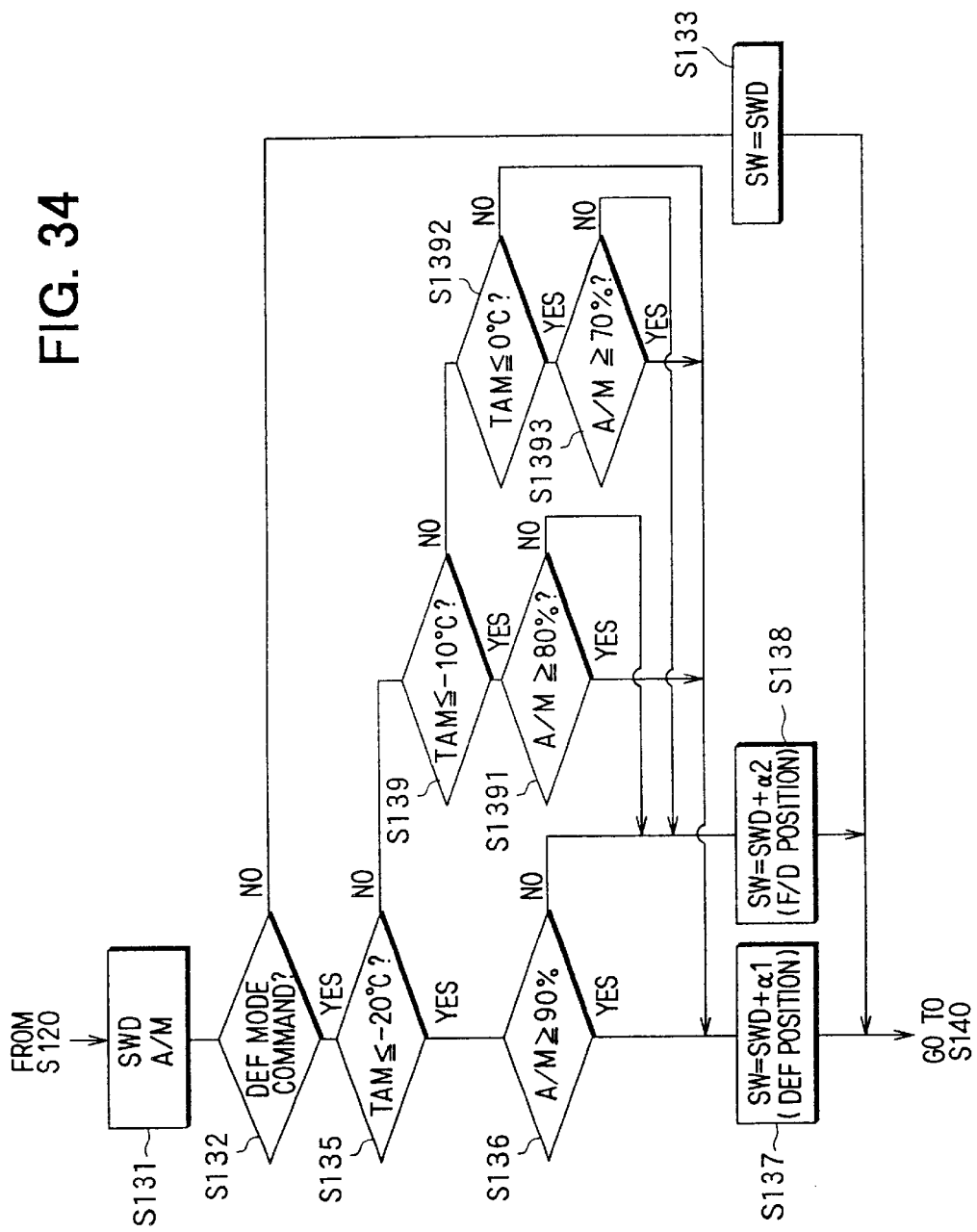
FIG. 34 is a flowchart of a main portion (twenty first embodiment)

A flowchart in FIG. 34 shows a specific example of switching control of the defroster mode and the foot defroster mode at the time when the defroster switch 33 is switched on according to the twenty-first embodiment.

First, at step S131, on the basis of the objective outlet temperature TAO, a temporal operation angle objective value SWD is calculated by the foregoing numerical expression, and an objective value of the opening degree (%) of the air mixing door 16 (hereinafter simply referred to as the A/M opening degree) is calculated by the expression of $\{(TAO-TE)/(TW-TE)\} \times 100$.

At next step S132, when it is determined that the instruction of the defroster mode is not issued, the procedure proceeds to step S133, and the objective value of the operation angle of the motor actuator 28 is made SW=SWD.

On the other hand, when the instruction of the defroster mode is issued by switching on the defroster switch 33, at next step S135, it is determined whether the outside air temperature TAM is a first predetermined value (for example, −20° C.) or less. When the determination is YES (at very cold time), the procedure proceeds to next step S136, and it is determined whether the A/M opening degree is a first predetermined value (for example, 90%) or more at the maximum heating side.

When the determination at step S136 is YES, it is assumed that the warm-up state (transitional state) immediately after the start of heating occurs, the procedure proceeds to next step S137, and the objective value of the operation angle of the motor actuator 28 is made SW=SWD+α1. The term α1 indicates a value by which the defroster mode position is obtained, and SWD+α1 indicates a value near θ6 in FIG. 32.

By this, in the warm-up state immediately after the start of heating at the very cold time, the defroster mode is set by switching on the defroster switch 33, so that the power to remove the fog of the window glass can be exerted by priority.

On the other hand, when the inside air temperature is raised by execution of the defroster mode and the A/M opening degree becomes smaller than 90%, the determination at step S136 becomes NO, and it is determined that the warm-up state (transitional state) has been shifted to the steady state. By this, the procedure proceeds from step S136 to step S138, and the objective value of the operation angle of the motor actuator 28 is made SW=SWD+α2. The term α2 indicates a value by which the foot defroster mode position is obtained, and SW=SWD+θ2 indicates a value near θ7 in FIG. 32.

By this, even at the time when the defroster switch 33 is switched on, the mode is automatically switched to the foot defroster mode, so that the heating power to the foot of the passenger can be raised, and it is possible to prevent a burning sensation of the face of the passenger by continuation of the defroster mode from occurring.

On the other hand, when the outside air temperature TAM is higher than the first predetermined value (for example, −20° C.), the procedure proceeds from step S135 to step S139, and it is determined whether the outside air temperature TAM is lower than a second predetermined value (for example, −10° C.). When the outside air temperature is lower than −10° C., the procedure proceeds to next step S1391, and it is determined whether the A/M opening degree is a second predetermined value (for example, 80%) or more at the maximum heating side.

When the determination at step S1391 is YES, it is assumed that the warm-up state occurs, the procedure proceeds to the foregoing step S137, the objective value of the operation angle of the motor actuator 28 is made SW SWD+α1, and the defroster mode is set.

When the inside air temperature is raised and the A/M opening degree becomes smaller than 80% by execution of the defroster mode, the determination at step S1391 becomes NO, and it is determined that the warm-up state has been shifted to the steady state. By this, the procedure proceeds from step S1391 to step S138, the objective value of the operation angle of the motor actuator 28 is made SW=SWD+α2, and the foot defroster mode is set.

Next, when the outside air temperature TAM is higher than the second predetermined value (for example, −10° C.), the procedure proceeds from step S139 to step S1392, and it is determined whether the outside air temperature TAM is lower than a third predetermined value (for example, 0° C.). When the outside air temperature TAM is lower than 0° C., the procedure proceeds to next step S1393, and it is determined whether the A/M opening degree is a third predetermined value (for example, 70%) or more at the maximum heating side.

When the determination at step S1393 is YES, it is assumed that the warm-up state occurs, the procedure proceeds to the foregoing step S137, the objective value of the operation angle of the motor actuator 28 is made SW=SWD+α1, and the defroster mode is set.

When the inside air temperature is raised and the A/M opening degree becomes smaller than 70% by execution of the defroster mode, the determination at step S1393 becomes NO, and it is determined that the warm-up state has shifted to the steady state. By this, the procedure proceeds from step S1393 to step S138, the objective value of the operation angle of the motor actuator 28 is made SW=SWD+α2, and the foot defroster mode is set.

From the above, when the outside air temperature TAM is −20° C. to 0° C., in the warm-up state immediately after the start of heating, the defroster mode is set by switching on the defroster switch 33, so that the power to remove the fog of the window glass can be exerted by priority. When the warm-up state is shifted to the steady state, even at the time when the defroster switch 33 is switched on, the mode is automatically switched to the foot defroster mode, so that the heating power to the foot of the passenger is raised, and it is possible to prevent a burning sensation of the face of the passenger by continuation of the defroster mode from occurring.

Next, when the outside are temperature TAM is higher than 0° C., the procedure always proceeds from step S141 to step S137, and the defroster mode is set. The reason is as follows: In general, when the outside air temperature TAM is higher than 0° C., in the steady state, the temperature of the window glass is raised so that the window glass is in a state where it is not easily fogged. Nevertheless, when the passenger switches on the defroster switch 33 to issue the instruction of the defroster mode setting, it is conceivable that the window glass is fogged by some specific factor.

Then, when TAM>0 C., the defroster mode is always set at step S137, so that the heating power is concentrically exerted for removing the fog of the window glass.

At the time of heating in winter, as the outside air temperature TAM becomes low, the load of heating becomes high. Thus, at the time of low outside air temperature, the opening degree of the air-mixing door 16 is stabilized at a large value at the maximum heating side.

Figures 35, 36:
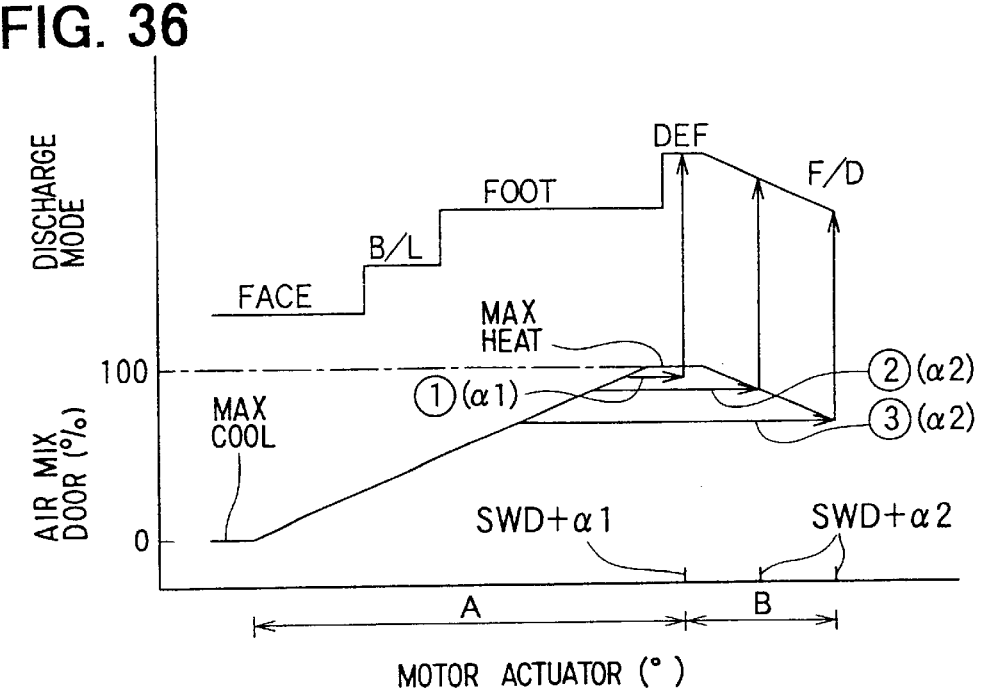
FIG. 35 is a graph showing operations (twenty first embodiment)
FIG. 36 is an operation characteristic view(twenty first embodiment)

Then, in the twenty-first embodiment, the determination values (first through third predetermined values) for determination of the warm-up state (transitional state) and the steady state are sequentially increased to the third predetermined value (70%)→second predetermined value (80%) → first predetermined value (90%), with the lowering of the outside air temperature TAM as described above. By this, even under a very cold condition, the shift to the steady state is certainly determined and the automatic switching to the foot defroster mode can be made. Thus, even at a very cold time, it is possible to prevent a burning sensation of the face of the passenger by long continuation of the defroster mode from occurring. FIG. 35 summarizes the operation of the automatic switching of the defroster mode and the foot defroster mode according to the twenty-first embodiment.

In the foregoing description of the operation, the objective value of the operation angle of the motor actuator 28 for setting the foot defroster mode is made SW=SWD+α2, and a specific method of setting α2 is not explained. However, as shown by arrows ② and ③, as the temporal operation angle objective value SWD becomes large (in other words, as the A/M opening degree becomes large), α2 is made small, so that-in the case where the foot defroster mode is set, at the side where the SWD and A/M opening degree are large, it is possible to set the foot defroster mode in which the defroster blown air volume is large as compared with the foot blown air volume.

Then, as the SWD and A/M opening degree become small, the defroster blown air volume is sequentially decreased, and the foot blown air volume can be increased. The arrow ① in FIG. 36 indicates al at the time of setting the defroster mode.

Twenty-second Embodiment

In the above twentieth and twenty-first embodiments, in the defroster setting region B, the defroster mode and the foot defroster mode are set. In the twenty-second embodiment, the foot defroster mode is set in the temperature controlling region A.

The foot defroster mode is generally used at a cold time, and it is required to raise both the power to remove the fog of the window glass and the heating power to the foot of the passenger.

Figure 37:
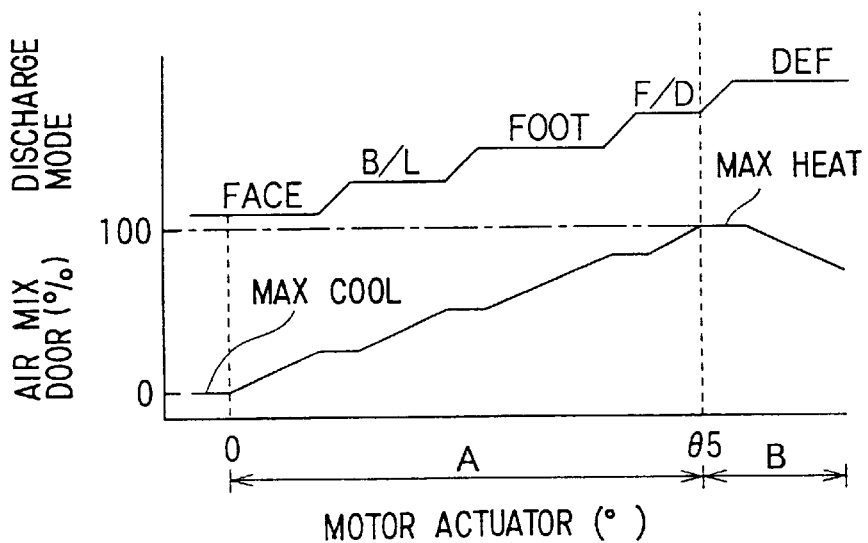
FIG. 37 is an explanatory view of operation characteristics (twenty second embodiment)

In view of this, in the twenty-second embodiment, as shown in FIG. 37, in the region of the temperature controlling region A where the operation angle of the motor actuator 28 becomes maximum, that is, at the side where the A/M opening degree is largest and adjacent to the maximum heating position, the defroster mode is set.

Thus, in the twenty-second embodiment, as the operation angle of the motor actuator 28 is increased, the outlet mode is switched in the temperature control region A in the sequence of face→bi-level→foot→foot defroster mode. In the defroster mode setting region B, only the defroster mode is set.

Twenty-third Embodiment

Figure 38:
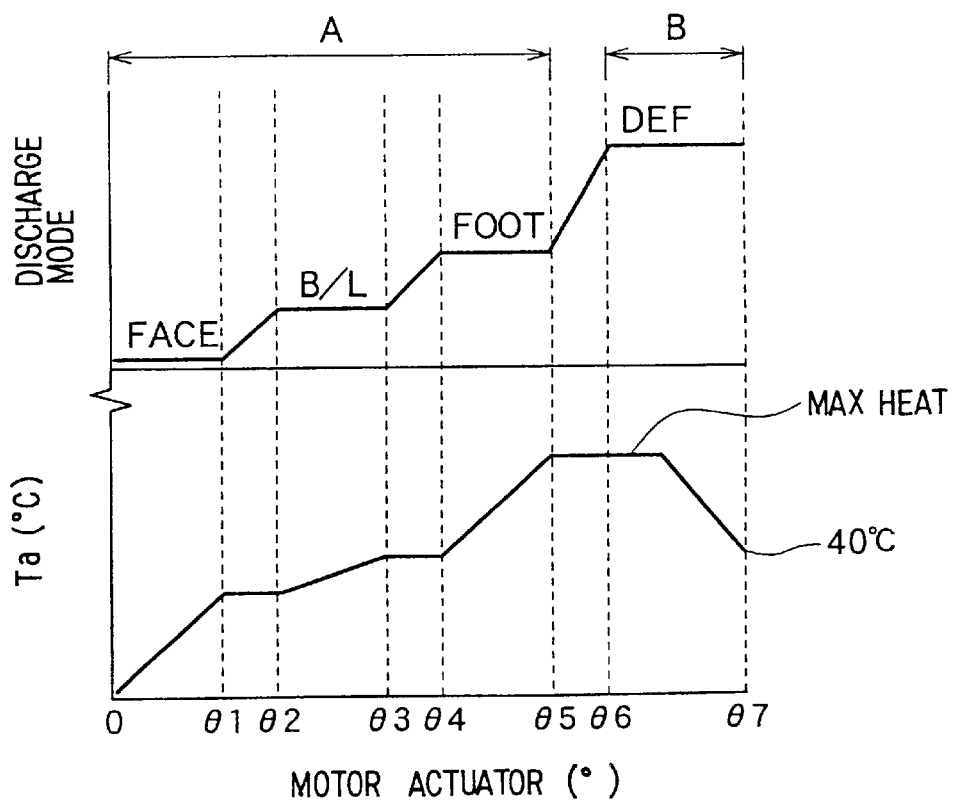
FIG. 38 is an explanatory view of operation characteristics (twenty third embodiment)

First, a problem to be solved by the twenty-third embodiment will be described. FIG. 38 corresponds to FIG. 7 of the first embodiment, and shows the relation between the operation angle of the motor actuator 28 and the temperature of blown air into the vehicle compartment and between the operation angle and the outlet mode. The defroster mode is set in the interval (=region B) of the operation angle=θ6 to θ7.

In the defroster mode, the opening degree of the air mixing door 16 is set, as shown in the lower stage of FIG. 7, in the range between the maximum heating state (opening degree 100%) and an intermediate opening degree at which the opening degree is decreased from the maximum heating state by a predetermined rate. Thus, the outlet temperature into the vehicle compartment in the defroster mode becomes the highest temperature in the maximum heating region to 40° C. on the basis of the opening degree of the air-mixing door. That is, in the defroster mode, the lower limit value of the outlet temperature into the vehicle compartment is restricted to about 40° C. The lower limit of this outlet temperature inevitably occurs from the restriction in the structure of the link mechanism 27 shown in FIG. 2.

Thus, in the state where air conditioning in the vehicle compartment is performed in the face mode or the bi-level mode in an intermediate period of spring or fall or in summer, when the passenger switches on the defroster switch 33 (FIG. 3) to remove the fog of the window glass and the defroster mode is set, the outlet temperature into the vehicle compartment is raised to a temperature near the lower limit value.

Figure 39:
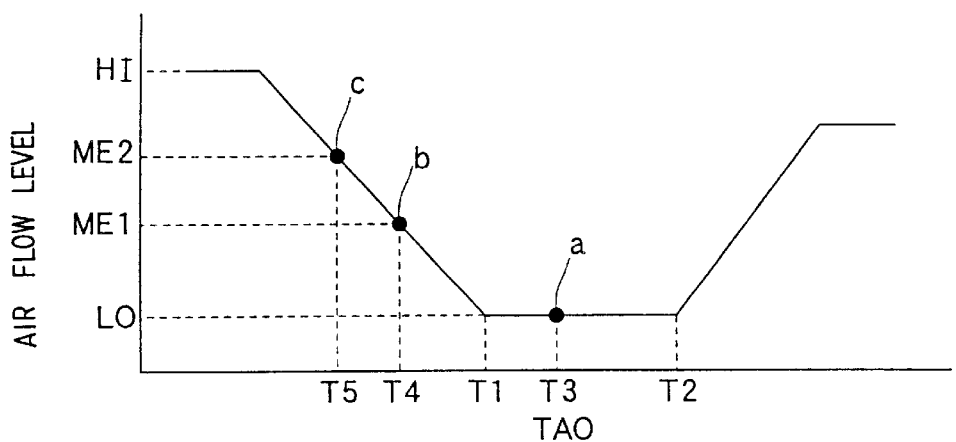
FIG. 39 is a characteristic view of air volume control for explaining a problem to be solved (twenty third embodiment)

Then, the inside air temperature (temperature in the vehicle compartment) Tr is raised, so that the objective outlet temperature TAO calculated from the numerical expression 1 is shifted to the low temperature side. As a result, the air volume of the blown air into the vehicle compartment is increased. This will be specifically described with reference to air volume control characteristics of FIG. 39. FIG. 39 is substantially LA the same as FIG. 33A. In an intermediate temperature region (T1≦TAO≦T2) of the objective outlet temperature TAO, the air volume level (objective air volume BLW) of the blown air into the vehicle compartment becomes a minimum air volume LO. In a low temperature region (TAO<T1) of the TAO, the blown air volume is increased as the TAO becomes low. On the other hand, in a high temperature region (TAO>T2) of the TAO, the blown air volume is increased as the TAO is raised.

In the steady operation of the intermediate period, the TAO is in the vicinity of T3 (point a) of the intermediate temperature region, and the air volume level becomes the minimum value LO and is stable. However, when the defroster mode is set in the intermediate period, there occurs a cycle of rise in blown air temperature→rise in inside air temperature Tr → drop in TAO→ increase in air volume. The example in FIG. 39 shows a case where the TAO is lowered from t1 (point a) to T4 (point b) by setting of the defroster mode. By the drop in the TAO, the air volume level is increased from the minimum level LO to a predetermined intermediate level ME1 by a predetermined amount. There occurs such a vicious circle that the supply heat quantity Q into the vehicle compartment is increased by the increase in the air volume level, and the rise in the inside air temperature Tr is further accelerated.

Also in summer, for example, when the defroster mode is set in the case where the air volume level is at the intermediate level ME1 (point b) in FIG. 39 before the defroster mode is set, the TAO is lowered from T4 (point b) to T5 (point c), and the air volume level is increased to the intermediate level ME2 in FIG. 39, and after all, there occurs such a vicious circle that the rise in the inside air temperature Tr is accelerated.

Like this, when the defroster mode is set in the intermediate period of spring or fall or in summer, the supply heat quantity Q into the vehicle compartment is increased and the inside air temperature Tr is raised, so that the passenger feels a burning sensation and an air conditioning feeling is deteriorated.

Then, in view of the above, the twenty-third embodiment has been devised for the purpose of preventing the deterioration of an air conditioning feeling due to the setting of the defroster mode in the intermediate period of spring or fall or in summer.

For that purpose, in the twenty-third embodiment, under the environmental condition of the intermediate period or summer, an increase in the supply heat quantity Q into the vehicle compartment resulting from the setting of the defroster mode is suppressed.

Figure 40:
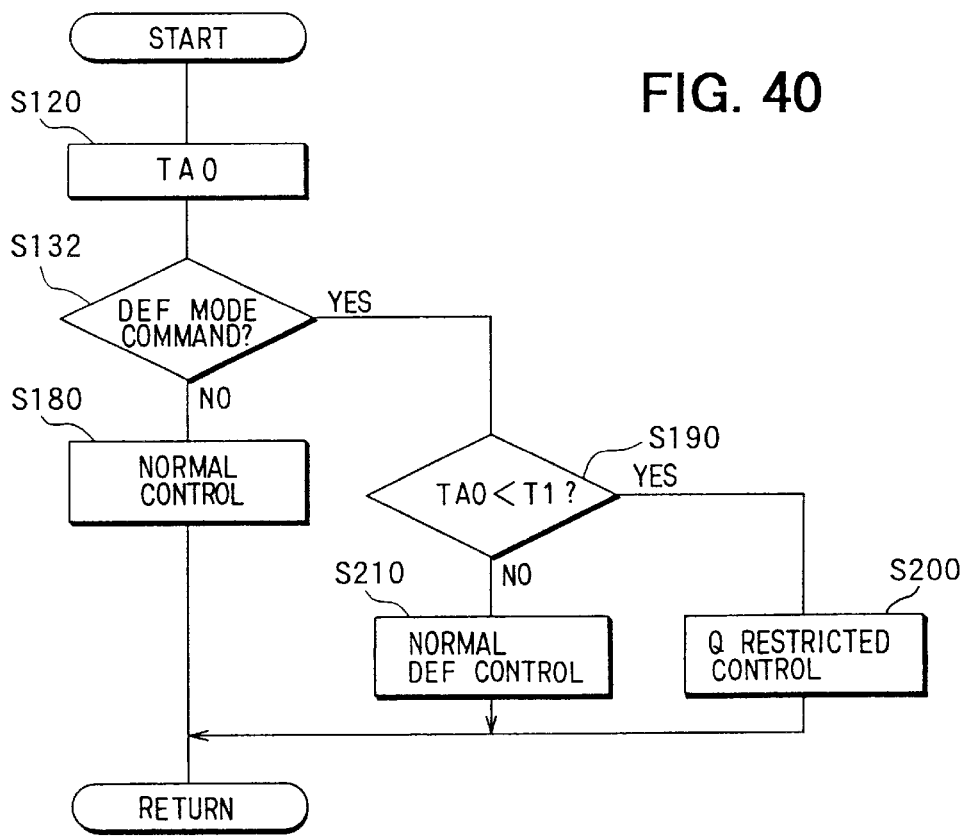
FIG. 40 is a flowchart showing control (twenty third embodiment)

FIG. 40 is a flowchart showing control at the time of the defroster mode according to the twenty-third embodiment.

First, at step S120, the objective outlet temperature TAO is calculated by a method similar to the step S120 in FIG. 5. At next step S132, similarly to the step S132 in FIG. 6, the existence of the instruction of the defroster mode is determined based on whether the defroster switch 33 (FIG. 3) is switched (ON, OFF).

When the instruction of the defroster mode is not issued, the procedure proceeds to step S180, and normal air conditioning control based on the TAO is performed. That is, in the respective outlet modes of face, bi-level and foot, the control processing of the step S130 to the step S160 in FIG. 5 is performed on the basis of the TAO.

On the other hand, when the instruction of the defroster mode is issued, the procedure proceeds from step S132 to step S190, and it is determined whether the TAO is in a low temperature region lower than a predetermined temperature T1 (for example, 10° C.) in FIG. 39. Here, the predetermined temperature T1 is a TAO determination value used for determination as to whether it fulfills the condition that the supply heat quantity Q into the vehicle compartment is increased by execution of the defroster mode.

Figure 41:
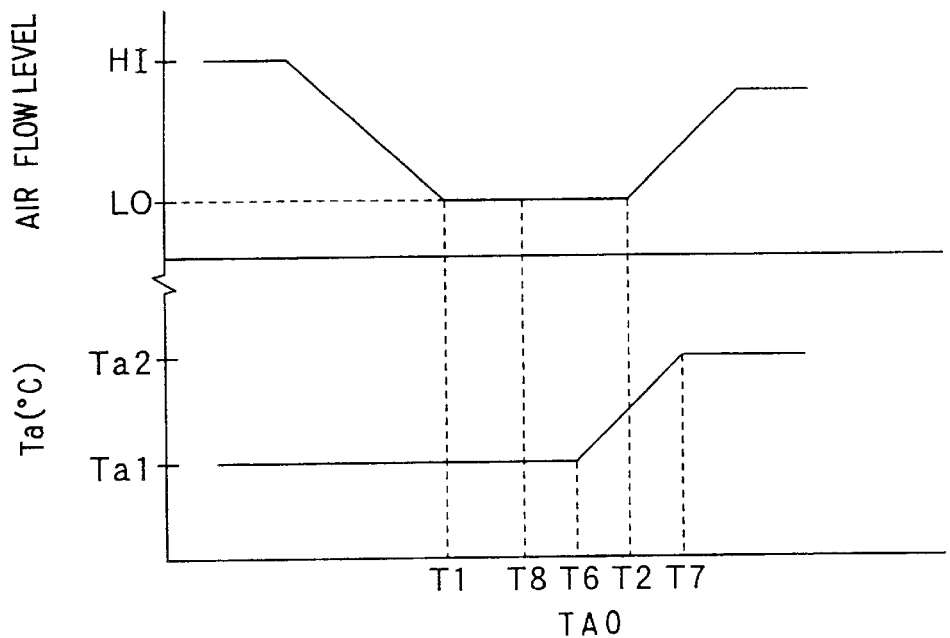
FIG. 41 is an explanatory view of operation characteristics (twenty third embodiment)

This will be further described with reference to FIG. 41. FIG. 41 shows a case where the air volume control characteristic view of FIG. 39 is combined with a outlet temperature control characteristic view of the defroster mode, and the outlet temperature Ta of the defroster mode can be controlled between a lower limit value Ta1 (for example, 40° C.) shown in FIG. 41 and a highest value Ta2 (for example, 65° C.) by maximum heating. However, from the restriction by the foregoing link mechanism 27, when the TAO is lower than a predetermined temperature T6 (for example, 40° C.) of the intermediate temperature region, the outlet temperature Ta of the defroster mode is kept fixed to the lower limit value Ta1.

Thus, when the TAO is in a low temperature region lower than the predetermined temperature T1 (for example, 10° C.) at the time of setting the defroster mode, it can be determined that this case fulfills the condition that under air conditioning conditions in the intermediate period or in summer, the supply heat quantity Q is increased through a rise (rise to Ta1) in the outlet temperature Ta by execution of the defroster mode o rise in the inside air temperature Tr→drop in the TAO→increase in the air volume.

Thus, when the TAO is lower than the predetermined temperature T1, the procedure proceeds to step S200, and defroster mode control with restriction of heat quantity Q is performed. That is, the blown air volume BLW is controlled so that the supply heat quantity Q is kept the supply heat quantity immediately after the defroster mode instruction.

Here, although the outlet temperature Ta may be controlled for the control of the supply heat quantity Q, under the environmental condition in the intermediate period or in summer, that is, when TAO<T1, since the outlet temperature Ta in the defroster mode is fixed to the lower limit value Ta1, the outlet temperature Ta can not be lowered for the control of the supply heat quantity Q. Thus, the supply heat quantity Q at the time of the defroster mode is controlled by restriction of the blown air volume BLW.

More specifically, at step S200, the blown air volume BLW determined by the TAO immediately after the defroster mode instruction is kept irrespectively of a subsequent drop in the TAO. That is, when TAO<T1, the blown air volume BLW is limited (fixed) to the air volume immediately after the defroster mode instruction. As a result, it is possible to prevent a vicious circle of rise in the inside air temperature Tr→drop in the TAO→ increase in the blown air volume BLW→rise in the inside air temperature Tr from occurring after execution of the defroster mode.

Thus, even at the time of the defroster mode in the intermediate period or in summer, it is possible to suppress a burning sensation of the passenger due to the increase in the supply heat quantity Q (inside air temperature Tr).

On the other hand, when it is determined that the TAO is higher than T1 at step S190, the procedure proceeds to step S210, and normal defroster mode control is performed. That is, in the normal defroster mode control, as already described in the first embodiment, the operation angle of the motor actuator 28 is determined on the basis of the TAO, the opening degree of the air mixing door is determined according to this, and from this, the outlet temperature Ta is determined as shown in FIG. 41. Besides, the blow nair volume BLW is also determined on the basis of the TAO as shown in FIG. 41.

In the twenty-third embodiment, at step S200, the blown air volume BLW immediately after the defroster mode instruction is kept irrespectively of the subsequent drop in the TAO.

However, when the blown air volume BLW immediately after the defroster mode instruction is larger than the minimum air volume LO, the blown air volume can be lowered. Thus, the blown air volume BLW may be lowered to the minimum air volume LO or the blown air volume BLW may be lowered by a predetermined amount.

That is, since the outlet temperature in the face mode or the bi-level mode used in the intermediate period or in summer is normally lower than the lower limit value Ta1 of the outlet temperature Ta in the defroster mode, when the outlet mode is switched to the defroster mode, the outlet temperature is raised. Then, when the blown air volume can be lowered, it is more preferable for improvement of an air conditioning feeling that the rise in the outlet temperature resulting from the switching to the defroster mode is suppressed (cancelled) by the lowering of the blown air volume.

Twenty-fourth Embodiment

In the twenty-third embodiment, the description has been made on the case where only the defroster mode is set in the defroster setting region B as shown in FIG. 38. The twenty-fourth embodiment relates to a case where as shown in FIG. 42, both the defroster mode and the foot defroster mode are set in the defroster setting region B.

Figure 42:
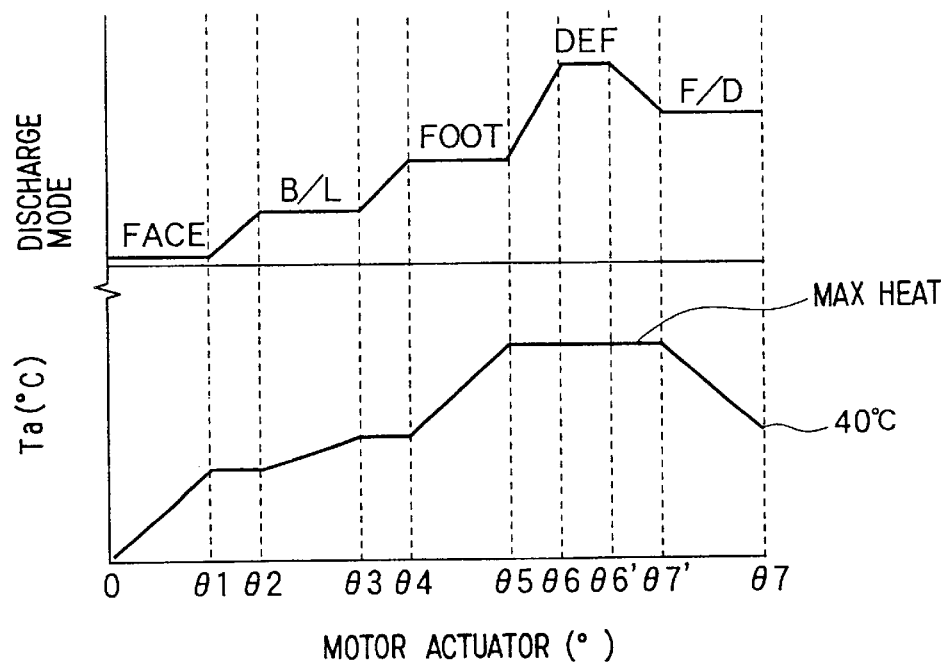
FIG. 42 is an explanatory view of operation characteristics (twenty fourth embodiment)

FIG. 42 is a view corresponding to FIG. 32 of the embodiment 20. In FIG. 42, the defroster mode is set in an interval of the operation angle=θ6 to θ6' of the motor actuator 28. An interval of the operation angle=θ6' to θ7' is for switching the defroster mode and the foot defroster mode, and the foot defroster mode is set in an interval of the operation angle=θ7' to θ7.

Like this, in the case where both the defroster mode and the foot defroster mode are set in the defroster setting region B, under the environmental condition in the intermediate period or in summer, the control with the heat quantity restriction by the step S200 of FIG. 40 is performed in both the defroster mode and the foot defroster mode. By this, even at the time of setting the foot defroster mode, it is possible to suppress a burning sensation of the passenger due to the increase (rise in the inside air temperature Tr) of the supply heat quantity Q and to suppress deterioration of an air conditioning feeling.

Here, the twenty-fourth embodiment may be structured such that in the control flowchart of FIG. 40, it is determined at step S132 whether the instruction of the defroster mode or the foot defroster mode is issued or not, and when the instruction is issued, the processing of the defroster mode or the foot defroster mode is carried out at steps S190, S200 and S210.

Twenty-fifth Embodiment

As described above, since the outlet temperature in the face mode or the bi-level mode used in the intermediate period or in summer is generally lower than the lower limit value Ta1 of the outlet temperature Ta in the defroster mode, when the outlet mode is switched to the defroster mode (or the foot defroster mode), the outlet temperature is raised, and the supply heat quantity into the vehicle compartment is increased. However, when the blown air amount BLW immediately after the defroster mode instruction is the minimum air volume LO, the increase of the supply heat quantity into the vehicle compartment can not be suppressed (cancelled) by lowering of the blown air volume.

Figure 43:
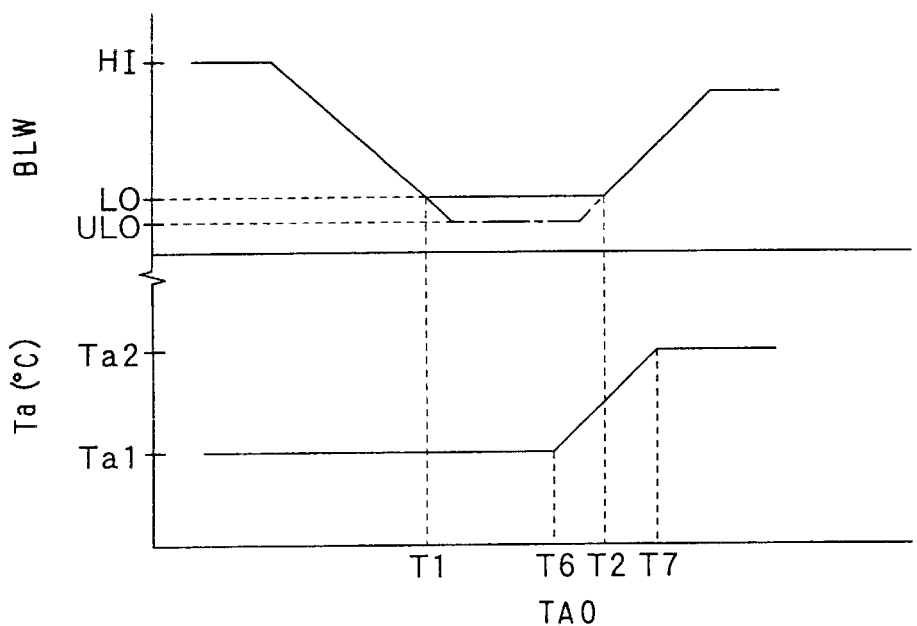
FIG. 43 is an explanatory view of operation characteristics (twenty fifth embodiment)

Then, in the twenty-fifth embodiment, as shown in FIG. 43, at the time of the defroster mode or the foot defroster mode, as the control characteristic of the blown air volume BLW, a minute air volume (ultra LO) ULO further smaller than the lowest air amount LO at the normal control time can be set.

According to the twenty-fifth embodiment, since the blown air volume BLW can be lowered to the minute air volume ULO further smaller than the lowest air amount LO at the normal control time, it is possible to suppress the increase of the supply heat quantity into the vehicle compartment by compensating, through the lowering of the blown air volume, the fact that the outlet temperature Ta can not be lowered from the lower limit temperature Ta1.

As a result, according to the twenty-fifth embodiment, under the environmental condition in the intermediate period or in summer, it becomes possible to keep the supply heat quantity into the vehicle compartment before and after the setting of the defroster mode or the foot defroster mode constant, and the deterioration of the air conditioning feeling can be further effectively suppressed.

Twenty-sixth Embodiment

As shown in FIG. 39, when the defroster mode or the foot defroster mode is set under the environmental condition in the intermediate period or in summer, there occurs a vicious circle of rise in the inside air temperature Tr due to the rise in the outlet temperature Ta (heat quantity Q→drop in the TAO → increase in the blown air volume BLW→rise in the inside air temperature Tr, and this vicious circle is caused by the drop in the TAO.

Then, in the twenty-sixth embodiment, attention has been paid to this point, the TAO immediately after the instruction of the defroster mode or the foot defroster mode is stored (fixed) as a reference TAOα, and the subsequent air conditioning control of the defroster mode or the foot defroster mode is carried out on the basis of this reference TAOα.

According to this, even if the inside air temperature Tr is raised by execution of the defroster mode or the foot defroster mode, the blown air volume BLW can be determined on the basis of the reference TAOS. Specifically, when the TAO immediately after the instruction of the defroster mode or the foot defroster mode is T8 in FIG. 41, T8=reference TAOα is stored. Thereafter, even if the inside air temperature Tr is raised, the blown air volume BLW is fixed to the minimum air volume LO on the basis of the reference TAOα (=T8).

By this, the increase in the supply heat quantity into the vehicle compartment due to the increase in the blown air volume can be suppressed and the deterioration of the air conditioning feeling can be suppressed.

Twenty-seventh Embodiment

Figure 44:
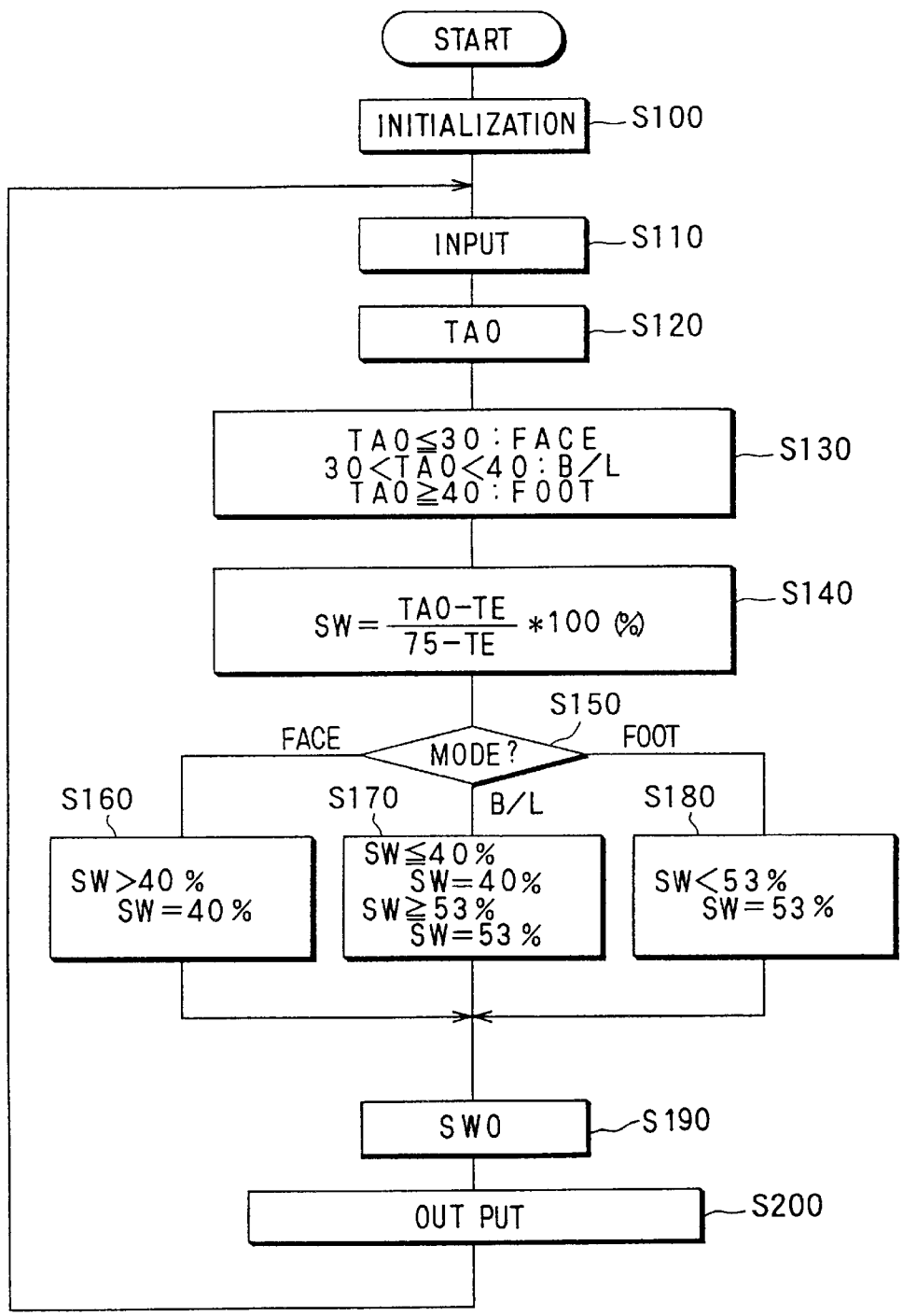
FIG. 44 is a flowchart showing air conditioning control (twenty seventh embodiment)

In the structure of the first embodiment shown in FIGS. 1, 3 and 4, the operation of the twenty-seventh embodiment will be described. A flowchart in FIG. 44 shows control processing executed by a microcomputer of the air conditioning electric control unit 41, and a control routine of FIG. 44 is started when the auto-switch 32 of the air conditioning operation panel 30 is switched on in the state where an ignition switch of a vehicle engine is turned on and power is supplied to the control unit 41.

First, at step S1100, a flag, a timer and the like are initialized, and at next step S1110, detection signals from the sensor groups 42 and 43, operation signals from the air conditioning operation panel 30, and the like are read in.

Subsequently, the procedure proceeds to step S1120, and on the basis of the following numerical expression, the objective outlet temperature TAO of air-conditioning air blown into the vehicle compartment is calculated in accordance with the heat load conditions (inside air temperature TR, outside air temperature TAM, solar radiation amount TS) of air conditioning. This objective outlet temperature TAO is an outlet temperature necessary for keeping the inside of the vehicle compartment a set temperature Tset of the temperature setting part 31.

$$TAO = Kset \times Tset - Kr \times TR - Kam \times TAM - Ks \times TS + C$$

Where, Kset, Kr, Kam, and Ks are control gains, Tset, TR, TAM, and TS are the foregoing set temperature, inside air temperature, outside air temperature, and solar radiation amount, and C is a constant for correction.

Next, the procedure proceeds to step S1130, and the outlet mode is determined on the basis of the objective outlet temperature TAO. Specifically, the time when the evaporator outlet temperature TE is 0° C., that is, the time (see FIG. 45 described later) when A/M opening degree correction by TE is not performed, is made a standard, and the outlet mode is determined as set forth in the following example.

1. TAO<30° C.: face mode
2. 30° C.<TAO<40° C.: bi-level mode
3. TAO>40° C.: foot mode Next, the procedure proceeds to step S1140, and the correction calculation through the evaporator outlet temperature TE is performed by the following numerical expression, and the objective A/M opening degree is calculated.

$$SW = \{(TAO-TE)/(75-TE)\} \times 100 \ (\%)$$

Where, in the above expression, the value of 75 is a typical value of the hot water temperature TW of the heater core 13. In the calculation at this step S1140, a correction amount at TE=0° C. becomes 0, and when the TE is a positive value, as shown by a broken line in FIG. 45, the objective A/M opening degree SW becomes small, and the A/M opening degree is corrected to the side of the maximum cooling side. On the contrary, when the TE is a negative value, as indicated by a chain line in FIG. 45, the objective A/M opening degree SW becomes large, and the A/M opening degree is corrected to the maximum heating side. Incidentally, TE=−15° C. of FIG. 45 occurs at the time of introducing the outside air in a cold district.

Next, the procedure proceeds to step S1150, and the outlet mode determined at step S1130 is determined. When the outlet mode is the face mode, the procedure proceeds to step S1160, and the objective A/M opening degree SW at the face mode is finally determined as follows: That is, when the objective A/M opening degree calculated at step S1140 is 40% or less, the calculated objective A/M opening degree SW is directly made the final objective A/M opening degree at the time of the face mode.

When the objective A/M opening degree SW calculated at step S1140 is larger than 40%, the final objective A/M opening degree at the time of the face mode is made SW=40%. That is, at the time of the facemode, the upper limit of the objective A/M opening degree SW is clamped to 40%.

On the other hand, when it is determined at step S1150 that the mode is the bi-level mode, the procedure proceeds to step S1170, and the objective A/M opening degree SW at the bi-level mode is finally determined as follows: That is, when the objective A/M opening degree calculated at step S1140 is 40% or less, the opening degree is made constant and is SW =40%, and when the calculated objective A/M opening degree SW is 53% or more, the opening degree is made constant and is SW=53%.

That is, at the time of the bi-level mode, the lower limit of the objective A/M opening degree SW is clamped to 40%, and the upper limit is clamped to 53%. When the calculated objective A/M opening degree SW is between 40% and 53%, the calculated objective A/M opening degree SW is directly made the final objective A/M opening degree at the bi-level mode.

On the other hand, when it is determined at step S1150 that the mode is the foot mode, the procedure proceeds to step S1180, and the objective A/M opening degree SW at the foot mode is finally determined as follows: That is, when the objective A/M opening degree SW calculated at step S1140 is 53% or more, the calculated objective A/M opening degree is directly made the final objective A/M opening degree.

When the objective A/M opening degree calculated at step S1140 is less than 53%, the final objective A/M opening degree at the foot mode is made SW=53%. That is, at the foot mode, the lower limit of the objective A/M opening degree is clamped to 53%.

Next, the procedure proceeds to step S1190, and the objective operation angle SWO(°) of the motor actuator 28 is calculated on the basis of the objective A/M opening degrees SW (%) determined at the steps S1160, S1170, and S1180. That is, from the expression SWO=SW×K (°), calculation is made. Here, K is a coefficient for converting the objective A/M opening degree SW (%) into the operation angle (°).

Next, the. procedure proceeds to step S1200, a control value determined on the basis of the objective operation angle SWO and a value of the potentiometer 43 indicating an actual operation angle of the motor actuator 28 is outputted to the motor actuator 28, and the actual operation angle of the motor actuator 28 is made coincident with the objective operation angle SWO.

Figure 46:
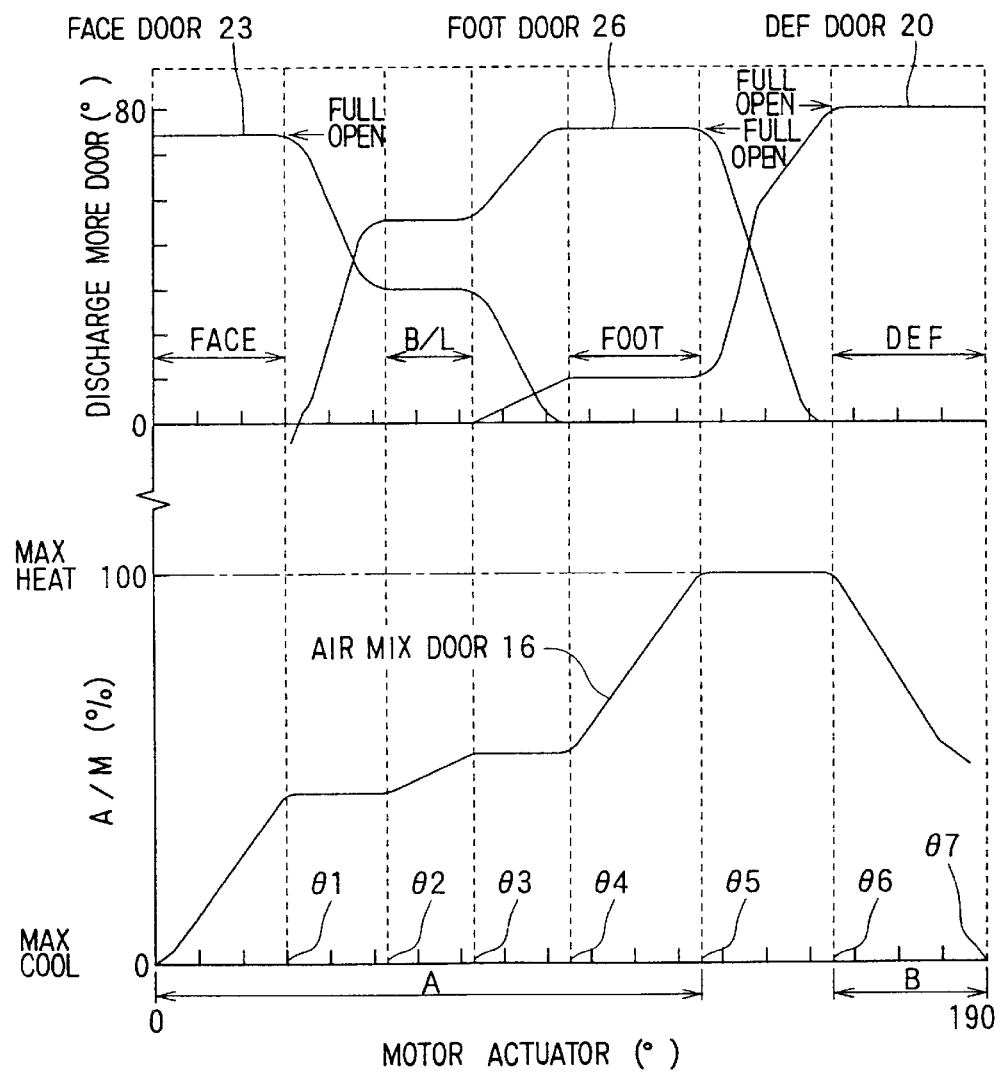
FIG. 46 is an explanatory view of motor actuator operation characteristics (twenty seventh embodiment)

Next, control characteristics between the operation angle of the motor actuator 28 and the outlet temperature control and between the operation angle and the outlet mode switching will be described concretely with reference to FIG. 46. In FIG. 46, the horizontal axis indicates the operation angle (°) of the motor actuator 28, and the vertical axis indicates the A/M opening degree (%) and the rotation angle (°) of the outlet mode doors 20, 23 and 26.

Region A of the horizontal axis indicates a temperature control region of the operation angle of the motor actuator 28. This temperature control region A has an operation angle range (range of 0° to a predetermined value θ5 of the horizontal axis in FIG. 46).

At the operation angleθ=0° of the motor actuator 28, the opening degree of the air mixing door 16 is made the maximum cooling position of 0%. This maximum cooling position is a position, as shown by the solid line in FIG. 1, where the air passage of the heater core 13 is fully closed and the cool air bypass passage 15 is fully opened.

The operation angle of the motor actuator 28 is sequentially increased from 0 to θ1, θ2, θ3 and θ4, and the opening degree of the air mixing door 16 is increased, and when the operation angle is increased up to θ5, the air mixing door 16 is operated to the maximum heating position of the opening degree:100% by the motor actuator 28. This maximum heating position is a position, as shown by the two-dot chain line in FIG. 1, where the cold air bypass passage 15 is fully closed and the air passage of the heater core 13 is fully opened.

Like this, in the temperature control region A of the operation angle of the motor actuator 28, the opening degree (operation position) of the air mixing door 16 is continuously changed from the maximum cooling position of 0% to the maximum heating position of the door opening degree= 100%, so that the mixing ratio of cool air to hot air is adjusted and the outlet temperature into the vehicle compartment can be controlled.

At the same time as this, in the temperature control region A, in conjunction with the change of the opening degree of the air mixing door 16, the outlet mode is changed as follows: That is, in the interval of the operation angle=0 to θ1 of the motor actuator 28, the rotation angles of the defroster door 20 and the foot door 26 of the three outlet mode doors become 0 through the link mechanism 27 in FIG. 2, and the defroster opening portion 19 and the foot opening portion 24 are fully closed. On the other hand, the rotation angle of the face door 23 becomes the maximum, and the face outlet 22 is fully opened, so that the face (FACE) mode in which air is blown to the head side of the passenger is set.

Next, in the range of the operation angle=θ2 to θ3, the defroster door 20 keeps the fully closed state of the defroster opening portion 19, and the face door 23 and the foot door 26 respectively open the face opening portion 22 and the foot opening portion 24 by a predetermined opening degree, so that the bi-level (B/L) mode in which air is blown to both the head side of the passenger and the foot side is set.

Next, in the range of the operation angle=θ4 to θ5, the rotation angle of the face door 23 becomes 0 so that the face opening portion 22 is fully closed, and the rotation angle of the foot door 26 becomes maximum so that the foot opening portion 24 is fully opened. Besides, the defroster door 20 is rotated by a small angle and the defroster outlet 19 is opened by a small opening degree. By this, the foot (FOOT) mode in which air is mainly blown to the foot side of the passenger and a small amount of air is blown to the window glass side is set.

Here, the range of the operation angle=θ1 to θ2 and the interval of the operation angle θ3 to θ4 are intervals where the outlet mode doors 20, 23 and 26 are rotated and displaced to switch the outlet mode, and thus, the opening degree of the air mixing door 16 is not changed in the intervals but is kept constant.

As described above, in the temperature control region A, by changing the operation angle of the one common motor actuator 28, the change of the opening degree (control of the outlet temperature) of the air mixing door 16 and the switching of the outlet mode (switching between the respective modes of face, bi-level and foot) can be carried out in conjunction with each other.

The defroster switch 33 (FIG. 3) constitutes defroster mode instruction means for issuing the instruction of the defroster mode. When the passenger determines that removal of fog of the window glass is necessary and the defroster switch 33 is switched on, at the foregoing step S190, the operation angle SWO of the motor actuator 28 is calculated by SWO=SW ×K+α(°)

Figure 45:
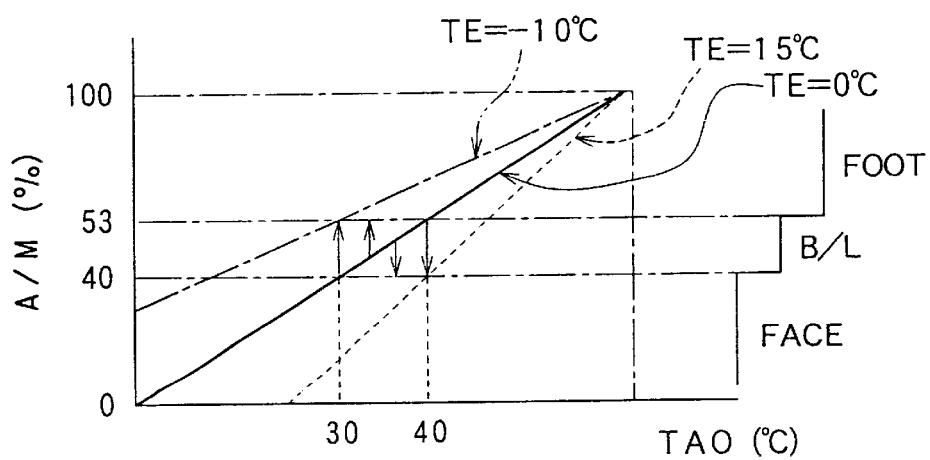
FIG. 45 is an explanatory view of correction of evaporator outlet temperature TE (twenty seventh embodiment)

This predetermined value ax is for forcibly increasing the operation angle of the motor actuator 28 to an angle range larger than θ6 (θ6>θ5) in FIG. 45, and by addition of this predetermined value α, the operation angle of the motor actuator 28 is made to shift to the defroster setting region B positioned outside of the temperature control region A.

In this defroster setting region B, the rotation angles of the face door 23 and the foot door 26 become 0 so that both the face opening portion 22 and the foot opening portion 24 are fully closed, and further, the rotation angle of the defroster door 20 becomes maximum so that the defroster opening portion is fully opened. Thus, the defroster (DEF) mode is set. By this, the whole amount of blown air can be blown to the window glass side, and the power to remove the fog of the window glass can be exerted to the utmost.

Here, the range of the operation angle=θ5 to θ6 is an interval in which the foot door 26 and the defroster door 20 are rotated and displaced for switching to the defroster mode, and thus, the opening degree of the air mixing door 16 is not changed in this interval and is kept at the maximum heating position. Also in the defroster setting region B, the outlet temperature can be automatically controlled by changing the predetermined value α.

Next, "control characteristics of TE correction at A/M opening degree correction and outlet mode switching" of the main part of the present invention will be described more specifically. In this embodiment, with respect to the change of the evaporator outlet temperature TE, the upper limit of the objective A/M opening degree SW is clamped to 40% at the face mode, the lower limit and the upper limit of the objective A/M opening degree SW at the bi-level mode are respectively clamped to 40% and 53%, and the lower limit of the objective A/M opening degree SW at the foot mode is clamped to 53%.

Like this, since the lower limit and the upper limit of the objective A/M opening degree are clamped (restricted) within the predetermined opening degree range according to the respective outlet modes, the TE correction of the objective A/M opening degree is performed in this restricted opening degree range. As a result, the outlet mode is not switched even if the TE correction of the objective A/M opening degree SW is performed.

Thus, air of a outlet temperature of 30° C. or less can always be blown at the face mode, air of a outlet temperature of 30° C. to 40° C. can always be blown at the bi-level mode, and air of a outlet temperature of 40° C. or higher can always be blown at the foot mode.

Thus, in an air conditioner for a vehicle for performing the A/M opening degree control (outlet temperature control) in conjunction with the switching of the outlet mode (switching between the respective modes of face, bi-level and foot) by changing the operation angle of the one common motor actuator 28, even if the TE correction of the objective A/M opening degree SW is performed, it is possible to prevent the occurrence of such disadvantage that the warm air exceeding 30° C. is blown at the face mode or the low temperature air of 40° C. or lower is blown at the foot mode.

Twenty-eighth Embodiment

In the twenty seventh embodiment, when the objective A/M opening degree SW is calculated, the SW is calculated by applying the value of 75° C. as a typical value of the hot water temperature TW of the heater core 13 to the numerical expression 2, and correction calculation of the SW through the hot water temperature TW of the heater core 13 is not performed. In the twenty-eighth embodiment, when the objective A/M opening degree SW is calculated, the correction calculation through the hot water temperature TW is added to the TE correction based on the following numerical expression.

$$SW=\{(TAO-TE)/(TWD-TE)\}\times 100\ (\%)$$

Where, TWD is a temperature in which an upper limit and a lower limit of the actual hot water temperature TW detected by a water temperature sensor of the sensor group 24 are clamped.

Figure 47:
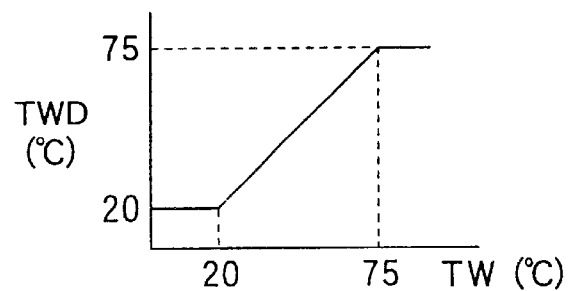
FIG. 47 is an explanatory view of correction of hot water temperature TW (twenty eighth embodiment)
Figure 48:
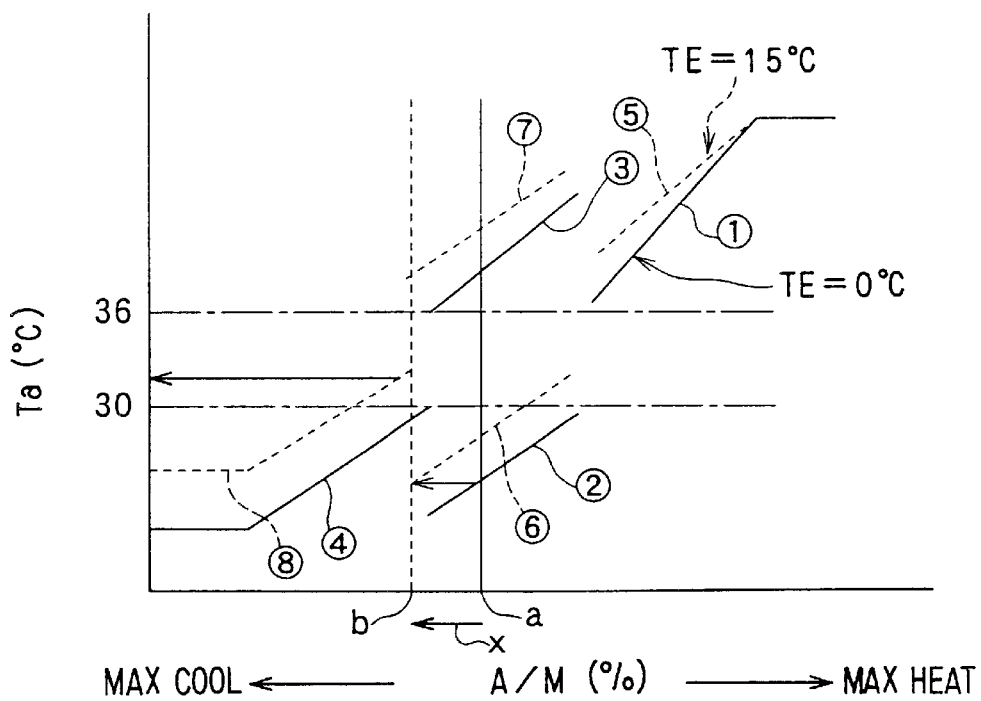
FIG. 48 is an explanatory view of a problem to be solved by the present invention.

In the example of FIG. 47, the upper limit of the TWD is clamped to 75° C., and the lower limit is clamped to 20° C.

In the case where the upper limit and the lower limit of the hot water temperature TW are not clamped, for example, when the objective A/M opening degree is corrected toward a high opening degree side at the time of low water temperature, with that, the outlet mode is switched from the bi-level mode to the foot mode, and therefore, there can occur such a disadvantage that the low temperature air is blown to the foot side of the passenger.

On the other hand, in the twenty-eighth embodiment, in the case where the correction calculation through the hot water temperature TW is performed, since the hot water is clamped to the predetermined range of 20° C. to 75° C., for example, at the time of low water temperature, correction to the high opening degree side of the objective A/M opening degree SW is restricted to prevent the outlet mode from switching from the bi-level mode to the foot mode, and it is possible to prevent the low temperature air of 40° C. or lower from being blown to the foot side of the passenger.

On the contrary, at the time of high water temperature, correction of the objective A/M opening degree SW to the low opening degree side is restricted to prevent the outlet mode from switching from the bi-level mode to the face mode, and it is possible to prevent the high temperature air of 30° C. or higher from being blown to the head side of the passenger.

Modifications

According to the above-described embodiments, as temperature control means for controlling the temperature of blown air into the vehicle compartment, the air mixing door 16 for adjusting the air volume ratio of the cool air passing through the cool air bypass passage 15 to the warm air passing through the heater core 13 is used. However, a hot water valve or the like for adjusting the flow rate of hot water passing through the heater core 13 may be used as the temperature control means.

According to the above-described embodiments, although the description has been made on the front seat side air conditioner in which the defroster mode is set, the present invention may be applied to a rear seat side air conditioner in which the defroster mode is not set, but only the face, bi-level and foot modes, or only the face and foot modes are set as the outlet modes.

Besides, in an air conditioner for independently controlling air conditioning of a plurality of regions such as a driver's seat side region and an assistant driver's seat side region in a vehicle compartment, air conditioning control of the plurality of regions may be carried out by providing one motor actuator for controlling the operation of temperature control means and the operation of a outlet mode door for each of the plurality of regions.

Besides, in the link mechanism 27 in FIG. 2, the cam groove 271 for driving the air-mixing door 16 is formed in the temperature controlling link 270c on stituting the driving link, and the air mixing door 16 is driven by this link 270. However, the cam groove 271 for driving the air-mixing door 16 may be formed in the outlet mode link 274 constituting the follower link, and the air-mixing door 16 can also be driven by this link 274.

In the link mechanism 27 of the first embodiment (FIG. 2) and the fourteenth embodiment (FIG. 26), three cam grooves, that is, the cam groove 278 for driving the defroster door 20, the cam groove 270 for driving the face door 23, and the cam groove 280 for driving the foot door 26 are provided in the outlet mode link 274. However, by using an integral door part such as the rotary door 103 in FIG. 27 or the film door 114 of FIG. 28 as the outlet mode door, the cam groove of the outlet mode link 274 can be constituted by one cam groove 73 in FIG. 27 or 28.

In the embodiment in FIG. 46, although only the defroster mode is set in the defroster setting region B, in addition to the defroster mode, the foot defroster mode in which substantially the same amount of air is blown from both the foot opening portion 24 and the defroster opening portion 19 may be set in the defroster setting region B.

The foot defroster mode may be set in the temperature control region A. That is, mode setting may be made such that as the operation angle of the motor actuator 28 is increased, the outlet mode is switched in the sequence of face modes bi-level mode→foot mode→foot defroster mode in the temperature control region A, and only the defroster mode is set in the defroster mode setting region B.

What is claimed is:

1. An air conditioner for a vehicle, comprising:

temperature control means for controlling an outlet temperature into a vehicle compartment;

a plurality of outlets for blowing air into respective portions in the vehicle compartment;

outlet mode doors for opening and closing the plurality of outlets to switch an outlet mode; and one motor actuator for driving the temperature control means and the outlet mode doors, wherein an operation position of the temperature control means is controlled between a maximum cooling position and a maximum heating position by a change of an operation angle of the motor actuator, the outlet mode doors are driven to open and close the plurality of outlets, the outlet mode doors and the temperature control means are alternately driven in response to the change of the operation angle of the motor actuator, the plurality of outlets include at least a face outlet for blowing air to a passenger head side in the vehicle compartment and a foot outlet for blowing air to a passenger foot side in the vehicle compartment, a face mode in which air is blown from the face outlet is set in an operation region at a maximum cooling side of the temperature control means, a foot mode in which air is blown from the foot outlet is set in an operation region at a maximum heating side of the temperature control means, a bi-level mode in which air is blown from both the face outlet and the foot outlet is set between the operation region at the maximum cooling side and the operation region at the maximum heating side, an operation angle range of the motor actuation includes a first region, a second region, a third region, a fourth region, and a fifth region, when the operation angle range is within the first region, the temperature control means is controlled between the maximum cooling position and a first intermediate position, and the outlet mode doors are fixed so that the outlet mode is the face mode, when the operation angle range is within the second region, the temperature control means is fixed to the first intermediate position, and the outlet mode is doors are controlled so that the outlet mode is controlled to switch between the face mode and the bi-level mode, when the operation angle range is within the third region, the temperature control means is controlled between the first intermediate position and a second intermediate position, and the outlet mode doors are fixed so that the outlet mode is the bi-level mode, when the operation angle range is within the fourth region, the temperature control means is fixed to the second intermediate position, and the outlet mode are controlled so that the outlet mode is controlled to switch between the bi-level mode and the foot mode, and when the operation angle range is within the fifth region, the temperature control means is controlled between the second intermediate position and the maximum heating position, and the outlet mode doors are fixed so that the outlet mode is the foot mode.

2. An air conditioner for a vehicle according to claim 1, wherein when the outlet mode doors are driven to switch the outlet mode, the temperature control means is kept in a stop state, and after completion of switching of the outlet mode, the outlet mode doors are kept in a stop state and only the operation position of the temperature control means is changed.

3. An air conditioner for a vehicle according to claim 1, further comprising:

link members driven by an operation force of the one motor actuator;

a first pin coupled to the temperature control means;

a second pin coupled to at least one of the outlet mode doors;

a first cam groove which is provided in the link members and in which the first sin is slidably fitted; and a second cam groove which is provided in the link members and in which the second pin is slidably fitted, wherein idle portions and driving portions for alternately driving the temperature control means and at least one of the outlet mode doors are alternately formed in the first cam groove and the second cam groove.

4. An air conditioner for a vehicle, comprising:

temperature control means for controlling an outlet temperature into a vehicle compartment;

a plurality of outlets for blowing air into respective portions in the vehicle compartment;

outlet mode doors for opening and closing the plurality of outlets to switch an outlet mode; and one motor actuator for driving the temperature control means and the outlet mode doors, wherein an operation position of the temperature control means is controlled between a maximum cooling position and a maximum heating position by a change of an operation angle of the motor actuator, the outlet mode doors are driven to open and close the plurality of outlets, the outlet mode doors and the temperature control means are alternately driven in response to the change of the operation angle of the motor actuator;

the plurality of outlets include at least a face outlet for blowing air to a passenger head side in the vehicle compartment and a foot outlet for blowing air to a passenger foot side in the vehicle compartment, at least a face mode in which air is blown from the face outlet is set in an operation region at a maximum cooling side of the temperature control means and a foot mode in which air is blown from the foot outlet is set in an operational region at a maximum heating side of the temperature control means, the plurality of outlets include a defroster outlet for blowing air to a vehicle window glass side, defroster instruction means for issuing an instruction of a defroster mode in which air is blown from the defroster outlet is provided, and an operation angle range of the motor actuator includes a temperature control region in which the operation position of the temperature control means is controlled between the maximum cooling position and the maximum heating position, and the outlet mode doors are driven to switch at least the face mode and the foot mode, and a defroster setting region in which when the instruction of the defroster mode is issued from the defroster instruction means, the operation angle of the motor actuator is made to go out of the temperature control region, and the defroster mode is set.

5. An air conditioner for a vehicle according to claim 4, wherein an air volume of an air blower for blowing air into the vehicle compartment through the plurality of outlets is decreased at switching to the defroster mode.

* * * * *